(12) United States Patent
Aleksin et al.

(10) Patent No.: US 10,171,664 B2
(45) Date of Patent: *Jan. 1, 2019

(54) CUSTOMER CARE MOBILE APPLICATION

(71) Applicant: GENESYS TELECOMMUNICATIONS LABORATORIES, INC., Daly City, CA (US)

(72) Inventors: Sergey Aleksin, Wokingham (GB); Viswanath Kocharlakota, Fleet (GB); Denys Babyak, Frimley (GB); Oleg Fylypenko, Farnborough (GB); Alan Gatto, Crowthrone (GB); Annie Kingston, Tadley (GB); Dean Cottle, Reading (GB); Ramamohan Yeggoni, Reading (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/882,970

(22) Filed: Jan. 29, 2018

(65) Prior Publication Data

US 2018/0191901 A1 Jul. 5, 2018

Related U.S. Application Data

(63) Continuation of application No. 15/390,411, filed on Dec. 23, 2016, now Pat. No. 9,883,038, which is a
(Continued)

(51) Int. Cl.
*H04M 3/51* (2006.01)
*G06Q 30/00* (2012.01)
(Continued)

(52) U.S. Cl.
CPC ........ *H04M 3/5183* (2013.01); *G06Q 30/016* (2013.01); *H04M 1/72522* (2013.01);
(Continued)

(58) Field of Classification Search
CPC .......... H04M 3/5183; H04M 1/72522; H04M 3/5175; H04M 2203/256; H04W 80/12; G06Q 30/016
(Continued)

(56) References Cited

U.S. PATENT DOCUMENTS 6,212,178 B1 4/2001 Beck et al.
6,373,836 B1 4/2002 Deryugin et al.
(Continued)

FOREIGN PATENT DOCUMENTS

KR 20070023981 A 3/2007
KR 20110070296 A 6/2011
WO 2014093729 A1 6/2014

OTHER PUBLICATIONS

James, Bill et al., Optimizing Customer Experiences with Mobile Applications, presentation, Nov. 15, 2010, 24 pages, Genesys Telecommunications, Laboratories, Inc.
(Continued)

*Primary Examiner* — William Nealon

(57) ABSTRACT

A system and method is provided for providing contact center services via a mobile application on a mobile device. Status of a service request that is transmitted to a contact center is monitored. When a change in the status is detected, a notification is automatically transmitted to the mobile application. An interaction request is received from the mobile application in response to the notification. The interaction request identifies the service request. A party handling the service request is identified in response to receipt of the interaction request. The identified party is invited for engaging in interaction with the mobile device.

20 Claims, 57 Drawing Sheets

Related U.S. Application Data continuation of application No. 14/681,082, filed on Apr. 7, 2015, now Pat. No. 9,532,209, which is a continuation of application No. 13/776,669, filed on Feb. 25, 2013, now Pat. No. 9,064,259.

(60) Provisional application No. 61/739,680, filed on Dec. 19, 2012.

(51) Int. Cl.
| | | |
|---|---|---|
| *H04W 8/18* | (2009.01) | |
| *H04W 12/12* | (2009.01) | |
| *H04M 1/725* | (2006.01) | |
| *H04W 80/12* | (2009.01) | |

(52) U.S. Cl.
CPC .......... *H04M 3/51* (2013.01); *H04M 3/5175* (2013.01); *H04W 8/183* (2013.01); *H04W 12/12* (2013.01); *H04M 2203/256* (2013.01); *H04W 80/12* (2013.01)

(58) Field of Classification Search
USPC ............... 455/414.1, 411, 415; 379/265.09; 705/7.14, 14.25, 37
See application file for complete search history.

(56) References Cited

U.S. PATENT DOCUMENTS

| | | | |
|---|---|---|---|
| 6,628,755 | B2 | 9/2003 | Shimada et al. |
| 6,711,146 | B2 | 3/2004 | Yegoshin |
| 7,274,787 | B1 | 9/2007 | Schoeneberger |
| 7,496,640 | B2 | 2/2009 | Hanhan |
| 8,102,986 | B1 | 1/2012 | McClintock et al. |
| 8,117,538 | B2 | 2/2012 | Anisimov et al. |
| 8,472,612 | B1 | 6/2013 | Goringe et al. |
| 8,731,163 | B1 | 5/2014 | Bates et al. |
| 8,781,103 | B2 | 7/2014 | Baranovsky et al. |
| 9,064,259 | B2 | 6/2015 | Aleksin et al. |
| 9,088,656 | B2 | 7/2015 | Mezhibovsky et al. |
| 9,160,855 | B2 | 10/2015 | Baranovsky et al. |
| 9,531,878 | B2 | 12/2016 | Mezhibovsky et al. |
| 9,578,172 | B2 | 2/2017 | Booij et al. |
| 9,621,727 | B2 | 4/2017 | Baranovsky et al. |
| 2005/0002502 | A1 | 1/2005 | Cloran |
| 2006/0215634 | A1 | 9/2006 | Croak et al. |
| 2007/0203820 | A1* | 8/2007 | Rashid ................. G06Q 30/02 705/37 |
| 2008/0086564 | A1 | 4/2008 | Putman et al. |
| 2008/0144804 | A1 | 6/2008 | Mergen |
| 2008/0152121 | A1 | 6/2008 | Mandalia et al. |
| 2008/0205625 | A1 | 8/2008 | Mandalia et al. |
| 2008/0205626 | A1 | 8/2008 | Mandalia et al. |
| 2009/0307074 | A1* | 12/2009 | Sharma ................. G06Q 10/02 705/14.25 |
| 2010/0014511 | A1 | 1/2010 | Ezerzer et al. |
| 2010/0130175 | A1 | 5/2010 | Seligmann |
| 2010/0211428 | A1* | 8/2010 | Duffy ................. G06Q 10/06 705/7.14 |
| 2010/0251177 | A1 | 9/2010 | Geppert et al. |
| 2010/0317376 | A1 | 12/2010 | Anisimov et al. |
| 2011/0009096 | A1 | 1/2011 | Rotsztein et al. |
| 2011/0019812 | A1 | 1/2011 | Sankaranarayanan |
| 2011/0051707 | A1 | 3/2011 | Silver et al. |
| 2011/0090823 | A1 | 4/2011 | Silver |
| 2011/0119389 | A1 | 5/2011 | Cavin et al. |
| 2011/0211679 | A1 | 9/2011 | Mezhibovsky et al. |
| 2011/0235796 | A1 | 9/2011 | Radziewicz et al. |
| 2011/0286444 | A1 | 11/2011 | Petrovykh |
| 2012/0020473 | A1 | 1/2012 | Mart et al. |
| 2012/0195422 | A1 | 8/2012 | Famous |
| 2012/0224681 | A1 | 9/2012 | Desai et al. |
| 2012/0265695 | A1 | 10/2012 | Tuchman et al. |
| 2012/0265697 | A1 | 10/2012 | Tuchman et al. |
| 2012/0309351 | A1* | 12/2012 | Dutta ................. G06Q 10/20 455/411 |
| 2012/0323997 | A1 | 12/2012 | Mezhibovsky et al. |
| 2013/0003957 | A1 | 1/2013 | Singh et al. |
| 2013/0089007 | A1 | 4/2013 | Ristock |
| 2013/0136253 | A1 | 5/2013 | Liberman Ben-Ami et al. |
| 2013/0173479 | A1 | 7/2013 | Paz Salgado et al. |
| 2013/0188785 | A1 | 7/2013 | Zhakov |
| 2013/0195258 | A1 | 8/2013 | Atef et al. |
| 2013/0218947 | A1 | 8/2013 | Zur et al. |
| 2013/0244632 | A1* | 9/2013 | Spence ................. H04M 3/51 455/415 |
| 2013/0282844 | A1 | 10/2013 | Logan et al. |
| 2014/0022328 | A1 | 1/2014 | Gechter et al. |
| 2014/0106718 | A1* | 4/2014 | Liu ................. H04W 64/00 455/414.1 |
| 2014/0126714 | A1 | 5/2014 | Sayko |
| 2014/0162611 | A1 | 6/2014 | Mezhibovsky et al. |
| 2014/0164256 | A1 | 6/2014 | Booij et al. |
| 2014/0171034 | A1 | 6/2014 | Aleksin et al. |
| 2014/0245143 | A1 | 8/2014 | Saint-Marc |
| 2014/0321634 | A1 | 10/2014 | Baranovsky et al. |
| 2015/0289130 | A1 | 10/2015 | Aleksin et al. |
| 2015/0326723 | A1 | 11/2015 | Mezhibovsky et al. |
| 2016/0028892 | A1 | 1/2016 | Baranovsky et al. |
| 2017/0180553 | A1 | 6/2017 | Aleksin et al. |
| 2017/0223188 | A1 | 8/2017 | Baranovsky et al. |

OTHER PUBLICATIONS

Written Opinion and International Search Report for PCT/US2013/074838, dated Mar. 31, 2014, 19 pages.

* cited by examiner

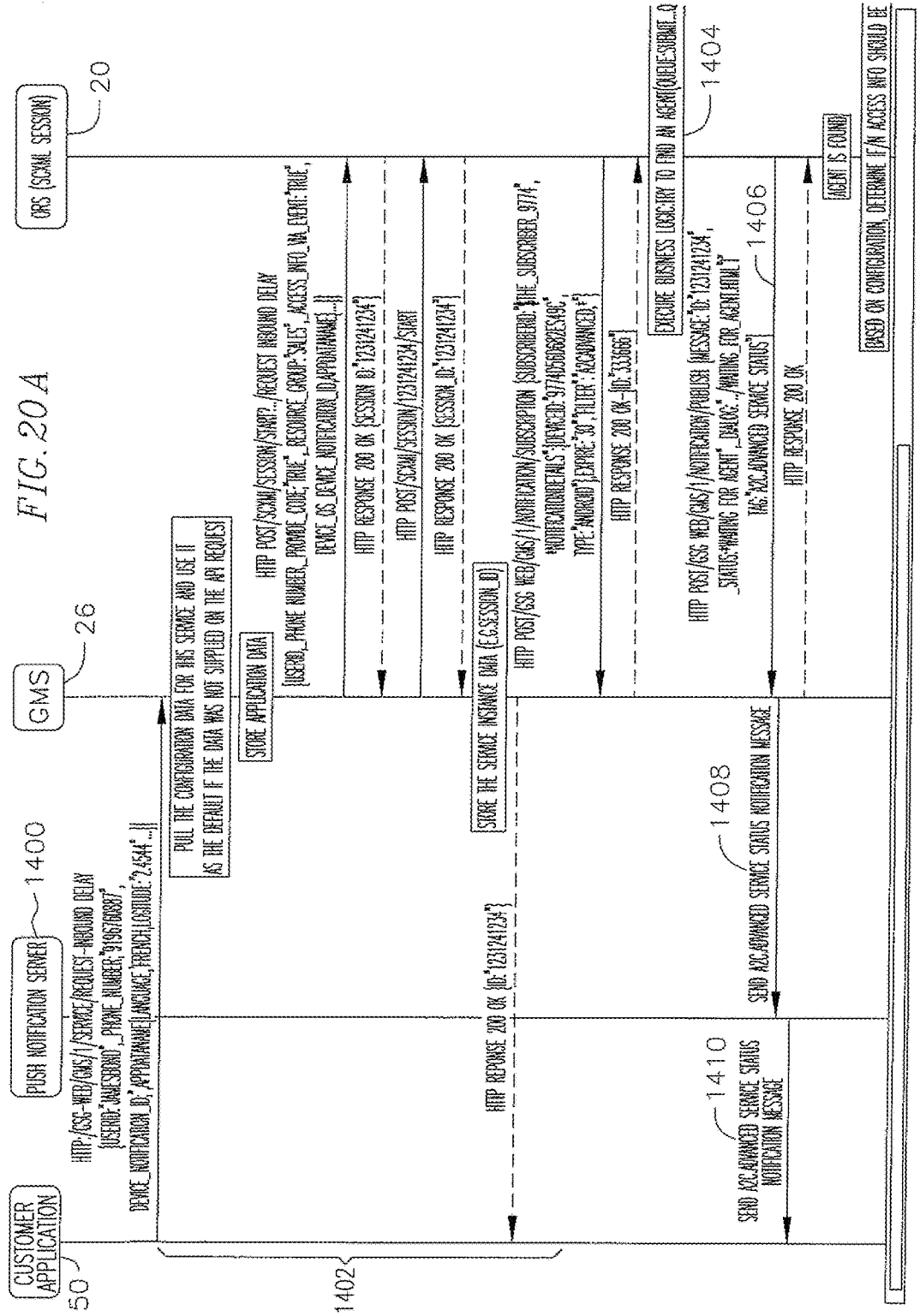

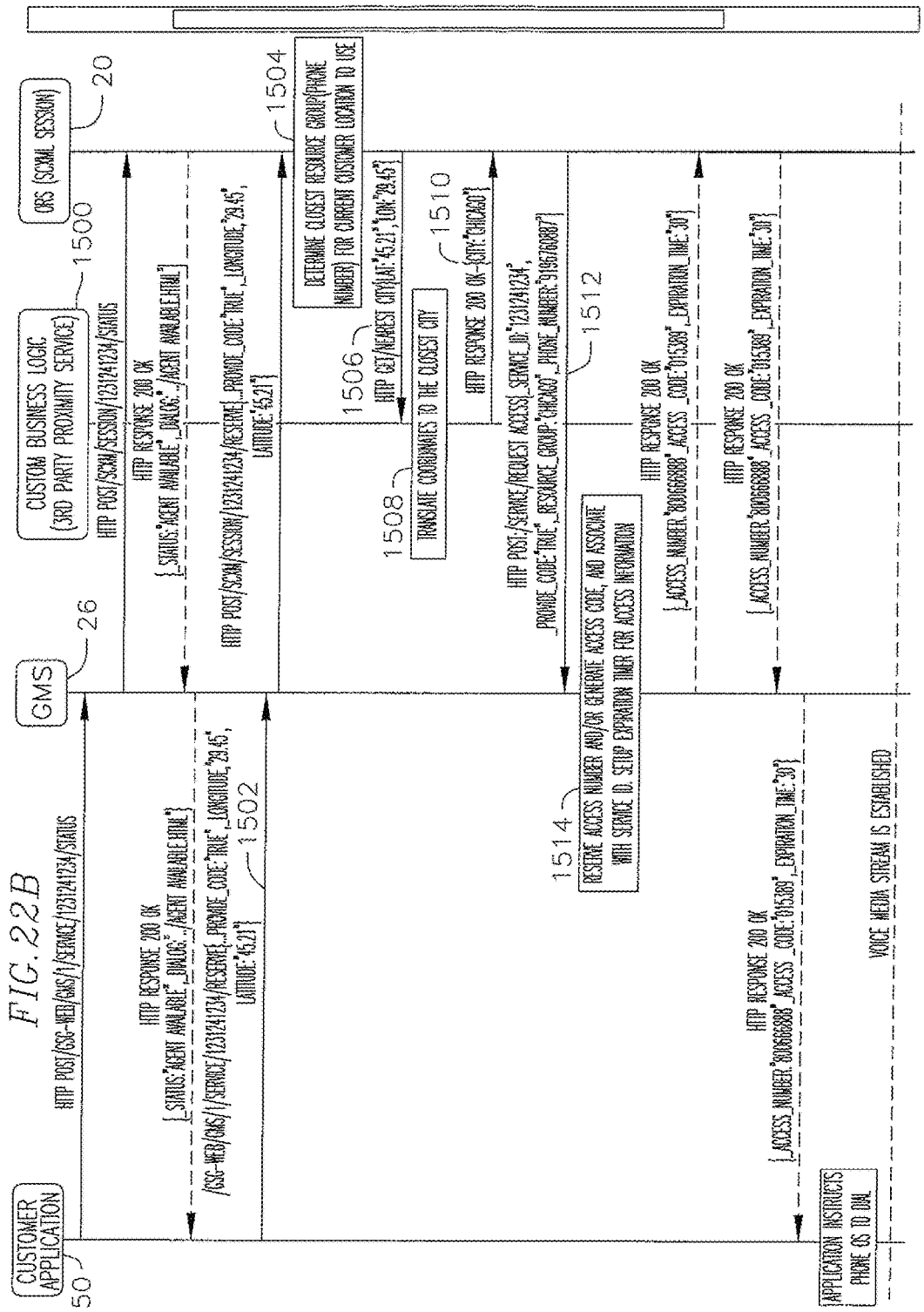

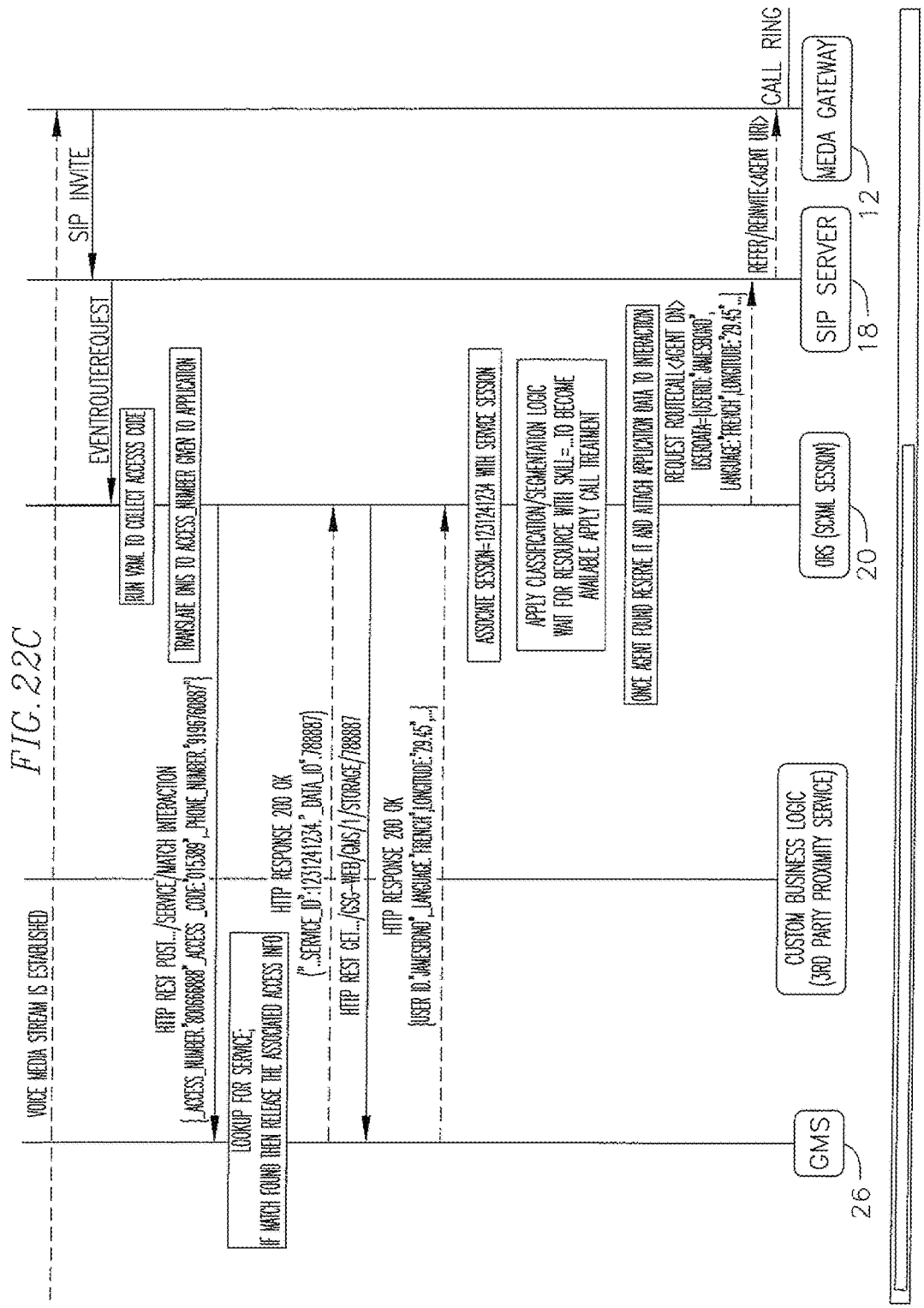

Mooks Expert

Username: rbarjavel

Password:

Sign-Out — 3008

*Registered*

Connect

CUSTOMER CARE MOBILE APPLICATION

CROSS-REFERENCE TO RELATED APPLICATIONS

This application is a continuation of U.S. patent application Ser. No. 15/390,411, filed on Dec. 23, 2016, now U.S. Pat. No. 9,883,038, which is a continuation of U.S. patent application Ser. No. 14/681,082, filed on Apr. 7, 2015, now U.S. Pat. No. 9,532,209, which is a continuation of U.S. patent application Ser. No. 13/776,669, filed on Feb. 25, 2013, now U.S. Pat. No. 9,064,259, which claims the benefit of and priority to U.S. Provisional Application No. 61/739,680, filed on Dec. 19, 2012, the content of all of which are incorporated herein by reference.

BACKGROUND

Smart phones and electronic tablets provide a convenient way to interact with businesses, especially if those businesses provide an application that allows customers to reach out to customer contact centers provided by those businesses via the applications. Thus, what is desired is a system and method for providing customer service via the applications in a safe and convenient manner.

SUMMARY

Embodiments of the present invention are directed to a system and method for providing contact center services via a mobile application on a mobile device. According to one embodiment, the method includes monitoring status associated with a service request transmitted to a contact center; detecting change in the status; automatically transmitting a notification to the mobile application in response to detecting the change in the status; receiving an interaction request from the mobile application in response to the notification, wherein the interaction request identifies the service request; identifying a party handling the service request in response to receipt of the interaction request; and inviting the identified party for engaging in interaction with the mobile device.

According to one embodiment, the service request is for technical support.

According to one embodiment, the status identifies that the service request has been resolved. The status may also identify triggering of an alarm with respect to the service request, or escalation of a problem associated with the service request.

According to one embodiment, notification is automatically transmitted to a contact center agent.

According to one embodiment, the interaction request is generated by the mobile application in response to actuation of an interaction option by a user of the mobile application. The interaction request may be a mobile phone call to the contact center, wherein a telephone for the contact center is provided to the mobile application as a push notification.

According to one embodiment, the mobile application provides an interface for completing forms for being submitted to the contact center. The form may be a service request form or a survey form.

According to one embodiment, information is pushed for display on the mobile device. The information may be product or marketing information. The information may be based on identification of a location of the mobile device. The information may also be a contact center phone number, or may identify informational courses held near the identified location.

According to one embodiment, compliance with a service level agreement is monitored, and a level of compliance if visually identified via a visual indicator.

According to one embodiment, the identification of the party is without further input from a user of the mobile device.

According to one embodiment, the service request is a request for a product change.

These and other features, aspects and advantages of the present invention will be more fully understood when considered with respect to the following detailed description, appended claims, and accompanying drawings. Of course, the actual scope of the invention is defined by the appended claims.

BRIEF DESCRIPTION OF THE DRAWINGS

FIGS. 20A-20C are message signaling diagrams depicting flow of messages that are exchanged in response to a request for a voice call where there is no agent immediately available to handle the call according to one embodiment of the invention;

FIGS. 22A-22C are message signaling diagrams depicting flow of messages that are exchanged in response to a request for a voice call where an end user device's location information is utilized to select an access number according to one embodiment of the invention;

DETAILED DESCRIPTION

Figure 1A:
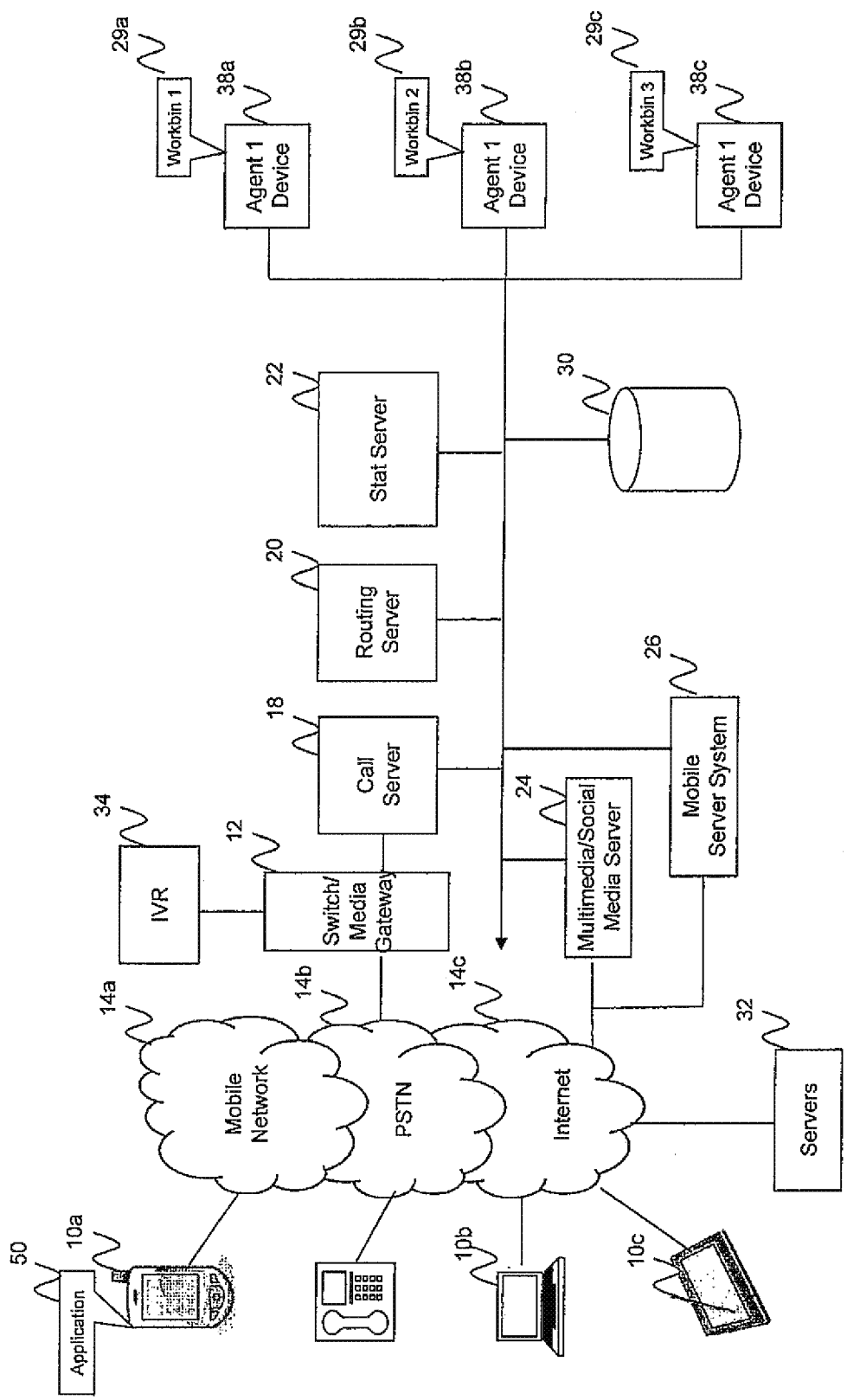
FIG. 1A is a semi-schematic block diagram of a system supporting a contact center that is configured to provide mobile device support to contact center customers according to one embodiment of the invention.

Embodiments of the present invention are directed to a system and method for engaging with customers or potential customers via their end user devices in order to provide them with customer service. According to one embodiment, an enterprise provides a customer application for downloading into the customer's end user device. The application may be invoked for accessing different services provided by the enterprise, as well as for contacting the enterprise's customer contact center. For example, if the enterprise is a bank, the application may be a banking application that the user may access to check bank account information, credit card information, or conduct other financial transactions. In another example, the application may be a customer care application provided by an IT help desk. Such customer care application may be invoked to view details of service requests (SRs) submitted by a customer to the IT help desk. The service requests may be, for example, service requests for technical support. Regardless of the type of application, the actual logic of the application might be incorporated into the application, or the application may invoke the end user device's web browser to access the logic over the web.

Although various embodiments of the present invention are described in terms of a customer application installed in a mobile device, a person of skill in the art should recognize that the embodiments are not limited to mobile devices or applications. Instead, embodiments of the present invention extend to any consumer electronics device conventional in the art, such as, for example, televisions, set-top boxes, gaming consoles, computers, and the like. Similarly, the customer applications may extend to include any application that may be downloaded and/or executed (e.g. without download) by the consumer electronics device.

According to one embodiment, the customer applications allow customers to initiate contact with a contact center without leaving the application. For example, instead of leaving the application and invoking the mobile device's keypad to manually dial the telephone number of the customer contact center, the application may, according to one embodiment, provide a contact button or icon (collectively referred to as a "contact button") for initiating contact with the contact center. According to one embodiment, contacting a contact center via the customer application allows a customer who has been authenticated via the application to avoid re-authentication when a voice connection is made with the contact center.

According to one embodiment, the customer application provides more than one communication medium for interacting with the contact center. For example, the application may provide an option to contact the contact center via email, text-based chat, or the like. The availability of a particular mode of communication may depend, for example, on the profile of the customer using the customer application.

I. General Architecture

FIG. 1A is a semi-schematic block diagram of a system supporting a contact center that is configured to provide mobile device support to contact center customers according to one embodiment of the invention. The contact center infrastructure may be premise based or hosted.

According to one exemplary embodiment, the contact center includes resources (e.g. personnel, computers, and telecommunication equipment) to enable delivery of services via telephone or other communication mechanisms, such as, for example, text, chat, email, or the like. Such services may vary depending on the type of contact center, and may range from customer service to help desk, emergency response, telemarketing, order taking, and the like. According to one embodiment, the contact center is an IT help desk configured to receive service requests, route service requests to appropriate parties, such as, for example, engineers, IT personnel, or the like (also collectively referred to as agents or knowledge workers), and provide updates to the customers submitting the service requests.

Customers, potential customers, or other end users (collectively referred to as customers) desiring to receive services from the contact center may initiate inbound calls to the contact center via their end user devices. The end user devices 10a-10c (collectively referenced as 10) include, for example, mobile communication devices such as, for example, cellular phones (including smartphones), laptops, electronic tablets, and the like. The end user devices may also include standard land-line telephones, desktops, or other consumer electronic devices (e.g. televisions, set-top boxes, gaming consoles, and the like) configured for voice, data, and/or multimedia communication as is conventional in the art. Users operating the end user devices 10 may initiate, manage, and respond to telephone calls, emails, chats, text messaging, web-browsing sessions, and other multi-media transactions, via one or more customer applications 50 downloaded and/or executed by the end user devices.

Inbound and outbound calls from and to the end users devices 10 may traverse a telephone, cellular, and/or data communication network 14 depending on the type of device that is being used. For example, the communications network 14 may include a private or public switched telephone network (PSTN) 14b, mobile network 14a, and a private and/or public wide area network. In the embodiment of FIG. 1A, the Internet 14c is depicted as an example of the public wide area network.

The mobile network 14a may include, for example, a code division multiple access (CDMA) network, global system for mobile communications (GSM) network, and/or any 3G or 4G wireless carrier network conventional in the art. The mobile network may also be a WiFi or other similar wireless network. In addition, the mobile network may support dedicated solutions for providing wireless access to the Internet, such as, for example, Gogo, Tetra, and the like.

The Internet network 14b may include various servers 32 including, for example, social networking servers, voice over IP (VoIP) servers, web servers, application servers, or other computing resources (e.g. database servers for accessing data stored in databases) which users may leverage for interacting with the contact center. The servers 32 may also provide web pages for the enterprise supported by the contact center. End users may browse the web pages and get information about the enterprise's products and services. The web pages, in conjunction with browser capabilities such as HTML5 and service specific servlets may also provide different mechanisms for contacting the contact center (e.g. web chat, voice call, email, web real time communication (WebRTC), or the like).

According to one exemplary embodiment, the contact center includes a switch/media gateway 12 coupled to the communications network 14 for receiving and transmitting calls between end users and the contact center. The switch/media gateway 12 may include a telephony switch configured to function as a central switch for agent level routing within the center. In this regard, the switch 12 may include an automatic call distributor, a private branch exchange (PBX), an IP-based software switch, and/or any other switch configured to receive Internet-sourced calls and/or telephone network-sourced calls. According to one exemplary embodiment of the invention, the switch is coupled to a call server 18 which may, for example, serve as an adapter or interface between the switch and the remainder of the routing, monitoring, and other call-handling systems of the contact center.

According to one exemplary embodiment of the invention, the switch is coupled to an interactive voice response (IVR) server 34. The IVR server 34 is configured, for example, with an IVR script for querying customers on their needs. For example, a contact center for IT help may tell callers, via the IVR script, to "press 1" if they wish to get the status of a service request, whereas a contact center for a bank may tell callers to press the same number to get an account balance. Through continued interaction with the IVR, customers may even complete service without needing to speak with an agent.

If the call is to be routed to an agent, a request is made to the call server 18 which interacts with a routing server 20 for finding an appropriate agent for processing the call. The call server 18 may be configured to process PSTN calls, VoIP calls, and the like. For example, the call server 18 may include a session initiation protocol (SIP) server for processing SIP calls.

Once an appropriate agent is available to handle a call, a connection is made between the caller and the agent device 38a-38c (collectively referenced as 38) of the identified agent. Collected information about the caller and/or the caller's historical information may also be provided to the agent device for aiding the agent in better servicing the call. In this regard, each agent device 38 may include a telephone adapted for regular telephone calls, VoIP calls, and the like. The agent device 38 may also include a computer for communicating with one or more servers of the contact center and performing data processing associated with contact center operations, and for interfacing with customers via voice and other multimedia communication mechanisms.

The selection of an appropriate agent for routing an inbound call may be based, for example, on a routing strategy employed by the routing server 20. The routing strategy may consider, for example, information about agent availability, skills, and other routing parameters provided, for example, by a statistics server 22.

The contact center may also include a multimedia/social media server 24 for engaging in media interactions other than voice interactions with the end user devices 10 and/or servers 32. The media interactions may be related, for example, to email, vmail (voice mail through email), chat, video, text-messaging, web, social media, screen-sharing, and the like. According to one embodiment, each agent device includes an agent desktop application (referred to as an interaction workspace) which an agent may invoke to engage in the media interactions. The agent desktop application may also be invoked to display customer data and information on past interactions with the customer.

According to one exemplary embodiment, the contact center system further includes a mobile server system 26 for interacting with customer applications 50 installed in the mobile devices. The mobile server system may also be configured to process interactions from a web browser invoked by the customer's mobile device. According to one embodiment, the mobile server system 26 is configured to interact with the customer application 50 and contact center resources via the REST (representational state transfer) protocol as is conventional in the art. According to one embodiment, a particular customer application 50 interacting with the mobile server system 26 may be a technical support application that allows the user to view or update service requests while the user is on the move, even when the user has no access to a computer.

According to one exemplary embodiment of the invention, the routing server 20 is enhanced with functionality for managing back-office/offline activities that are assigned to the agents. Such activities may include, for example, responding to emails, responding to letters, handling service requests, attending training seminars, or any other activity that does not entail real time communication with a customer. Once assigned to an agent, an activity may be pushed to the agent in real time, or may appear in the agent's workbin 29a-29c (collectively referenced as 29) as a task to be completed by the agent. The agent's workbin may be implemented via any data structure conventional in the art, such as, for example, a linked list, array, and/or the like. The workbin for one or more agents may be maintained and managed centrally from an application server.

According to one exemplary embodiment of the invention, the contact center also includes one or more mass storage devices 30 for storing different databases relating to agent data (e.g. agent profiles, schedules, etc.), customer data (e.g. customer profiles), interaction data (e.g. details of each interaction with a customer, including reason for the interaction, disposition data, time on hold, handle time, etc.), and the like. The one or more mass storage devices may also store information on tasks handled by knowledge workers such as, for example, tasks relating to service requests provided by the customers. The information may include, for example, status information, disposition information, information on the party assigned to handle the task, business value, priority, and the like. According to one embodiment, some of the data (e.g. customer profile data) may be provided by a third party database such as, for example, a third party customer relations management (CRM) database via a third party server. The mass storage device may take form of a hard disk or disk array as is conventional in the art.

The various servers of FIG. 1A may each include one or more processors executing computer program instructions and interacting with other system components for performing the various functionalities described herein. The computer program instructions are stored in a memory implemented using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

Figure 1B:
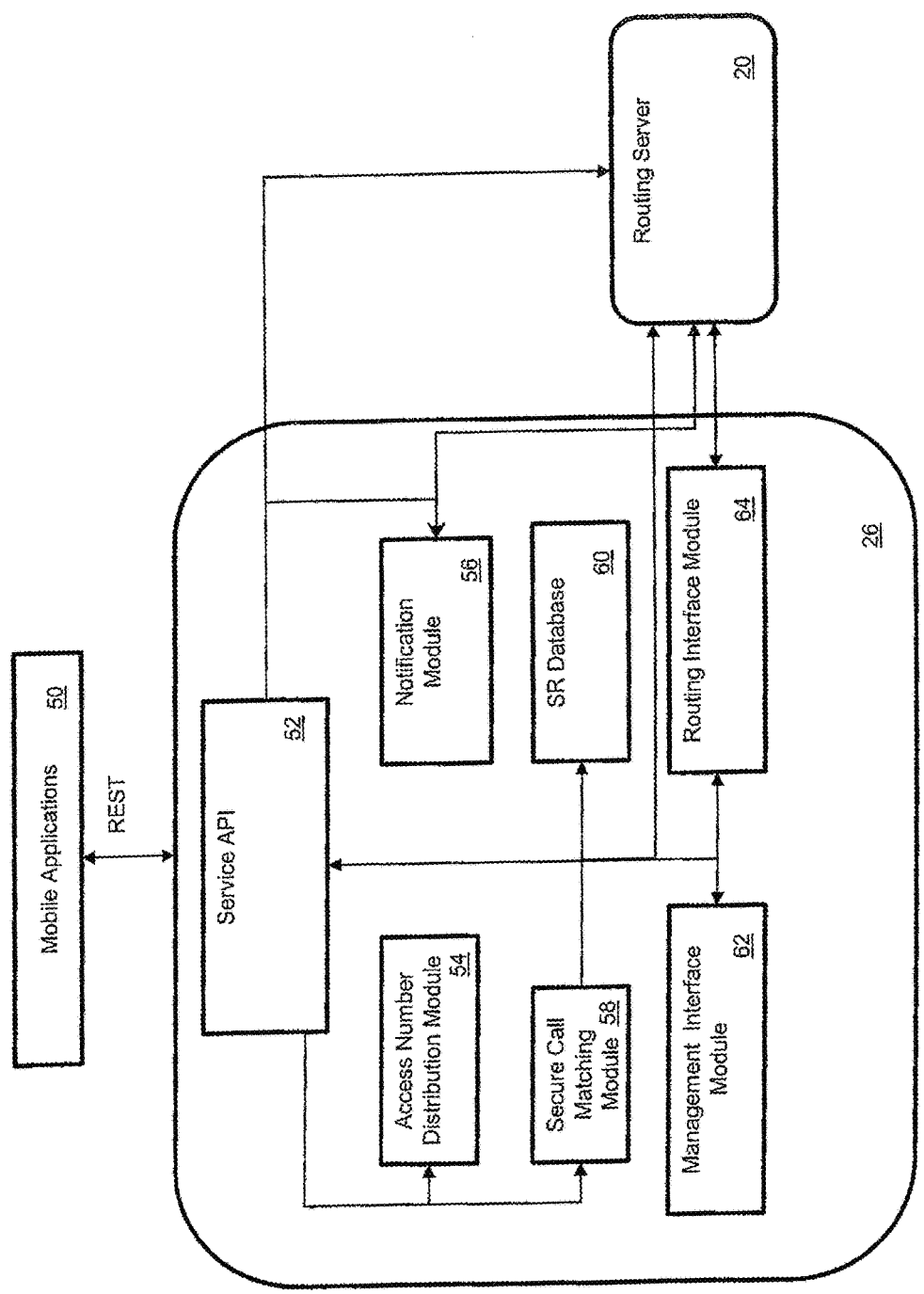
FIG. 1B is a semi-schematic block diagram of a mobile server system according to one embodiment of the invention.

FIG. 1B is a more detailed block diagram of the mobile server system 26 according to one embodiment of the invention. The mobile server system 26 includes a service application programming interface (API) module 52 accessed by the customer applications 50 for managing requested contact center functions.

The mobile server system further includes an access number distribution module 54, notification module 56, and secure call matching module 58.

The access number distribution module 54 is configured to manage distribution of contact center access numbers. According to one embodiment, the module 54 temporarily provides to the end user devices, a phone number chosen for each individual inbound call based on the mobile contextual data, such as, for example, location of the end user device (or mobile service provider), customer type, customer availability, or other characteristic (e.g. date, time, customer profile, load distribution in the contact center, and the like).

The notification module 56 is configured to engage a third party push notification service (e.g. Apple Push Notification Service, Android-Push service, or the like) for providing different types of push notifications to the end user devices. The type of third party push notification service that is employed depends on the type of end user device. A push notification may be sent to a user's end user device via the appropriate push notification service when a change to the status of a pending service request by the user is detected. For example, a notification may be pushed when a service request is assigned to an engineer, when there is an escalation of a problem associated with the service request, when an alarm is triggered with respect to the service request, when the service request has been resolved, and/or the like. Other types of push notification may relate to expected wait time (if the user is on hold), or other types of notifications or updates to be provided to the customer. For example, a push notification may be transmitted informing the customer that an email that the customer sent has been responded to. The updates (whether transmitted via push notifications or displayed on a dedicated page of the mobile application) may also relate to a particular transaction or activity associated with the customer, even if the application was not invoked for conducting those transactions or activities. In this manner, the customer may view updates, status information, and the like, for all transactions or activities associated with the customer, from a central location. The notifications may also be pushed, for example, to an agent device.

According to one embodiment, the notification module 56 may be configured to provide other types of push notifications for informing the customer of specific events, such as, for example, when an agent is available, when an agent is not available, and for other types of prompting, notifications, and updates. For example, if the contact center is an IT help desk, notifications may be pushed to inform users of upcoming training sessions, software release updates, and other marketing and product information.

The secure call matching module 58 is configured to temporarily store and attach contextual/context data received from the customer applications 50 to an inbound (or outbound) voice call. The contextual data may be arranged as key value pairs, and may include information on the caller, caller device, caller location, caller authentication data, call subject (e.g. based on a portion of the customer application 50 that was invoked when requesting the call), data relating to navigation within the application (e.g. the types of selections made by the user as well as the order of the selections), and the like. According to one embodiment, when a customer invokes the customer application 50 to transmit a request to be connected to a live agent, the context of the request is sent from the application to the mobile server system 26 over a data channel for storing by the secure call matching module. In this regard, a secure token is provided to the end user device for use as a one-time password for matching the stored contextual data with an inbound voice call.

According to one embodiment, the contextual data may also be displayed for an agent attending the call for providing personalized experience without asking the customer to repeat his data. For example, the agent may have access to the customer's location, preferences, status, and customer history. With respect to location, the customer location may be depicted, for example, on a map displayed to the agent. The knowledge of the customer's location may provide proactive service opportunities, such as, for example, sending direction from a traveler's location in the airport to a new gate, dispatching a claims adjustor to an accident site, or responding to a customer report of a lost ATM card with the closest branch where it can be replaced. If the contact center is an IT help desk, the caller's location may be used to push information on informational courses held near the caller's location.

In another example, the contextual data provided by the customer application may relate to interactions by the customer with the application. Interactions outside of the application may also be captured by the application. For example, the application may track and capture user interactions with a web site accessed by the customer. The interaction information may indicate if the customer is interested on a particular topic or product, or whether the customer is struggling to find certain information or has questions about a particular topic. Having such context data available to the agent may help the agent to provide the assistance needed by the customer, either when the customer reaches out to the contact center for help, or the contact center decides to reach out to the customer as an outbound interaction (e.g. when detecting that the customer needs assistance).

According to one embodiment, the mobile server system 26 further includes a database 60 for storing customer data, interaction data, and the like. For example, for a customer care application, the database 60 may be an SR database storing information on pending and past service requests. The SR information may include, for example, status information, disposition information, information on the party assigned to handle the service requests, activities associated with the service requests, business values, priority values, and the like. All or a portion of the information may also be stored in other mass storage devices 30 in addition or in lieu of the SR database.

The mobile server system 26 further includes a management interface module 62 and routing interface module 64 for interfacing with different components of the contact center system. For example, the management interface module 62 may be invoked to communicate with a configuration server for retrieving configuration parameters associated with the customer application 50. The routing interface module 64 may be invoked to communicate with the routing server 20 for routing interactions to agents, knowledge workers, and the like.

The various modules described with respect to FIG. 1B may be distributed over one or more application servers each having a processor and memory, the memory storing computer program instructions for accomplishing the functionality of the corresponding modules. Also, although the modules are assumed to be separate functional units, those skilled in the art will recognize that the functionality of the modules may be combined or integrated into a single module, or further subdivided into further sub-modules without departing from the spirit of the invention.

II. Financial Mobile App

According to one embodiment, a customer application 50 that may be loaded onto an end user device is a financial customer application.

Figure 2:
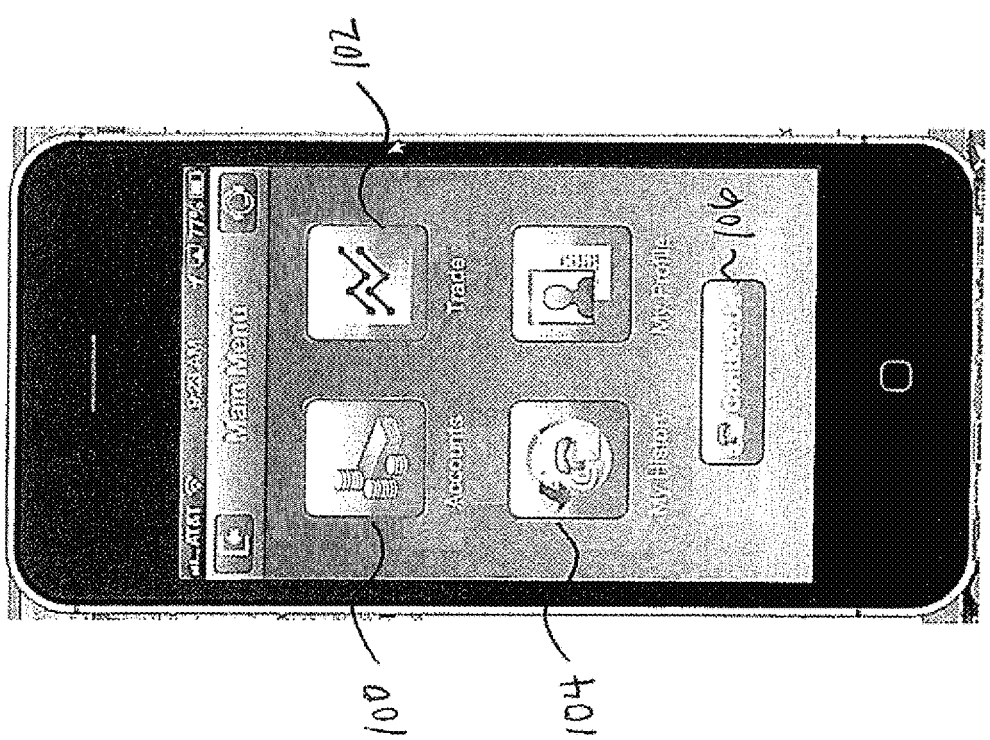
FIG. 2 is a screen shot of a screen displayed by a financial customer application according to one embodiment of the invention.

FIG. 2 is a screen shot of a screen displayed by a financial customer application according to one embodiment of the invention. In the illustrated example, the application is offered by a banking institution for accessing one or more accounts of the user at the banking institution upon selecting an accounts option 100. The user may also conduct other transactions such as, for example, trade (upon selection of a trade option 102). The user may also view a history of past interactions with the contact center upon selection of a history option 104.

According to one embodiment, integrated with the application is an option for contacting the enterprise's customer contact center. In this regard the application provides a contact option 106 for requesting contact with the contact center without having to leave the application.

Figure 3B:
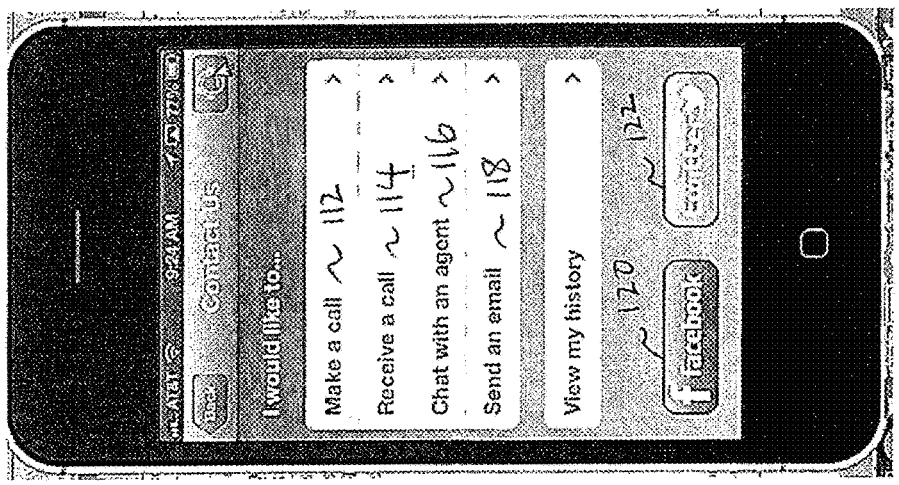
FIG. 3B is a screen shot of a screen displayed by a customer application installed in a customer end user device upon selecting an agent icon according to one embodiment of the invention.
Figure 3A:
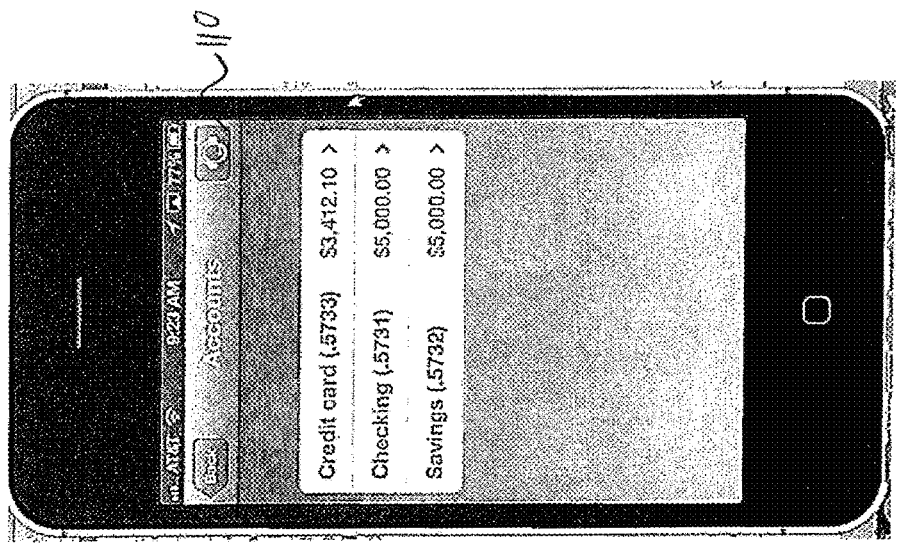
FIG. 3A is a screen shot of a screen displayed by a customer application installed in a customer end user device upon selecting an accounts option.

FIG. 3A is a screen shot of a screen displayed by the application installed in the end user device upon selecting the accounts option 100 from FIG. 2. Selection of this option causes the application to pull and display information about the accounts that the user has with the banking institution, as well as current balances in such accounts. An agent icon 110 may be selected to request contact with the banking institution's contact center to ask a question, engage services of the contact center, or the like.

FIG. 3B is a screen shot of a screen displayed by the application installed in the end user device upon selecting the agent icon 110 from the screen displayed in FIG. 3A. The display includes a list of communication options/services available to the user. The same communication options are also displayed upon selection of the contacts option from the screen displayed in FIG. 2. The communication options may include, for example, making a voice call 112, receiving a callback 114, initiating a chat session 116, sending an email 118, and communicating via the institution's social media accounts such as, for example, Facebook 120 or Twitter 122 accounts. The type of communication option available to the customer may be determined via rules at the contact center. The rules may use, for example, particular customer profile data as a condition for enabling certain communication options. For example, a customer with a gold label may have voice, chat, and email enabled in the application, whereas a customer with a bronze label may only have email or only chat enabled as a communication option.

Figure 4A:
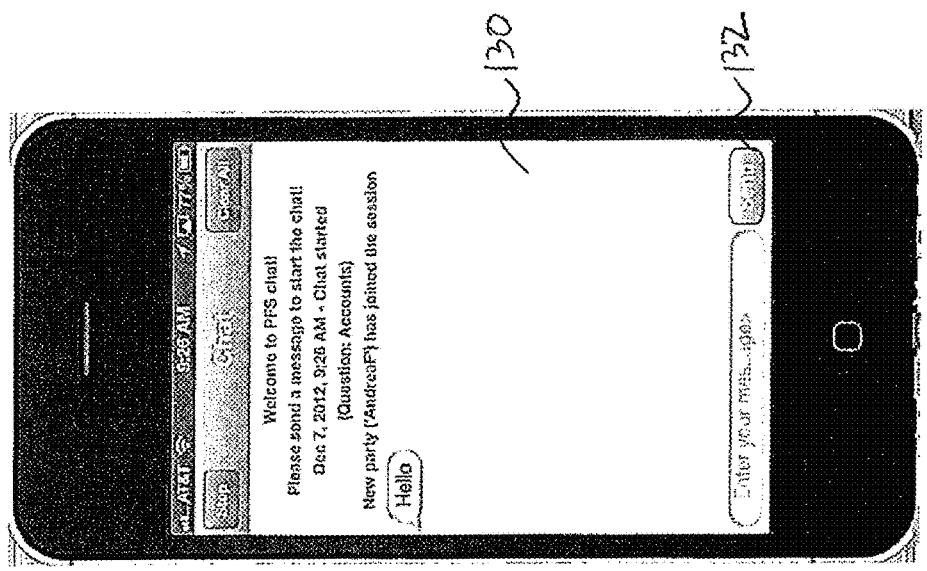
FIG. 4A is a screen shot of a screen displayed by a customer application installed in a customer end user device upon selecting a chat communication according to one embodiment of the invention.

FIG. 4A is a screen shot of a screen displayed by the application installed in the end user device upon selecting the chat communication option 116 from the screen displayed in FIG. 3B. The user enters the message of the chat in a message area 130 and actuates a send 132 button to start a chat session. The chat request is received by the mobile server system 26 and routed to an available agent by the routing server 20. According to one embodiment, the customer application 50 provides along with the chat request, context data about the user (also referred to as case information or session information) for allowing the agent to provide personalized customer service without requesting that the user specifically provide his or her information. Some of the context data may also be retrieved by the mobile server system from a customer database.

Figure 4B:
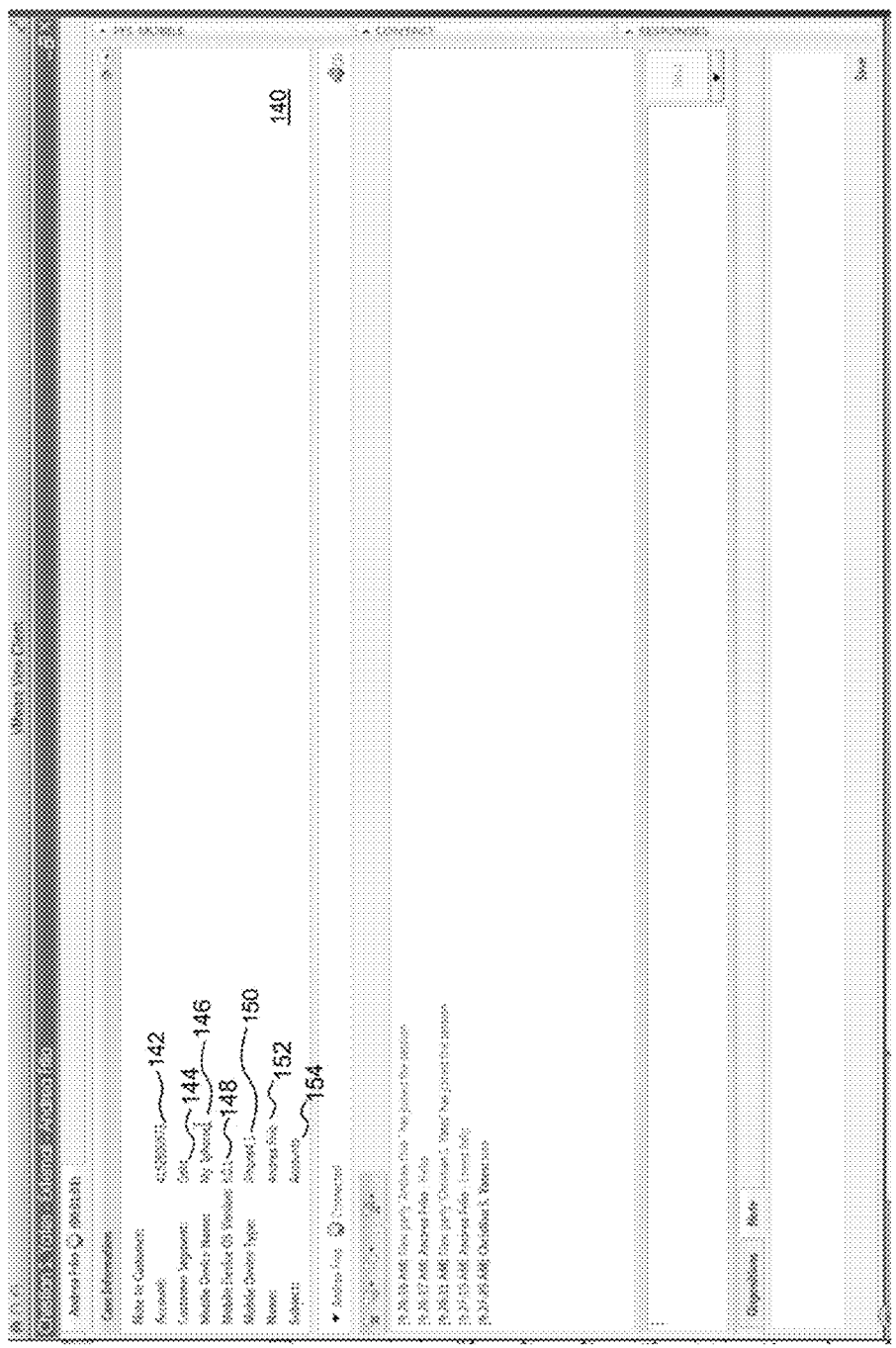
FIG. 4B is an exemplary screen shot of an agent's desktop invoked for engaging in chat communication with a user of an end user device according to one embodiment of the invention.

FIG. 4B is an exemplary screen shot of the agent's desktop invoked for engaging in chat communication with the user of the end user device of FIG. 4A. The contextual data received from the application or otherwise retrieved from the customer database is displayed in a case information area 140. The case information displayed in this example includes the user's account information 142, customer segment/level (e.g. gold, silver, bronze) 144, device name 146, device OS version 148, device type 150, name of the user 152, and a subject 154 associated with the interaction request. According to one embodiment, the subject 154 is based on where the user was in the application when invoking the contact agent icon. In the illustrated example, the user was in the "accounts" section (FIG. 3A) when the icon was invoked.

According to one embodiment, the contextual data includes geographic location of the user. According to one embodiment, the geographic location is marked on a map displayed on the agent's desktop.

Figure 4C:
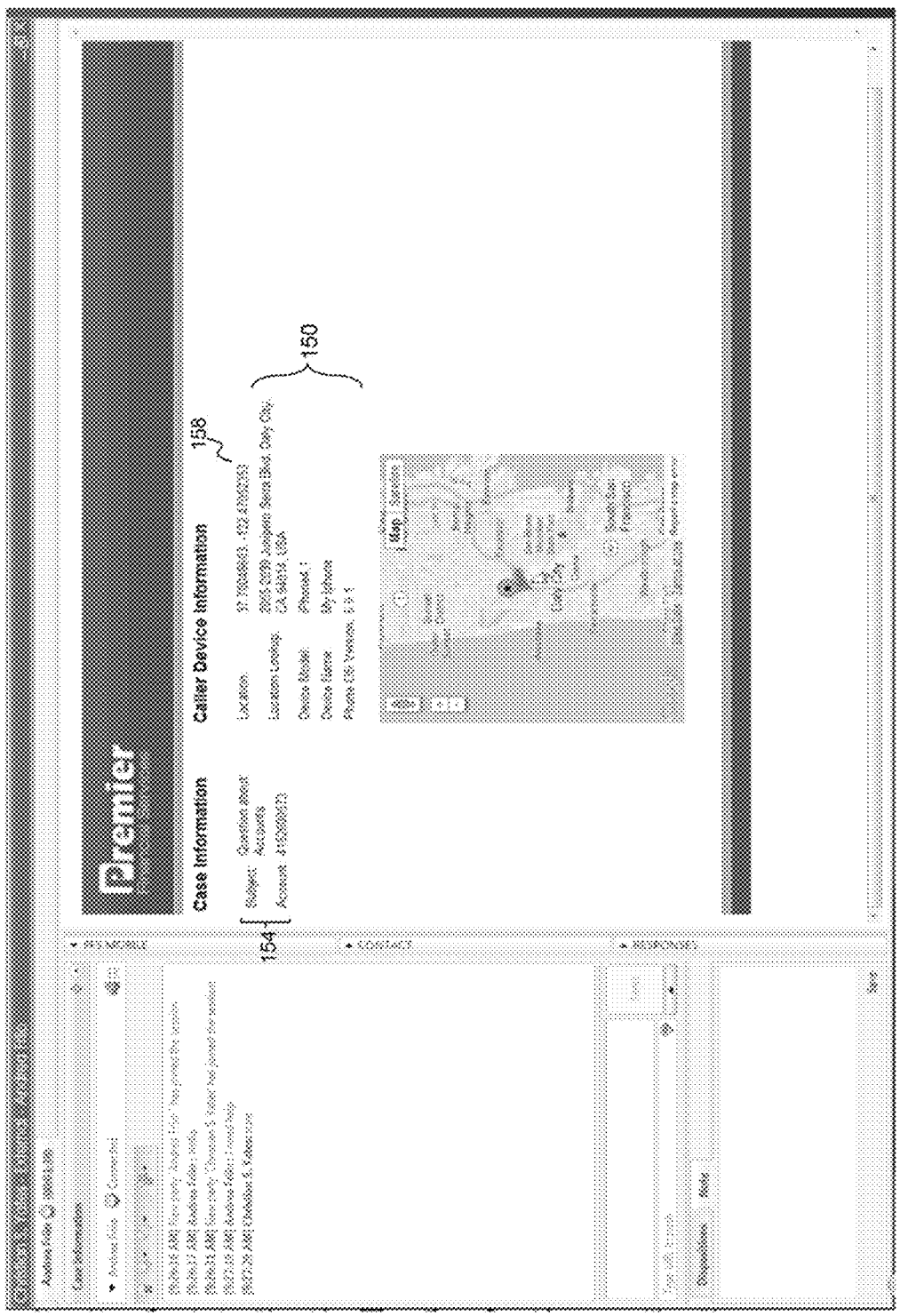
FIG. 4C is a screen shot of an agent's desktop displaying a map marking a location of a user with whom the agent is communicating according to one embodiment of the invention.

FIG. 4C is a screen shot of the agent desktop displaying a map 150 marking a location 152 of a user with whom the agent is communicating according to one embodiment of the invention. The geographic location 152 is displayed along with the available case information 154 and caller device information 156 (which includes a longitude and latitude 158 of the device). Knowledge of the user's location allows the agent to proactively provide services or recommend products based on the location. For example, knowledge of the customer's location may allow the agent to provide a nearest ATM location to the customer. For other customer applications, such as an application related to travel, the agent may recommend a hotel, restaurant, or business near the customer's location.

According to one embodiment, the agent's desktop allows information to be provided to the customer by pushing a URL to a web page containing the information. The URL may be entered in a URL area and pushed upon selection of a send option. Of course, any URL may be pushed by the agent for displaying any associated content to the user.

Figure 4D:
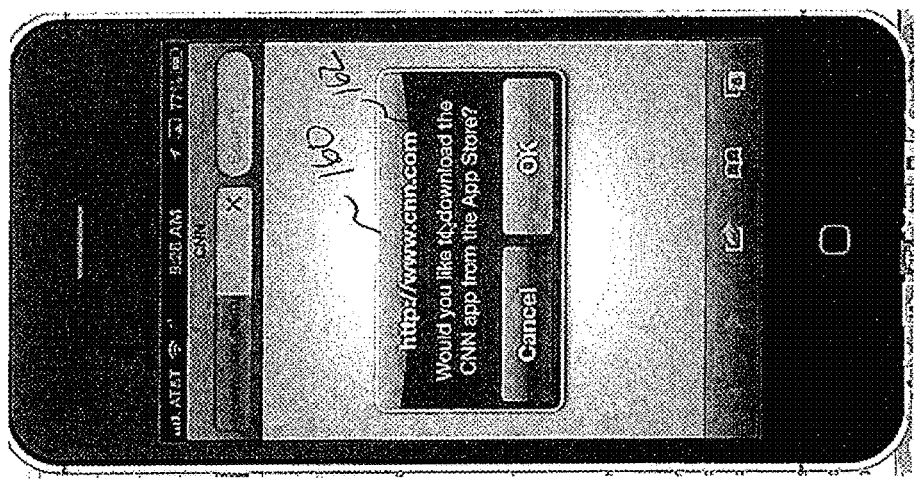
FIG. 4D is a screen pop that is displayed on a customer's end user device in response to a URL pushed by an agent according to one embodiment of the invention.

FIG. 4D is a screen pop 160 that is displayed on the customer's end user device in response to a URL 162 pushed by the agent. The screen pop may give to the user an option to access the web site or download an application associated with the URL.

According to one embodiment, after a customer is finished with an interaction he is provided, via a push notification, an opportunity to rate the interaction experience via a survey. FIG. 5A is a screen pop 164 that is displayed on the customer's end user device asking whether the user wants to take the survey. If the customer selects to take the survey, a feedback portion of the application is invoked for allowing the user to enter data for rating the interaction experience.

Figure 5B:
FIG. 5B is a screen shot provided by a customer application for rating a customer's experience with a contact center according to one embodiment of the invention.
Figure 5A:
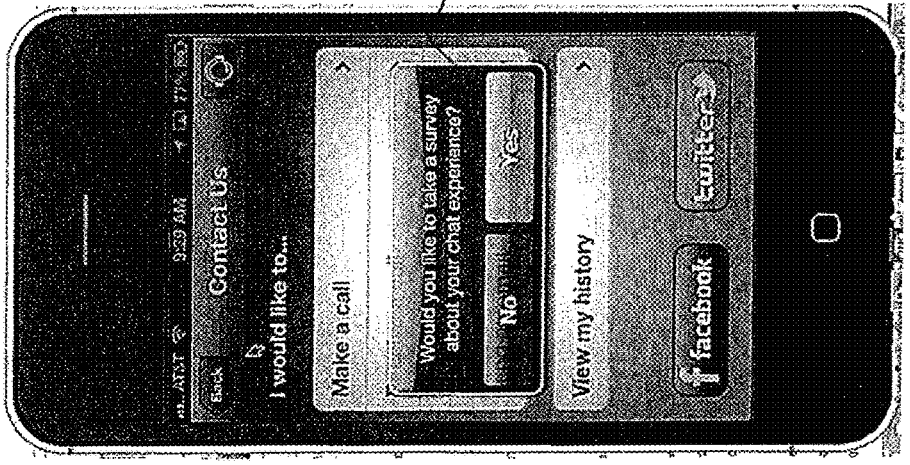
FIG. 5A is a screen pop that is displayed on a customer's end user device asking whether the user wants to take the survey according to one embodiment of the invention.

FIG. 5B is a screen shot 170 provided by the feedback portion of the application for rating the experience according to one embodiment of the invention. In the illustrated embodiment, the customer provides feedback in the form of stars 172 or other visual elements (e.g. 4/5 stars indicate a good experience), and/or via textual comments in a comments section 174. Selection of a submit option 176 provides the feedback to the mobile server system 26 for storing in the mass storage device 30 in association with the customer involved in the interaction, agent handling the interaction, call identifier, and/or the like. According to one embodiment, an application server at the contact center may be configured to make calculations and/or modifications based on the customer's rating. For example, the rating may be used for correlating with a net promoter score which may indicate how likely the customer is to recommend the company to others.

Figure 6C:
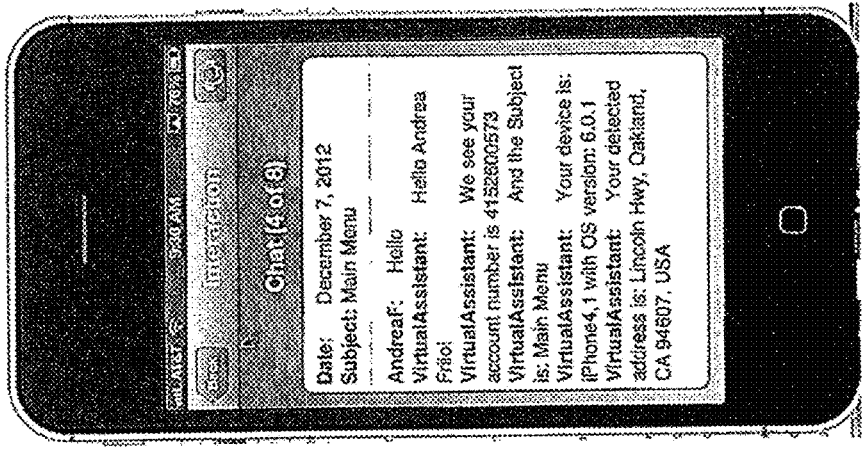
FIGS. 6B-6C are screen shots of details of particular historical interactions when such interactions are selected from the list displayed on the screen of FIG. 6A.
Figure 6B:
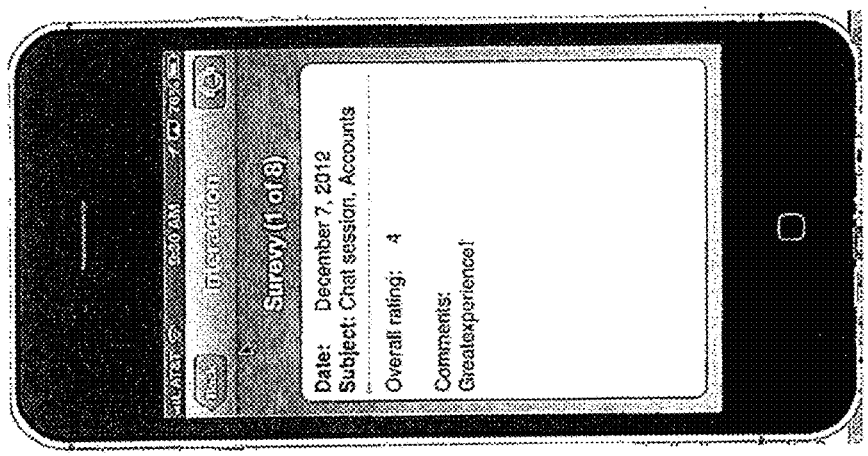
Figure 6A:
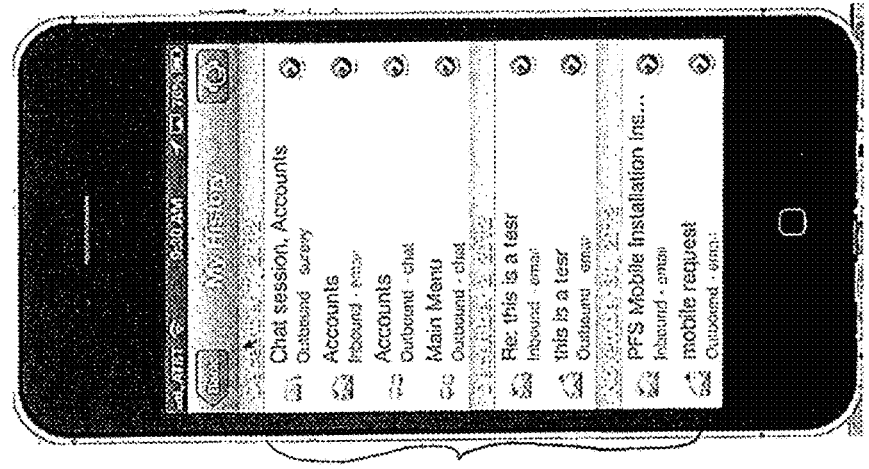
FIG. 6A is a screen shot of historical interaction data retrieved by a customer application according to one embodiment of the invention.

Referring again to FIG. 2, selection of a history option 104 causes the application to transmit a request to the mobile server system 26 for retrieving a history of interactions for the customer from the mass storage device. FIG. 6A is a screen shot of historical interaction data 180 retrieved by the application. The retrieved data may include, for example, a list of inbound and outbound interactions (e.g. voice calls, emails, chats, surveys, and the like), stored in, for example, one or more databases in the mass storage device. The interactions may or may not have been initiated using the application. For example, the historical interaction data may include a call made to the contact center using a traditional telephone, or emails or text messages to and from contact center agents outside of the application. The interaction information (e.g. date, time, subject, resolution, and the like) is stored in the mass storage device and may be retrieved in response to the user actuation of the history option 104. FIGS. 6B-6C are screen shots of details of particular historical interactions when such interactions are selected from the list displayed on the screen of FIG. 6A.

Figure 7B:
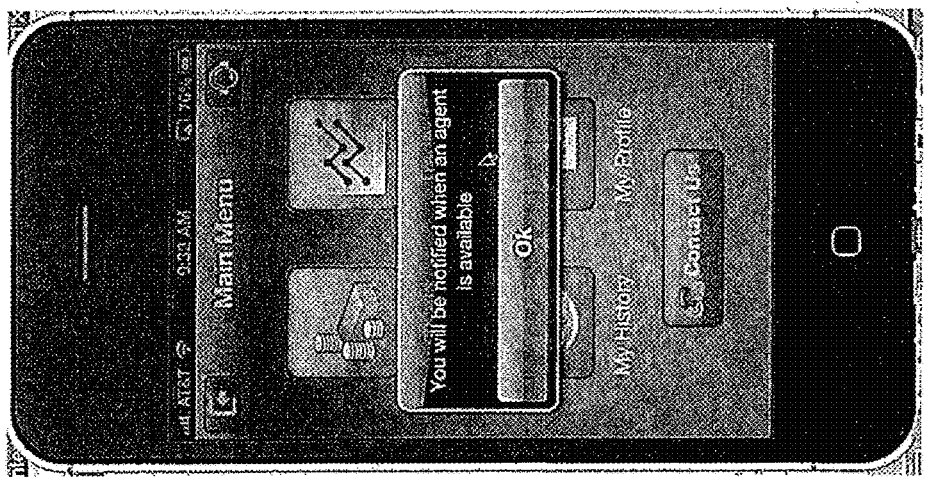
FIG. 7A-7C are exemplary screen shots of notifications to a customer in regards to agent availability according to one embodiment of the invention.
Figure 7A:
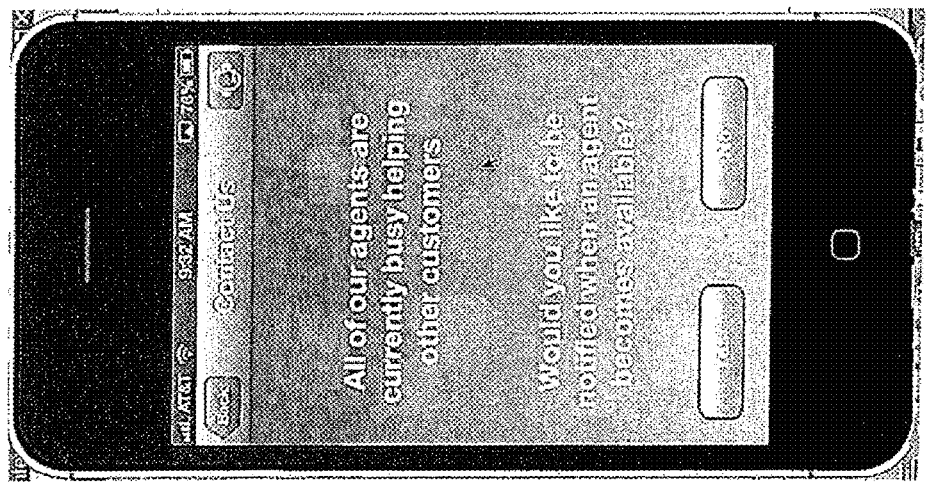

According to one embodiment, if a customer transmits a request for a real time interaction with an agent, such as, for example, voice call or chat, by selecting the appropriate option from the screen displayed in FIG. 3B, the routing server 20 attempts to find an available agent to handle the interaction. If the routing server 20 determines that there are no available agents to respond to the call, it may invoke the mobile server system to transmit to the customer application 50 a message indicating that no agents are available, and further inquiring if the user would like to be notified when an agent becomes available. FIG. 7A is an exemplary screen shot of this notification. In response to selecting "Yes," a notification is pushed to the end user device confirming that the user will be notified when an agent is available. FIG. 7B is an exemplary screen shot of this later notification. In this manner, the user need not remain on the call waiting to be connected to an agent. According to one embodiment, the mobile server system 26 stores the context data for the connection request and waits for an agent to become available to make the connection.

Figure 7E:
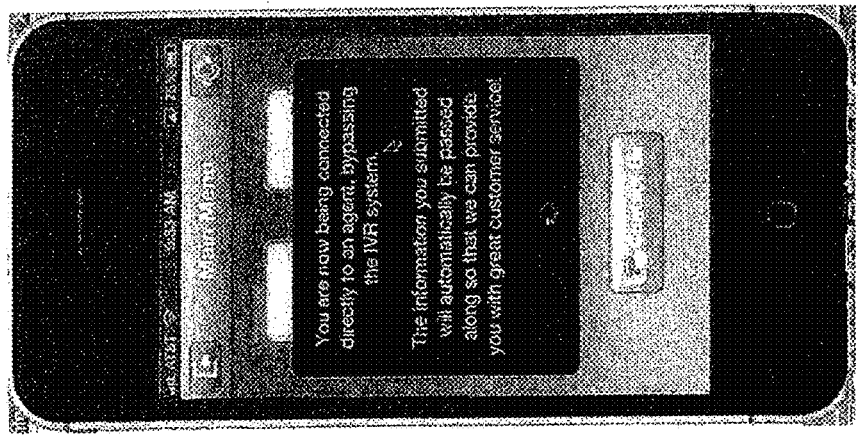
FIG. 7E is an exemplary screen shot of a notification provided to the user that an interactive voice response server is being bypassed according to one embodiment of the invention.

According to one embodiment, once an agent is available, the information of the available agent is provided by the statistics server 22 to the routing server 20. The routing server 20 informs the mobile server system 26 that a connection is now possible. According to one embodiment, the mobile server system 26 causes a notification to be pushed to the user's end user device inquiring whether the user wants to engage in communication with the agent. FIG. 7C is an exemplary screen shot of such a notification according to one embodiment of the invention.

If the user wants to engage in communication, he or she selects a call now option 182. Upon receipt of the call request, the mobile server system 26 may, according to one embodiment, identify the end user device's current location and retrieve an access number to push to the user. Other criteria may also be used to select the appropriate access number to push to the user, such as, for example, subject of the call, agent availability, and the like. For example, one access number may be allocated for all calls relating to mortgage inquiries, while another access number may be allocated for all calls relating to credit card accounts.

Figure 7D:
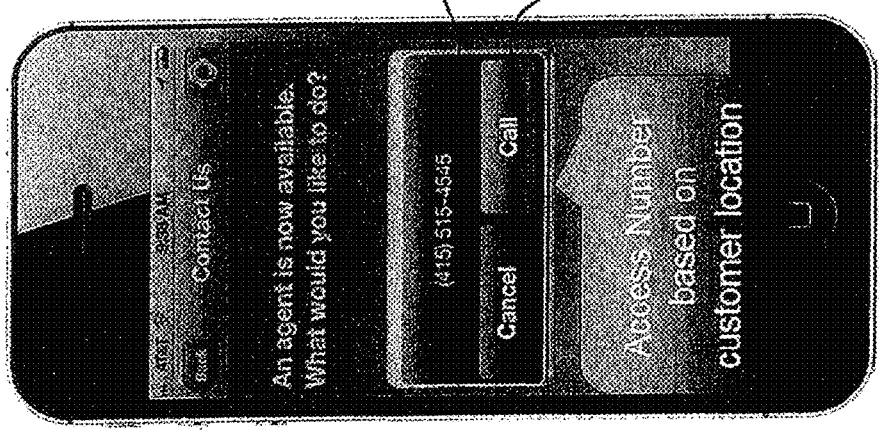
FIG. 7D is a screen shot of an access number that is pushed to a user based on a user's location according to one embodiment of the invention.
Figure 7C:
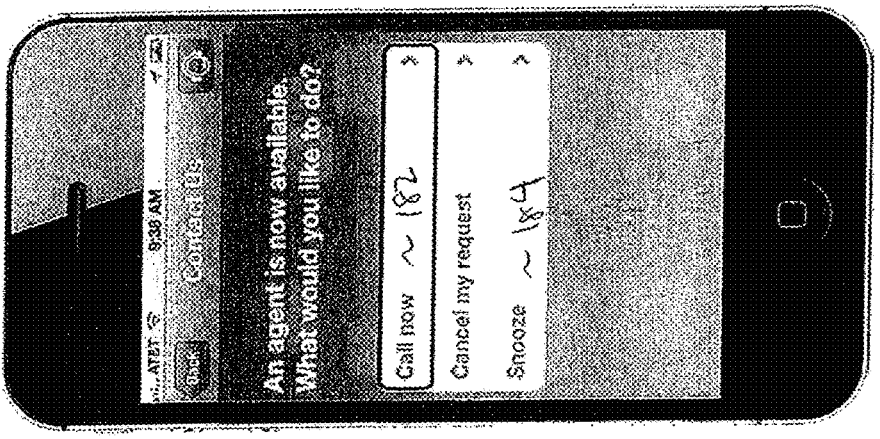

FIG. 7D is a screen shot of an access number 190 that is pushed to the user based on the user's location. The user actuates a call option 192 to initiate a call to the pushed access number. According to one embodiment, once the call is received by the contact center switch/media gateway 12 and forwarded to the or routing server 20 for routing, the routing server is configured to request the mobile server system 26 for the context data that may be matched to the voice call, for providing context and authentication information to the routing server 20. Thus, in some embodiments, the customer may be connected directly to the agent without authentication via the IVR server 34.

FIG. 7E is an exemplary screen shot of a notification provided to the user that the IVR server is being bypassed according to one embodiment of the invention.

Referring again to FIG. 7C, if the customer would like to talk with the agent at a later time, selection of a snooze option 184 causes the application to inquire the customer at a preset later time whether a connection is desired at that point. According to one embodiment, the snooze selection may be synched with contact center service time or even individual agent schedule, and reserve an agent in-time. If no agent is reserved, the customer may be put on "fast track" (e.g. move to top of the queue) when the call is received in order to have it served by one of the agents in a pool. If there is some waiting time, a dedicated message could be played. If the (scheduled) call is supposed to be initiated by the call center, it could be dialed in any of the supported outbound dialing modes (e.g. preview, progressive or predictive).

According to one embodiment, a customer may invoke the customer application 50 to submit inquiries or service requests to the contact center. For example, if in reviewing the customer's credit card transactions the customer identifies a transaction that he would like to dispute, the application allows the user to submit a dispute without leaving the application. In another example, if the customer wants to submit a stock trade request, he or she may also do so directly from the application.

Figure 8B:
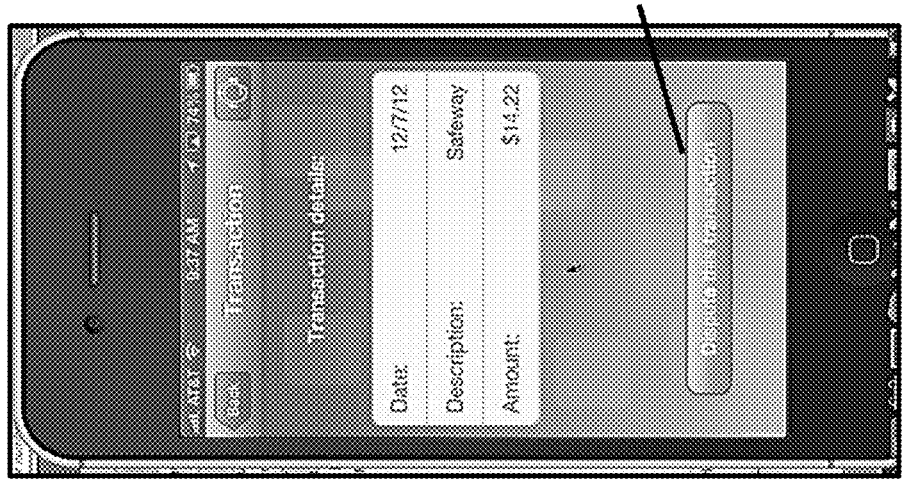
FIGS. 8A-8D are screen shots displayed by a customer application for reviewing and disputing a credit card transaction according to one embodiment of the invention.
Figure 8A:
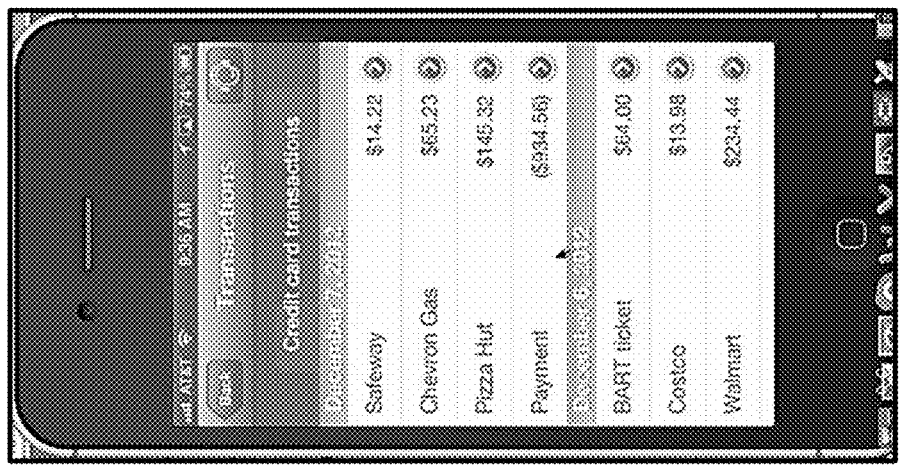

FIG. 8A is a screen shot displaying credit card transactions for the customer upon selecting the accounts option 100 from FIG. 2. If the user identifies a questionable transaction, he may select the transaction for viewing further details.

FIG. 8B is a screen shot displaying transaction details for a selected transaction. In the illustrated example, a "dispute this transaction" option 200 is provided if the customer would like to dispute the transaction that is displayed.

Figures 8C, 8D:
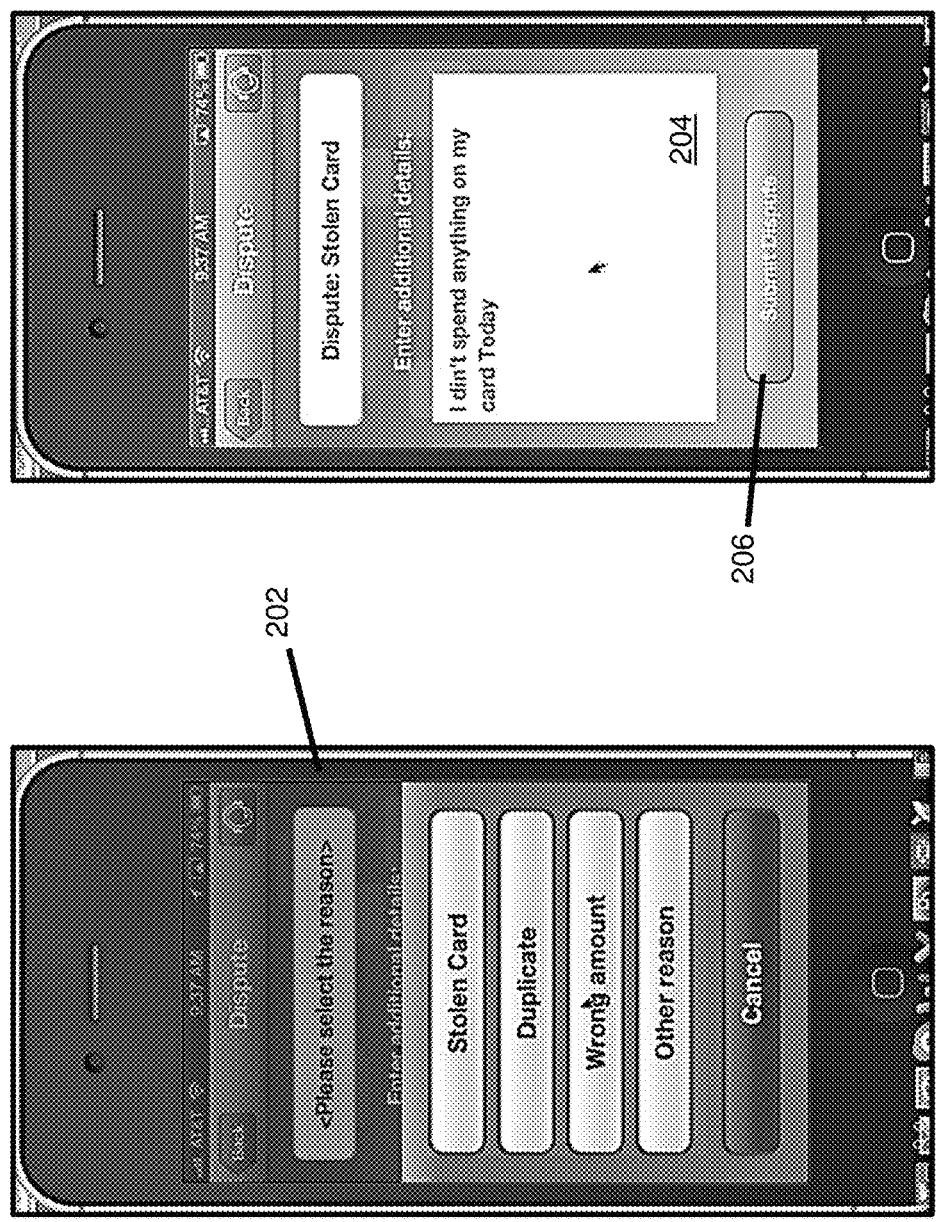

Upon actuation of the "dispute this transaction" option, the application displays a screen with options for inputting a reason for the dispute as well as any additional details. FIG. 8C is a screen shot of various options that are relevant to credit card disputes that are provided for selection by the customer for entering into a "reasons" area 202. FIG. 8D is a screen shot of an area for entering additional details about the dispute 204. Actuation of a submit option 206 causes the application to package the dispute data and transmit a dispute request to the mobile server system 26.

Figure 8E:
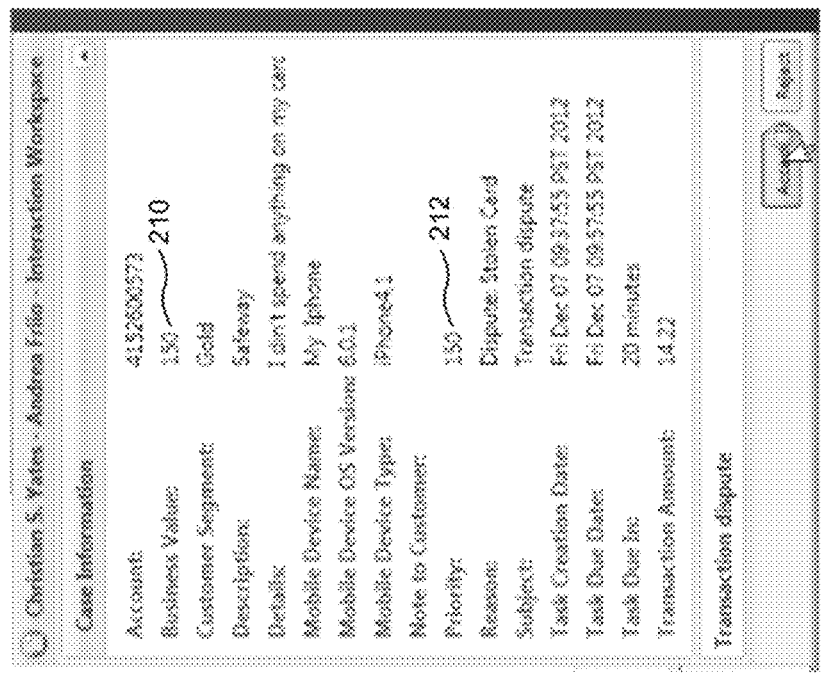
FIG. 8E is a screen shot of a screen display on an agent's desktop displaying case information for a transaction dispute according to one embodiment of the invention.

According to one embodiment, the mobile server system 26 receives the dispute request and works in conjunction with, for example, the routing server 20, for creating an interaction to be routed to an agent. As depicted in FIG. 8E, according to one embodiment, the interaction is assigned a business value 210 as well as a priority value 212. The business value for the transaction may be based, for example, on the communication medium in which the interaction was received, customer profile data, service level agreements (SLA), subject of the transaction, and the like.

For example, a transaction dispute by a customer with a gold label which is sent using the customer application 50 may be assigned a business value that may be different than the business value of an inquiry by the same customer via email.

According to one embodiment, the mobile server system interacts with an interaction server, and from the interaction server an intelligent workload distribution system (iWD) may be invoked for assigning interactions to agents. According to one embodiment, the iWD system is configured to access rules provided by a rules engine for assigning, for instance, a priority to the interaction. The iWD system returns the interaction back to the interaction server and passes it to the routing server for finally routing the interaction to an agent.

According to one embodiment, the interaction is queued for routing and priority is assigned to the interaction based, on for example, the business value. According to one embodiment, if the interaction is not served within a time frame set by the SLA associated with the assigned business value, the priority of the interaction may be dynamically increased. In this manner, important interactions (as determined by the business value) are configured to be served before less important interactions. Thus, according to one embodiment, business values 210 are static while priority values 212 may change dynamically.

Figure 9C:
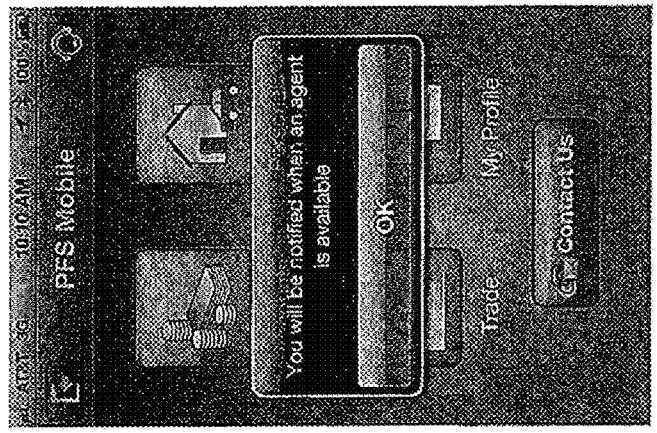
FIGS. 9B and 9C are screen shots of exemplary notifications provided to a customer if an agent is not available to handle the request of FIG. 9A according to one embodiment of the invention.
Figure 9B:
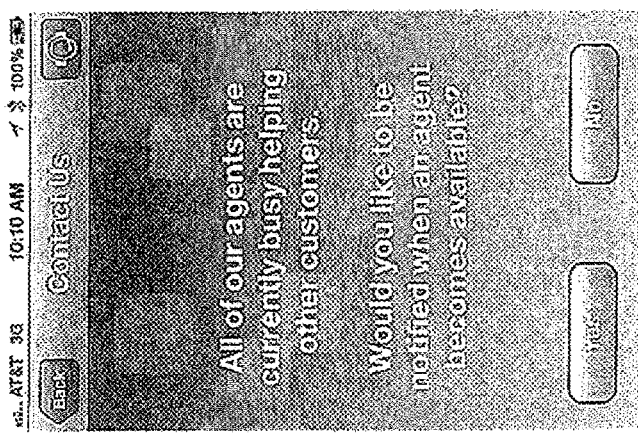
Figure 9A:
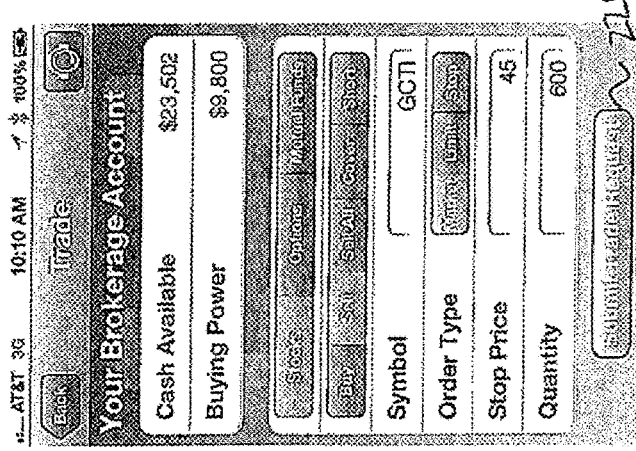
FIG. 9A is a screen shot of an interface provided by a customer application upon selection of a trade option for submitting a stock trade request to an agent according to one embodiment of the invention.

FIG. 9A is a screen shot of an interface provided by the customer application 50 upon selection of a trade option 102 (FIG. 2), for submitting a stock trade request to an agent according to one embodiment of the invention. Actuating a trade request option 220 causes the application to package trade details submitted to the application by the user, and transmit a trade request to the mobile server system 26.

The mobile server system 26 receives the trade request and routes the request to an available agent. If an agent is not available, the user is informed of this fact and asked if he would like to receive a notification when the agent is available, as is exemplified via the screen shots of FIGS. 9B and 9C.

According to one embodiment, the customer application 50 provides users various communication mechanisms other than voice calls or chats as is exemplified via the screen shot of FIG. 3B. For example, the customer may select the option to receive a call (callback option) 114 if the customer would rather receive the call from the agent instead of initiating the call from the end user device. If such a request is made, the request is routed to an agent who then initiates an outbound call to the end user device. According to one embodiment, if a connection is not made, the mobile server system 26 pushes a notification to the end user device that an agent has unsuccessfully attempted the call.

Figure 10B:
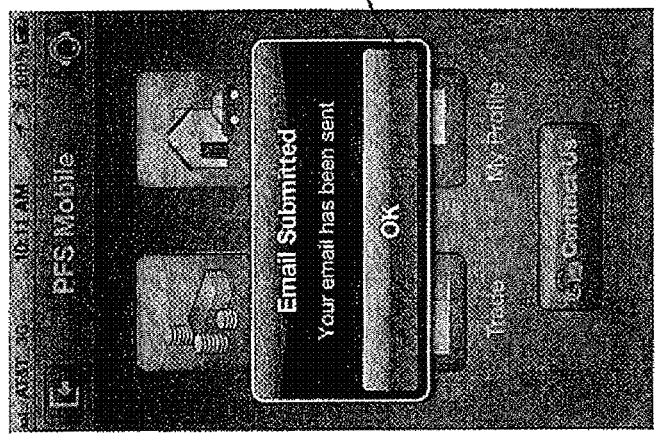
FIG. 10B is an exemplary push notification that is displayed upon actuation of a send button in FIG. 10A according to one embodiment of the invention.
Figure 10A:
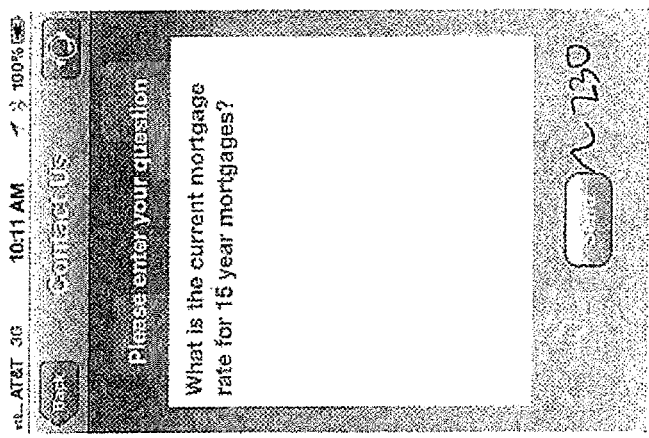
FIG. 10A is a screen shot of a screen for entering text of an email message according to one embodiment of the invention.

Referring again to FIG. 3B, the customer may also select the option to send an email 118. The application allows the customer to draft and send the email without invoking a separate email application, and without requiring the user to enter a specific email address for the contact center. FIG. 10A is a screen shot of a screen for entering the text of an email message according to one embodiment of the invention. Actuation of a send button 230 causes the application to package and transmit the data as an email to the contact center. FIG. 10B is an exemplary push notification 232 that is displayed upon actuation of the send button 230.

Figure 10C:
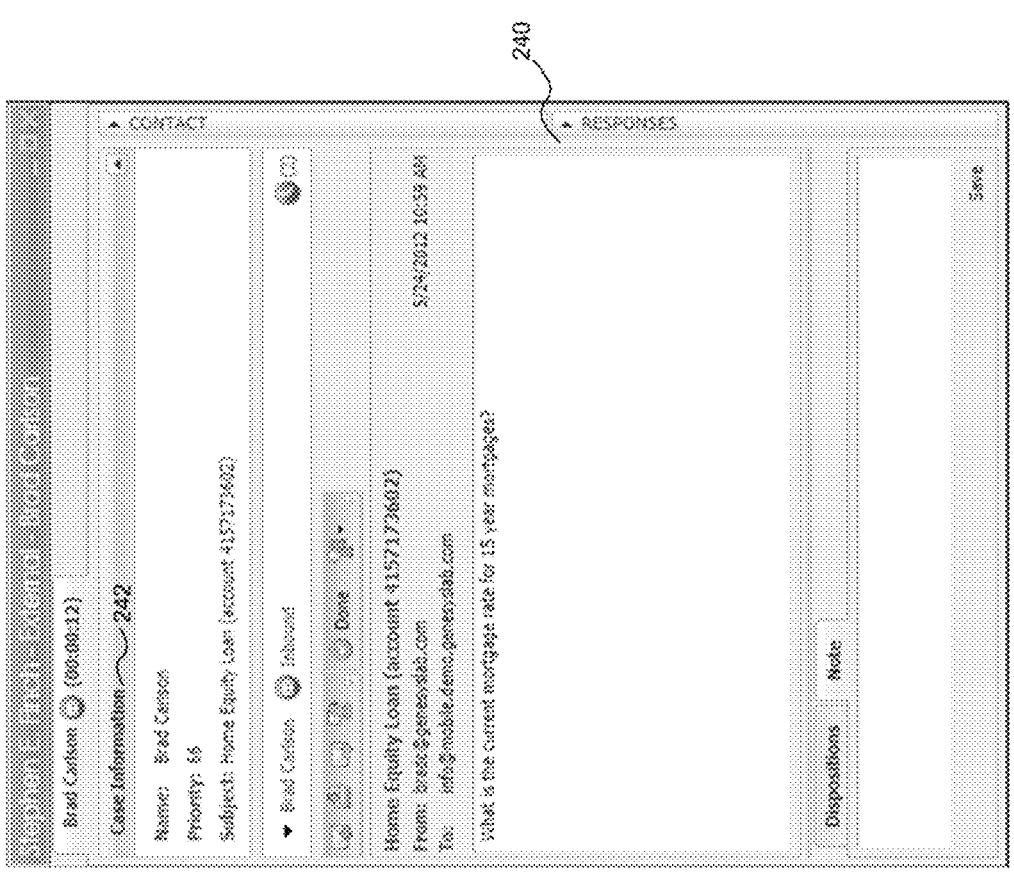
FIG. 10C is a screen shot of an agent's desktop displaying an email transmitted by a customer using a customer application according to one embodiment of the invention.

FIG. 10C is a screen shot of the agent's desktop displaying an email 240 transmitted by a customer using the customer application 50. The email includes contextual data 242 providing information such as, the name of the customer and a place in the application that the customer had invoked when transmitting the email.

Figures 11A, 11B:
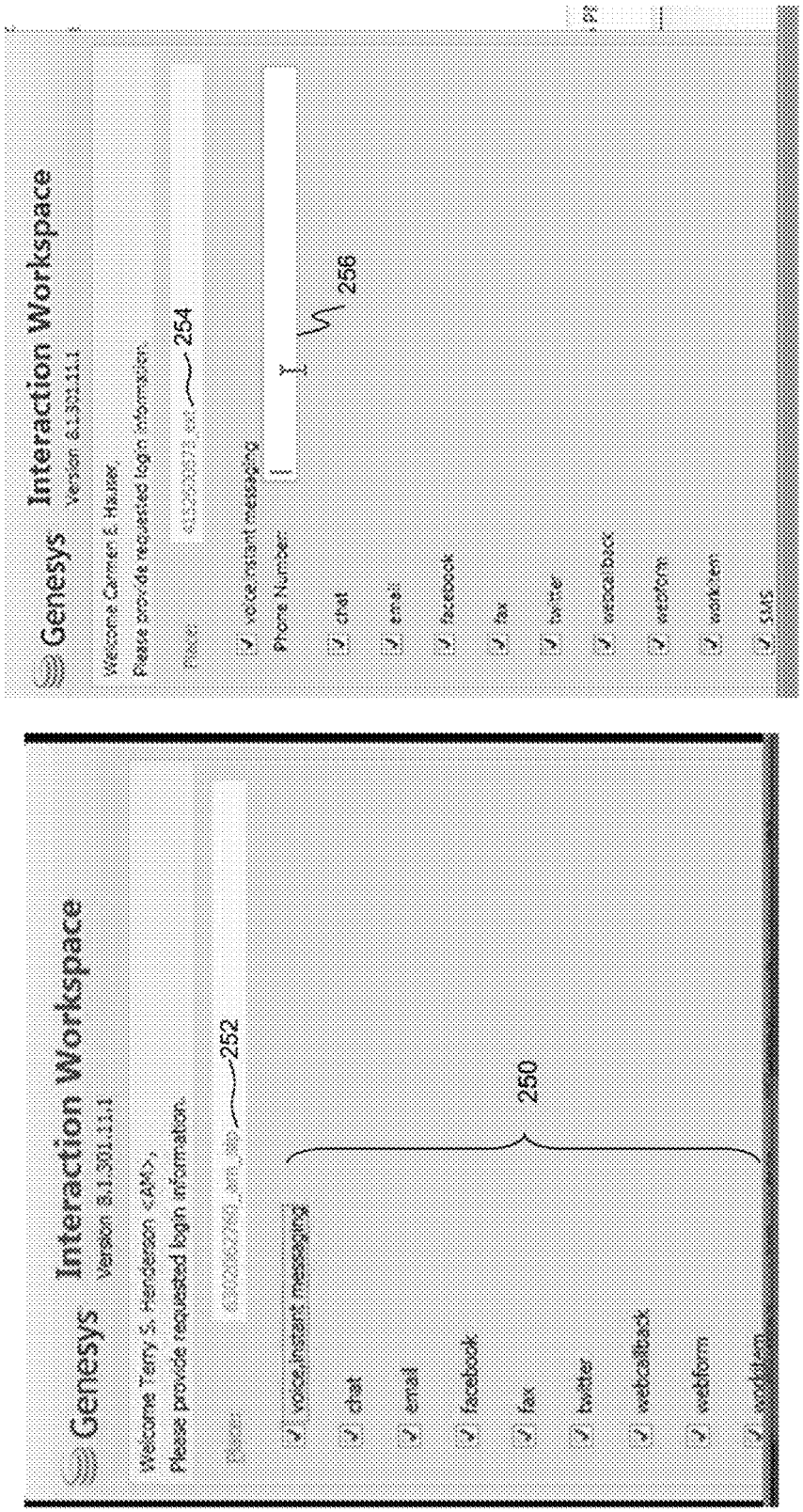
FIGS. 11A-11B are exemplary screen shots of a display provided to an agent device for logging into a contact center according to one embodiment of the invention.

FIGS. 11A-11B are exemplary screen shots of a display provided to an agent device 38 for logging into the contact center according to one embodiment of the invention. The agent may enable various communication channels 250 with which the agent may interact with a customer. The type of communication device to be utilized by the agent may be determined, for example, via a login ID 252 of the agent. The login ID may be, for example a phone number. In the example of FIG. 11A, the agent's login information corresponds to the agent's SIP phone. According to one embodiment, more secure policies may be applied. Also, the agent desktop may be implemented as a web application, and in this case, the device that the agent is using for access may not be important. GUI security features may also be incorporated, such as, for example, inactivity time out, to close the GUI and require re-authentication to resume. An inactivity timeout may also be implemented for the customer application 50 in a similar manner for similar reasons.

According to one embodiment, if the agent would like calls to be routed to an external phone, he may indicate so via a different login ID 254. In the example of FIG. 11B, an extension "ext" in the login ID indicates that the agent would like to specify an external phone number. Any phone number may then be entered in a "phone number" area 256 as depicted in FIG. 11B. This allows the agent to work remotely from any location and have calls directed to the remote location.

III. Customer Care Mobile App

According to one embodiment, a customer application 50 that may be loaded onto a end user device is a customer care application which may provide, among other things, technical support for a user. According to one embodiment, the application is initially configured with the user's settings.

Figure 12:
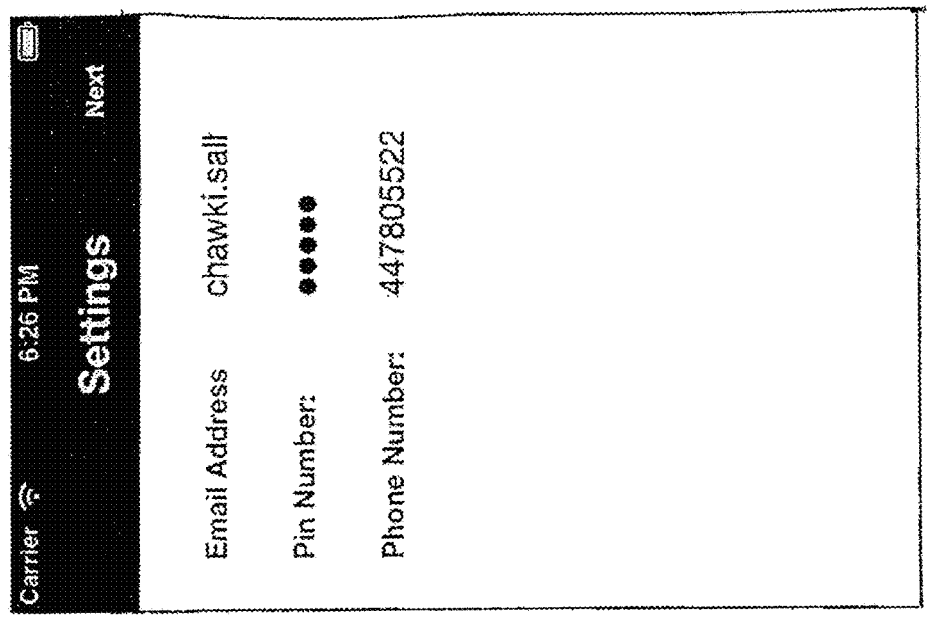
FIG. 12 is an exemplary screen shot of a settings page provided by a customer application for registering a user with the associated contact center system according to one embodiment of the invention.

FIG. 12 is an exemplary screen shot of a settings page provided by the customer application 50 for registering a user with the associated contact center system according to one embodiment of the invention. According to one embodiment, as part of the registration process, the user enters via the settings page, personal information for the user such as, for example, the user's email address, pin number, and telephone number. At least part of this information is used by the contact center system for authenticating the user. Of course, embodiments of the invention are not limited to the information displayed on FIG. 12, but may include other information such as, for example, an account number, password, address, birthdate, or the like. After entering the user's personal information and selecting a "next" option causes the customer application 50 to submit the information to the mobile server system 26. The mobile server system 26 in turn communicates with associated database servers for generating and/or updating an associated customer record with the submitted information.

After registering the user, the customer application 50 may be invoked for accessing various customer support features. Although hereinafter it is assumed that the customer support provided via the customer application 50 is IT technical support provided in response to service requests, a person of skill in the art should recognize that other types of customer support may be invoked, and embodiments of the invention are not limited to providing technical support via service requests.

Figure 13:
FIG. 13 is an exemplary screen shot of a home screen displayed to a registered user upon invoking a customer application according to one embodiment of the invention.

FIG. 13 is an exemplary screen shot of a home screen displayed to a registered user upon invoking the customer application 50 according to one embodiment of the invention. The home screen provides access to the user's service requests, news and events, and contact center agents.

FIGS. 14A-14G are screen shots for viewing and/or taking action with respect to service requests submitted by the user according to one embodiment of the invention. In this regard, the customer application 50 detects selection of a "service requests" option 260 from the home screen displayed in FIG. 13. In response to the user selection, the customer application 50 generates and transmits a query (e.g. an HTTP request) to the mobile server system 26 over the communication network 14. The mobile server system 26 processes the query and transmits an associated message (e.g. another HTTP request) to a contact center resource (e.g. routing server 20). The mobile server system 26 may also retrieve information from a SR database maintained in a mass storage device coupled to the mobile server system 26. The SR database may store, for example, details, status, and activities associated with service requests handled by the contact center. Information from various contact center resources is forwarded to the mobile server system 26 for transmitting to the appropriate end user device.

Figures 14A, 14B:
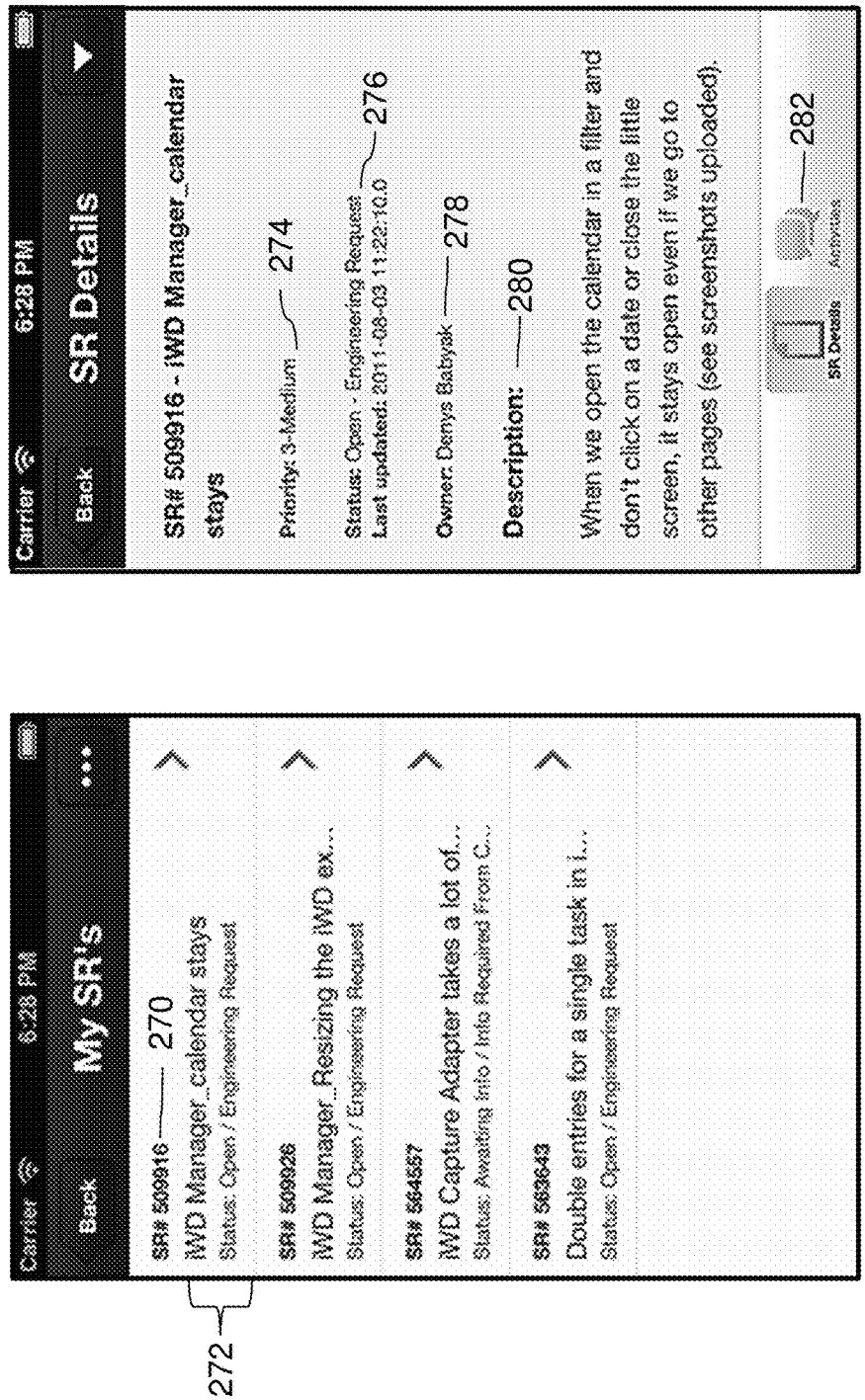
FIGS. 14A-14G are screen shots for viewing and/or taking action with respect to service requests submitted by a user according to one embodiment of the invention.

FIG. 14A is a screen shot of a list of service requests submitted by the user according to one embodiment of the invention. The list provides, for example, brief information about the service requests, such as, for example, a service request identifier (SR#) 270, and title and status 272 of the service request. The information is stored, for example, in the SR database maintained by the mobile server system.

FIG. 14B is a screen shot of details of a service request selected from the list of service requests in FIG. 14A. According to one embodiment, the service request details include additional data about the selected service request in addition to the service request identifier, and title and status of the service request. For example, the service request details include a priority 274 assigned to the service request, a date 276 in which it was last updated, an owner of the service request 278, a description of the reason for the service request 280, and/or the like. The owner of the service request may be an engineer, knowledge worker, or another party/entity/group to which the service request was assigned and which is now responsible for the service request. Selection of an "activities" option 282 causes retrieval and display of activities that have taken place with respect to the particular service request.

Figures 14C, 14D:
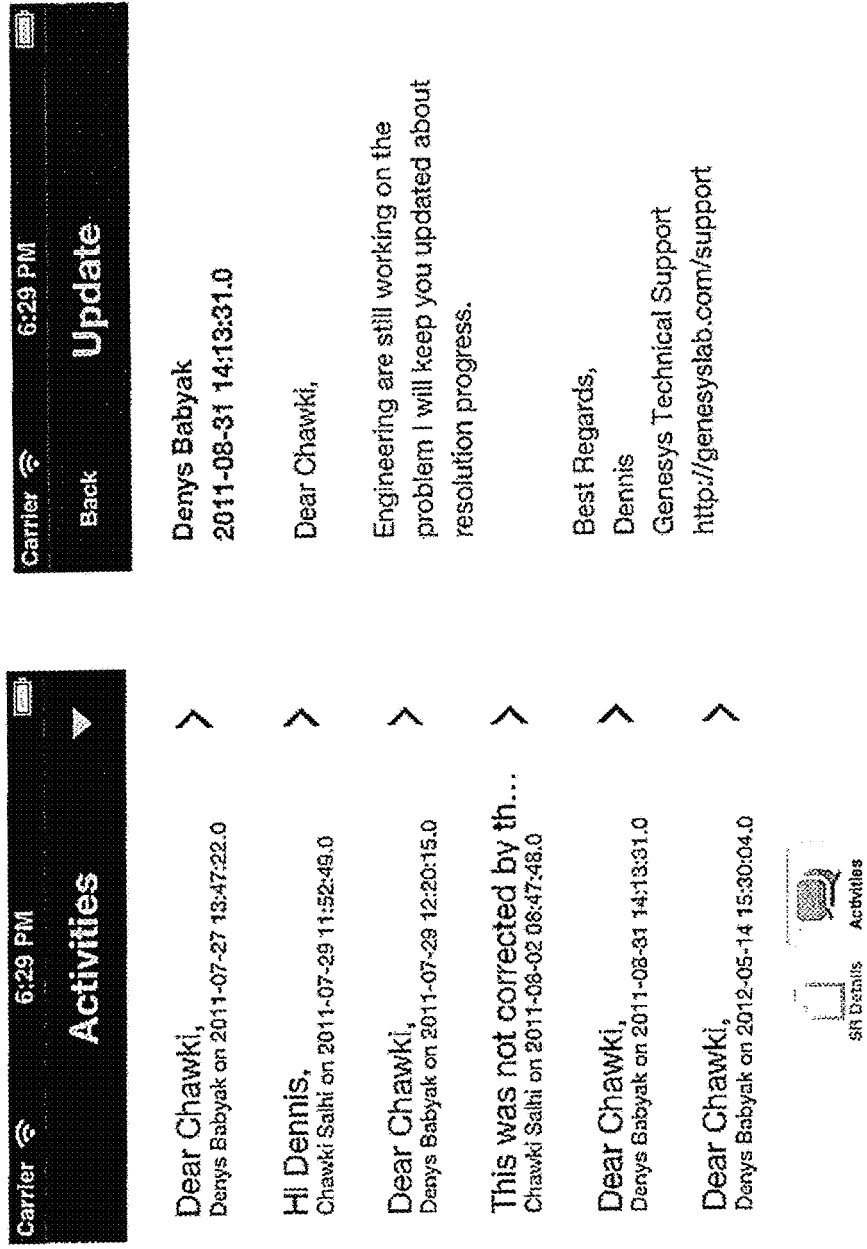

FIG. 14C is a screen shot of a list of activities associated with the particular service request according to one embodiment of the invention. The listed activities may be, for example, emails, phone calls, chat sessions, social media message, and other voice and non-voice interactions between a customer and a contact center resource (e.g. engineer, agent, and the like). Details a particular interaction may be displayed upon selection of the interaction from the list.

FIG. 14D is a screen shot of details of an email interaction between a customer and a contact center engineer for a particular service request.

According to one embodiment, a user of the end user device may, when viewing information about a particular service request, make a request with respect to the service request.

Figure 14F:
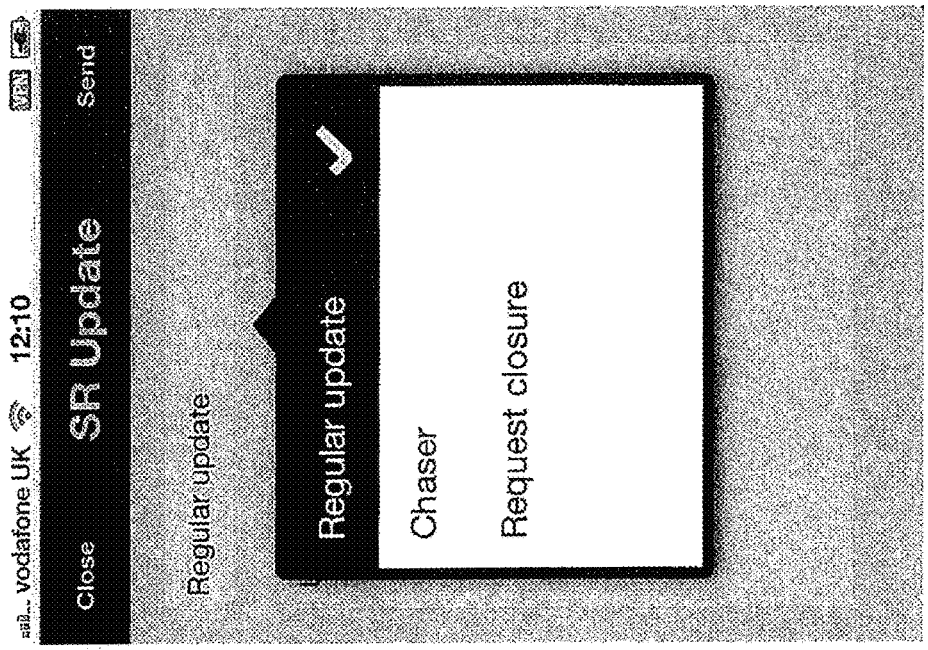
Figure 14E:
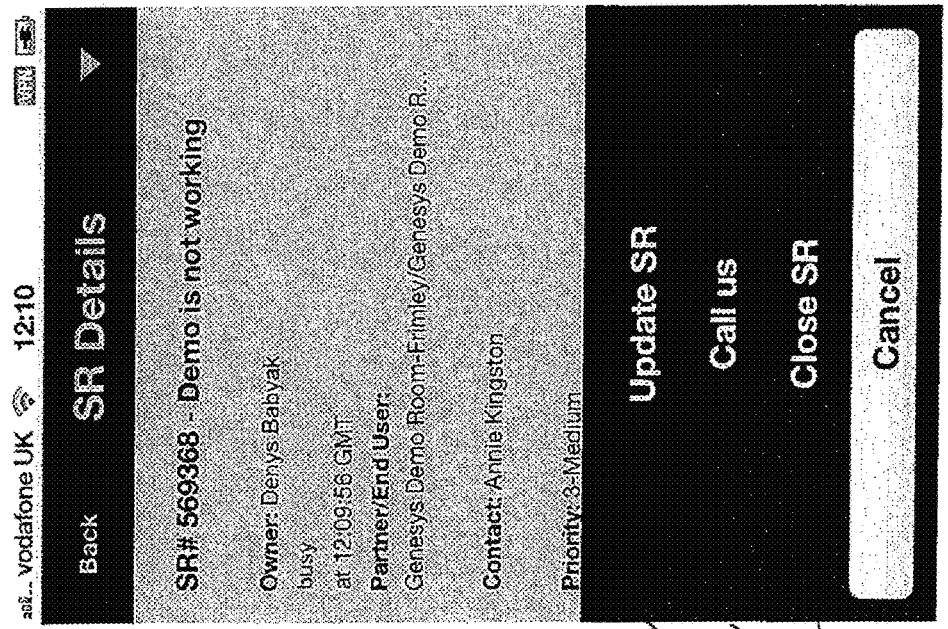

FIG. 14E is a screen shot of a screen popup providing various requests that a user may make with respect to a particular service request that is being viewed. The options include, but are not limited to a request to update the service request 290, make a call 292, or close the particular service request 294.

FIG. 14F is a screen shot of a screen popup by the end user device upon selecting the option to update the service request 290 according to one embodiment of the invention. According to one embodiment, the user of the end user device may select a regular update option for providing a regular update for the service request. The user may also select a chaser update for the service request. The user may further select a request for closure of the service request if a particular issue has been resolved.

Figure 14G:
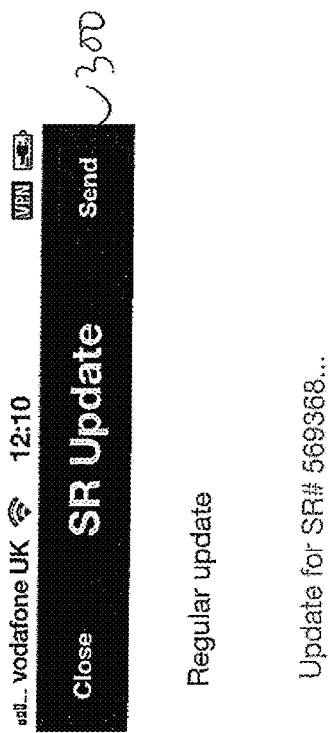

FIG. 14G is a screen shot of a display by the customer application 50 upon selecting the regular update option of FIG. 14F. Selection of a "send" option 300 causes packaging and transmitting to the mobile server system 26, the particular service request data, the user data (e.g. user authentication information, location information, and the like), and other contextual data for requesting a normal update for the identified service request. According to one embodiment, the request is forwarded to the notification module 56 of the mobile server system 26. According to one embodiment, the notification module 56 is configured to monitor the SR database for updates for the identified service request, and generate notifications to the requesting customer application 50.

Referring again to FIG. 14E, selection of the "call us" interaction option 292 causes the customer application 50 to make a request, over the communication network, to conduct a voice call with the contact center in regards to a particular service request. According to one embodiment, in response to receiving the request, the access number distribution module 54 retrieves and temporarily assigns a number to the current session and forwards the number to the customer application 50 for use to make an inbound call. The number may be, for example, a local number selected based on the customer's current geographic location.

According to one embodiment, the customer application 50 may be configured to initiate a mobile phone call to the assigned number. According to one embodiment, agent availability is verified first before making the call. In this regard, the routing server 20 is configured to determine, based on information provided by the statistics server 22, whether the owner of the service request (e.g. agent at the contact center assigned to service the request) is available to receive the call. According to one embodiment, instead of initiating a call, the user of the end user device may also transmit a request to receive a call from the contact center. Of course, other types of interactions may also be requested in response to actuating an appropriate interaction option, such as, for example, a real time text based chat, email, and the like. The availability of one or more of these interactions may depend, for example, on customer segment data (e.g. gold, silver, or bronze).

Figures 15A, 15B:
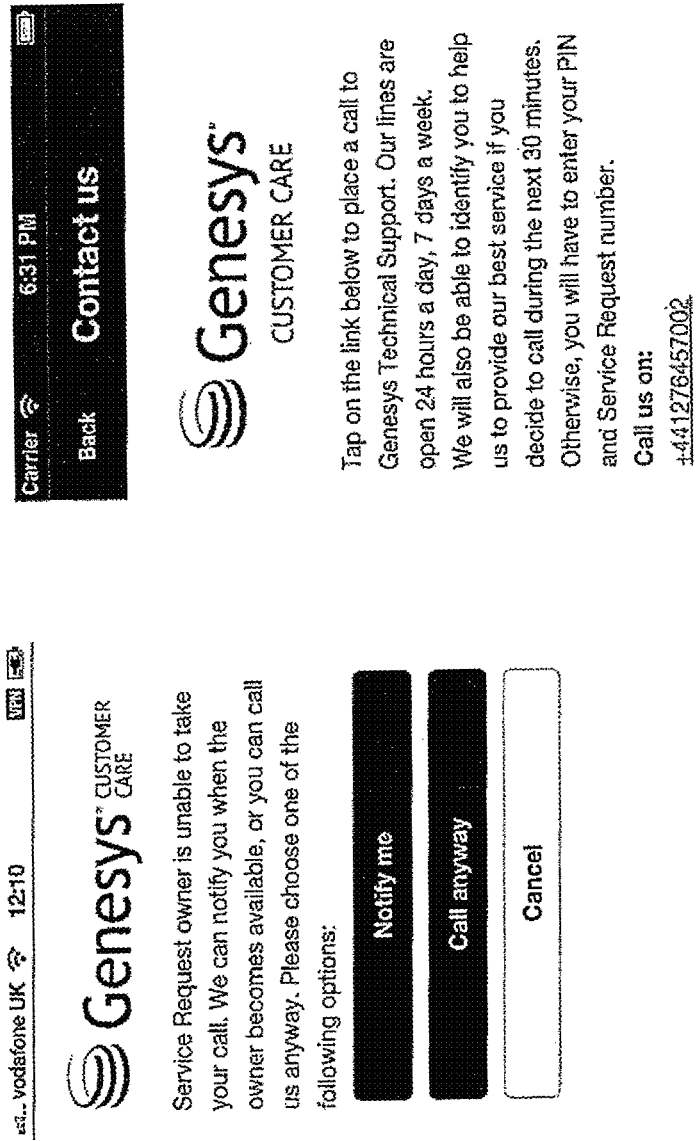
FIG. 15A is a screen shot of a message displayed by a customer application in response to determining that an owner of a service request is not available to receive a call from the customer according to one embodiment of the invention.
FIG. 15B is a screen shot of a message displayed by a customer application in response to the customer selecting a contact us option from the home screen displayed in FIG. 13 according to one embodiment of the invention.

FIG. 15A is a screen shot of a message displayed by the customer application 50 in response to determining that an owner of a service request is not available to receive a call from the customer. According to one embodiment, the customer may request to be notified when the agent becomes available. Of course, the customer may decide to call anyway. In this case, the customer is routed to another agent that has a skill set similar to the owner of the service request.

FIG. 15B is a screen shot of a message displayed by the customer application 50 in response to the customer selecting a contact us option 262 from the home screen displayed in FIG. 13. According to one embodiment, the telephone number provided to the user is selected by the access number distribution module 54 in the mobile server system 26 based on, for example, the user's geographic location.

Figure 16B:
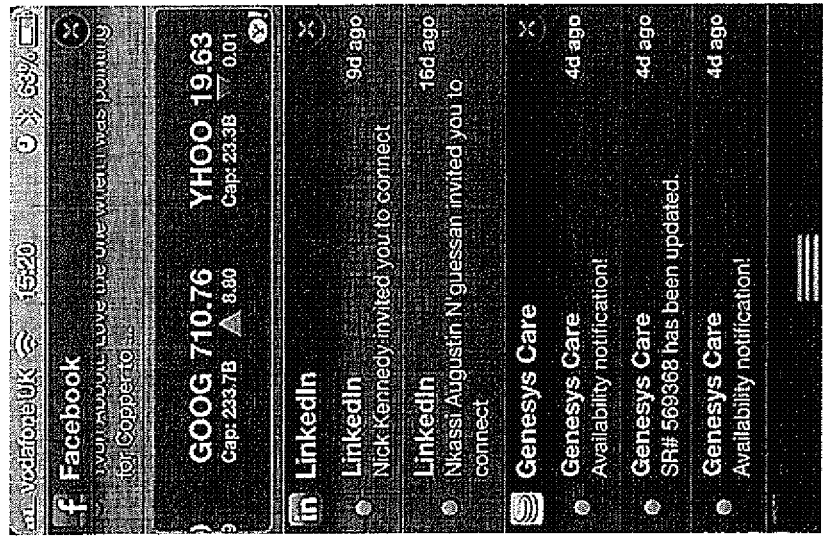
FIG. 16B is a screen shot of other push notifications that may be provided by a notification module according to one embodiment of the invention.
Figure 16A:
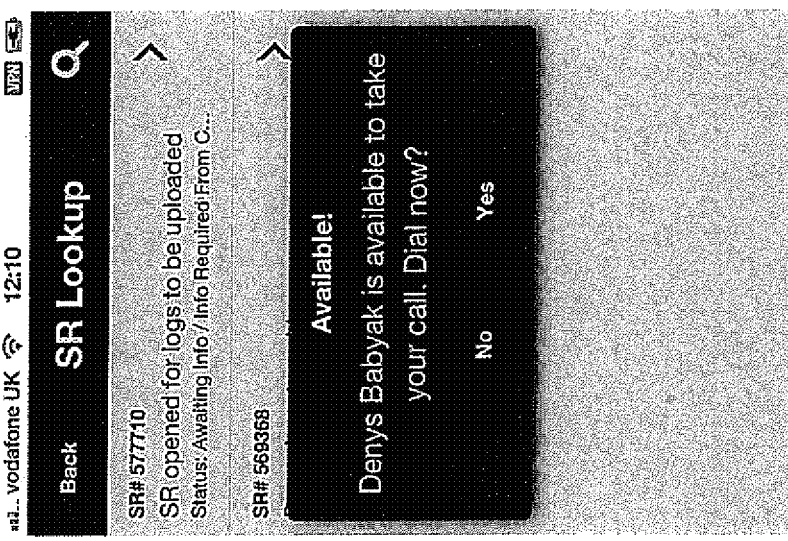
FIG. 16A is a screen shot of a notification provided by a notification module and displayed on a customer's end user device as a push notification once an agent is recognized to be available according to one embodiment of the invention.

FIG. 16A is a screen shot of a notification provided by the notification module 56 (FIG. 2) and displayed on the customer's end user device as a push notification once an agent is recognized to be available. The user may, upon receipt of the push notification, initiate the voice call or wait to call at a later time. According to one embodiment, if the user decides to initiate the call, the secure call matching module 58 is configured to automatically match the inbound voice call with the temporarily stored contextual data for the customer application 50. According to one embodiment, the inbound voice call is transmitted with a secure token assigned to the customer application 50 for the current session, allowing security in the matching of the voice call with the contextual data. The matching of the voice call with the contextual data allows the user to bypass the IVR server. Thus, the user need not waste time manually entering the contextual data for the call, such as, for example, manually entering the service request ID to which the call relates.

FIG. 16B is a screen shot of other push notifications that may be provided by the notification module 56 according to one embodiment of the invention. According to one embodiment, notifications relating to status of service requests are pushed to the end user device based on customer preference settings. For example, notifications may be pushed to the customer's end user device whenever the SR database is updated with status information for particular service requests. According to one embodiment, once the user opens a notification, the customer application 50 is configured to access the SR database for retrieving details of the service request including the updated status information. In this manner, the user has up-to-date information on the status of service requests via the end user device.

Figure 17A:
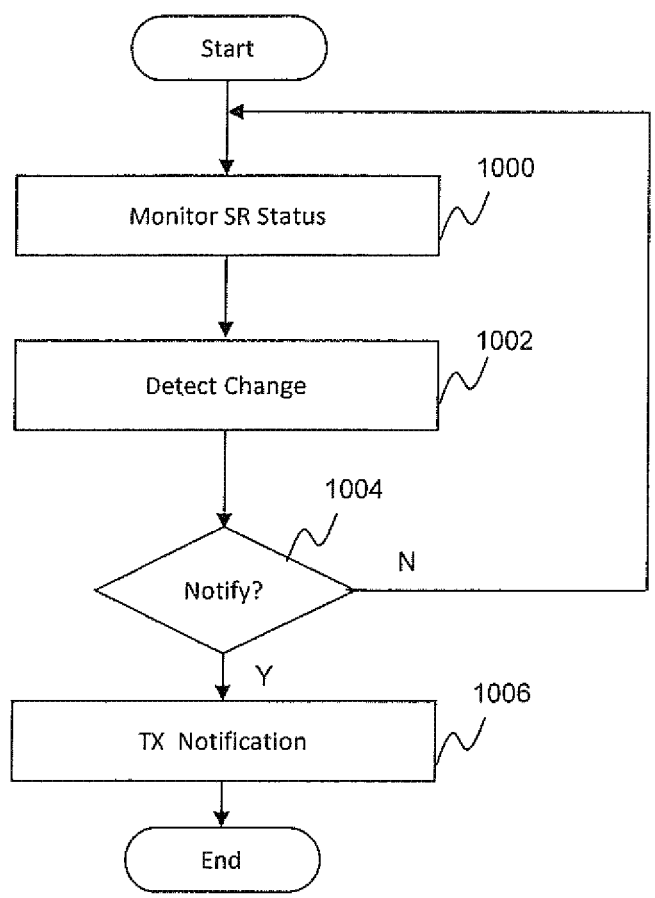
FIG. 17A is a flow diagram of a process for monitoring and transmitting notifications in regards to service requests according to one embodiment of the invention.

FIG. 17A is a flow diagram of a process for monitoring and transmitting notifications in regards to service requests according to one embodiment of the invention.

In step 1000, the notification module 56 monitors status of one or more service requests stored in the SR database.

In step 1002, the notification module detects change in the status of the monitored service request.

In step 1004, a determination is made as to whether the associated customer should be notified of the status change. In this regard, the notification module determines whether the service request to which the update relates is one for which the customer has submitted a subscription for notification. According to one embodiment, the customer may subscribe to receive automatic notifications when the service request is submitted. According to one embodiment, the service request may be submitted via the web, via the customer application 50, via email, over the phone by calling the contact center, or any other mechanism conventional in the art.

If the answer is YES, the notification module forwards the notification to the end user device in step 1006. According to one embodiment of the invention, the notification is transmitted as a push notification by engaging the appropriate push notification service for the end user device. The notification may include, for example, identification of the service request, identification of the end user device to whom the notification is to be sent, and/or any other data related to the service request. Although push notification is used as an example of a type of notification that may be sent to the end user device, a person of skill in the art should recognize that embodiments of the present invention are not limited to push notifications, and any other type of notification conventional in the art may be employed for notifying a user that there has been an update in the status of a service request, such as, for example, via an asynchronous servlet, text (via a short messaging service), email, messages displayed on the customer application 50, and the like. For example, a number, text, graphics, color, or any other insignia may be displayed on or next to the icon representing the customer application 50 for identifying a number of status updates waiting to be retrieved. The updates are retrieved when the user selects the application and the application pulls the updates from the SR database.

Figure 17B:
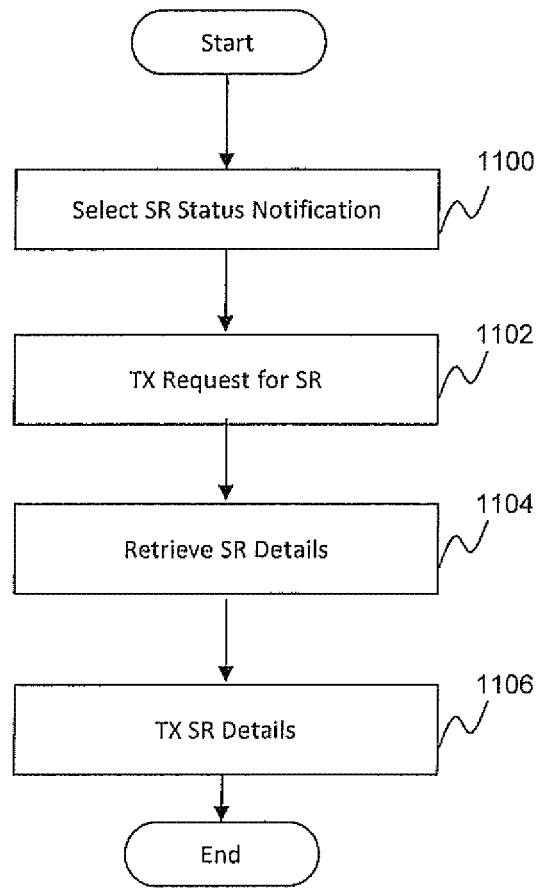
FIG. 17B is a diagram of a process for viewing a status update of a service request in response to a push notification according to one embodiment of the invention.

FIG. 17B is a diagram of a process for viewing the status update of a service request in response to a push notification according to one embodiment of the invention.

In step 1100, the end user device displays via push notification that a service request has been updated, and in response, the user selects the displayed push notification. Selection of the push notification invokes the customer application 50, and in step 1102, causes the customer application to automatically transmit a request (e.g. an HTTP request) to the mobile server 26 for details on the particular service request.

In step 1104, the mobile server system 26 receives the request and in response, retrieves the requested data from the SR database.

In step 1106, the mobile server system 26 transmits the service request details to the end user device for display. The display may be, for example, similar to the display of FIG. 14B.

According to one embodiment, in addition to invoking the customer application 50 for viewing details for service requests, the customer application may also be invoked for preparing and submitting the actual service requests and/or other forms. The service request may be, for example, a request to fix a problem or answer a question, as well as a request for a product change. The forms may be, for example, customer survey forms.

According to on embodiment, the mobile server system and/or another server in the contact center may be configured to monitor whether a service request complies with a service level agreement. For example, a determination may be made whether the service request is assigned to an appropriate agent within a preset time period. According to one embodiment, the customer application 50 may be configured to visually depict a level of compliance and/or key performance indicator (KPI) values via a visual indicator. For example, a yellow flag may be displayed if the time period allotted for assigning the service request is about to expire. A red flag may be displayed once the time period expires and the service request has not yet been assigned to an agent, which may lead to a drop of related KPI values. In this manner, the customer is able to track the time elapsed for a service request as well as the KPI values associated with the service request.

A person of skill in the art should recognize that the customer care customer application according to embodiments of the present invention allow customers to view or update service requests while on the move, without requiring access to a PC. The ability to initiate calls that are routed directed to service request owners without the customer having to manually specify any account or SR related information via an IVR, saves time and results in cost savings to the contact center. The customer applications also enable the rapid sharing of data other than service request data, such as, for example, data on software/product updates or releases, training schedules and locations, and the like.

IV. Call/Data Matching and Access Number Distribution

According to one embodiment, the support provided by the system of FIGS. 1A and 1B includes the provision of a configurable mechanism for mapping context data from the customer application 50 to an incoming voice call from a user of the customer application. The context data may include, without limitation, information about the user or user device, location information, routing parameters, session parameters, and the like. The routing parameters may include any information used by the contact center for routing a call, such as, for example, language, call subject information, and the like. The session information may include any information for identifying a current communication session, such as, for example, a session ID.

In a typical existing solution, a customer may log onto a particular customer application (e.g. banking application), provide his user authentication information (username and password), and be authenticated for accessing, for example, his bank account. If the customer wants to call the contact center in regards to the account, he may do so from a telephony device by dialing, for example, a telephone number of the contact center that is made available, for example, on a website. When a voice connection is made, the customer may be taken through one or more re-authenticating steps via, for example, an IVR, even though the customer may already be authenticated via the customer application. During such re-authentication, the user may be asked for information that verifies the customer's identify, such as, for example, an account number, birthdate, password, and/or other user credentials. The user may also be asked to specify the reason for the call or be prompted for other information, either via the IVR or by an agent, in order to obtain context for the call. This may be frustrating to the customer, costly for the contact center due to increased call handle time, and/or affect contact center productivity.

According to embodiments of the present invention, a voice call from a user of a customer application 50 is matched with data that provides context for the call in order to minimize the amount of new information or repeat information that a user is prompted to enter when the connection is made. The device transmitting the context data may be the same or different from the device involved in the voice call. For example, if the application is executed from a smart phone, the phone may send the context data and be invoked for the voice call. If the application is executed from a non-telephony device such as, for example, a desktop computer, a separate telephony device may be invoked for the voice call.

According to some embodiments, the matching of context data that already contains the user's identity information, to the voice call, helps avoid the need to re-authenticate the customer during the voice call, while maintaining the level of security that is desired by the contact center. This in turn helps to provide improved customer experience, improved contact center productivity, cost savings due to a reduced call handle time, and the like According to one embodiment, the context data is provided to the mobile server system 26 over a data channel in advance of the actual voice call which ensues over a voice channel. The data channel may traverse the mobile network 14a and the Internet 14c while the voice channel may traverse, for example, the PSTN 14b via analog telephone lines that are configured with bandwidth for carrying human voice. The voice channel, however, is not limited to the PSTN, but may extend to include any other communication medium configured to transmit human voice. For example, in some embodiments, the voice call may be a VoIP call that traverses the Internet. Regardless of the particular medium used to transmit the context data and/or the voice call, the mobile server system 26 is configured to match an inbound (or outbound) call to the context data that is temporarily stored by the mobile server system 26 in order to identify the user, user's device, location, and other context in regards to the call. The matching, or identification of the context data, also includes session matching where the data session used to transmit the context data is matched with the voice session, and the two are merged into a single session. This may be done by replacing a session ID for the voice session with the session ID of the data session, or vice versa.

According to one embodiment, the matching of a voice call to context data may utilize a calling party's ANI (automatic number identification) number. The matching may also be based on a randomly generated access code (e.g. a dual-tone multi-frequency signaling (DTMF) token), an access number (e.g. telephone number, SIP endpoint identifier, and the like) allocated to the call, or a combination thereof, depending, for example, on the level of security that is desired. For example, it may be desirable to have a higher level of security for matching data provided by a banking application, than for matching data for an application that allows a user to view products and initiate calls to inquire about those products. Also, the type of call matching may vary based on the type of interaction requested by the customer application 50. For example, an interaction request for a voice call may invoke one type of matching schema while an interaction request for chat may invoke another type of matching schema.

Figure 18:
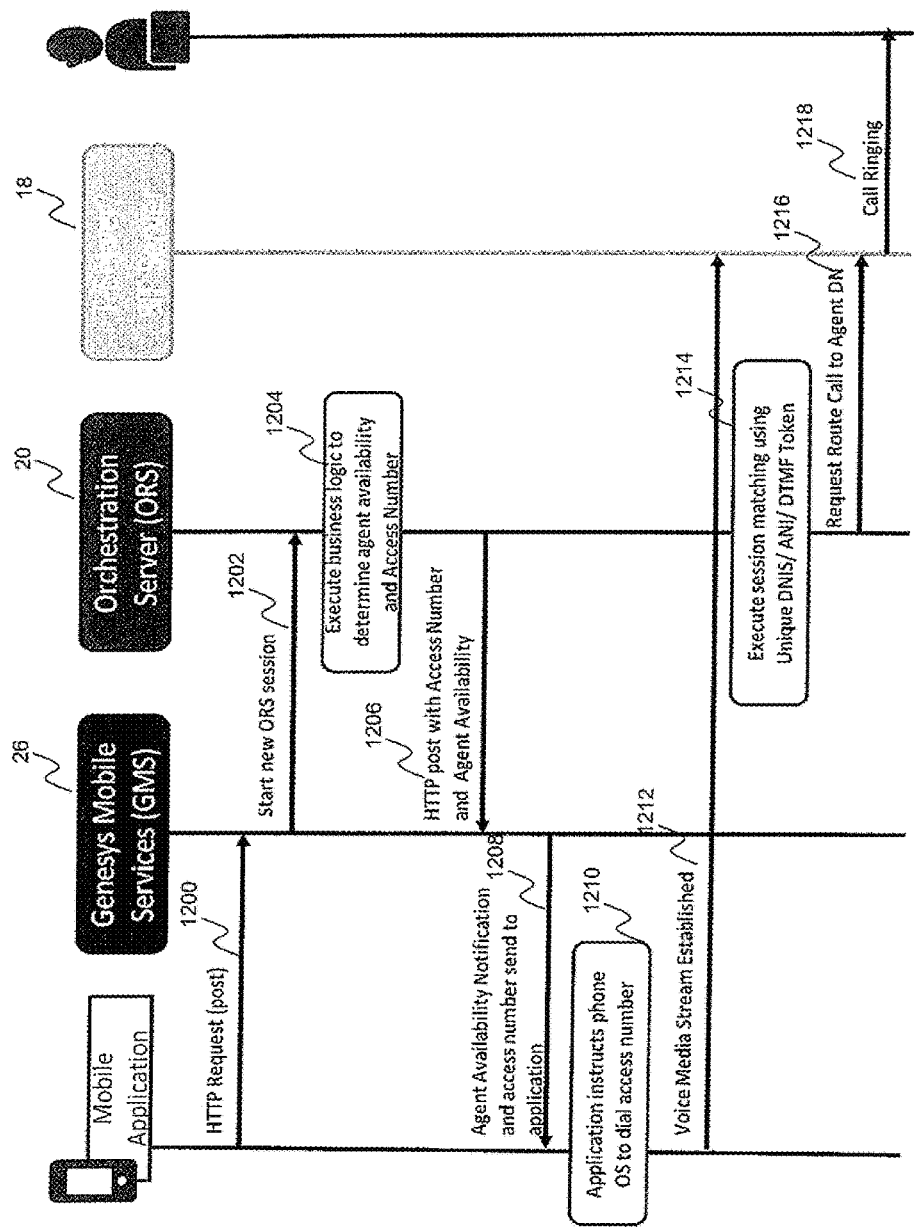
FIG. 18 is a simplified signaling diagram for matching context data to a voice call according to one embodiment of the invention.

FIG. 18 is a simplified signaling diagram for matching context data (also referred to as contextual data) to a voice call according to one embodiment of the invention.

The process starts, and in step 1200, the customer application 50 transmits a request for interaction to the mobile server system 26. The request may be transmitted, for example, in response to the user selecting the option to make a voice call (FIG. 3B) from the customer application 50. In response to the selection, the customer application 50 retrieves and transmits context data as an HTTP request, for example, over the data channel. If the customer application 50 is a customer care customer application for providing IT support, the context data may include, for example, a service request ID. Other types of context data may be transmitted for different types of applications. The type of information that is transmitted may depend, for example, on the security and/or privacy settings stored for the user on the end user device. For example, if a "location services" setting is turned off on the end user device, location data may not be included with the context data. Once received, the context data is temporarily stored by the secure call matching module 58 (FIG. 2).

In step 1202, the request is transmitted to the routing server 20, and in step 1204, the routing server generates a new session ID for the data session. In addition, the routing server invokes one or more business rules to identify an agent that may handle the call. The agent may be identified, for example, based on routing parameters included in the context data, such as for example, type of service requested (call, callback, and the like), language preferences, transaction type, and/or the like. For a customer care customer application, a party handling a service request may be selected based on the service request ID included as the context data from the customer application.

In step 1206, the routing server transmits the data session ID with any agent availability information to the mobile server system 26. According to one embodiment, the access number distribution module 54 in the mobile server system is invoked for selecting an access number from a pool of available access numbers. The access number is provided to the customer application 50 in step 1208 over a data channel.

In step 1210, the customer application 50 receives the access number and instructs the end user device's operating system to dial the access number for establishing a voice media session in step 1212, identified via a voice session ID.

In step 1214, the routing server 20 obtains a DNIS (dialed number identification service) number for determining the access number that was dialed. In addition, the secure call matching module 58 is invoked so that matching context data may be identified for use in routing the call to a contact center resource. The matching of the context data to the voice call may be, for example, based on all or part of the access number, ANI number, and/or unique code temporarily provided to the user during the data session as a one-time password, such as, for example, a DTMF token. According to one embodiment, the portion of the routing strategy that is invoked for routing the call may vary depending on whether the match was successful. For example, a successful match may cause the skipping over an IVR treatment that would otherwise be invoked to authenticate the user and/or obtain context for the call. A successful match may also cause the routing strategy to invoke a third party authentication service for automatically authenticating the called based on unique keys provided by the authentication service to the caller.

Assuming that the data and call matching is successful, all or a portion of the retrieved data is attached to a request that is transmitted in step 1216 to the call server 18 to route the call to the identified contact center resource, such as, for example, to an agent directory number (e.g. the agent's phone number extension). If the resource is an agent device 38, a ringing signal is transmitted to the device to the device in step 1218. According to one embodiment, all or a portion of the attached data is also forwarded by the call server 18 to the agent device for display. In this manner, the agent has access to context data made available by the customer application 50.

According to one embodiment, the support provided by the system of FIGS. 1A and 1B includes the dynamic selection and provision of access numbers for establishing a voice call. The access number may be a telephone number for a PSTN call, SIP endpoint location identifier for a VoIP call, or the like.

Unlike traditional mechanisms of contacting a contact center by, for example, manually dialing a preset telephone number published by the contact center, the access number provided to the customer application 50 may vary depending on the context data received from the customer application and/or other data retrieved by the mobile server system. For example, the number may be selected from a group of access numbers based on customer location, location of the mobile service provider, customer type, customer availability, agent availability, and the like. As a more specific example, the access number selected may be a local telephone number based on the geographic location of the end user device. This may allow cost reductions for a call center since it helps avoid calls to a toll free number published for the contact center.

According to one embodiment, an access number is selected and reserved in response to a request for interaction from a particular customer application, and locked for a particular period of time for preventing the access number from being sent to another end user device transmitting another request via its customer application. According to another embodiment, access numbers are not locked, and may concurrently be assigned to multiple callers.

According to one embodiment, the access number is used, all or in part, to identify stored context data about the call. If a match is made, the access number is returned to the pool of access numbers from which it was selected. According to one embodiment, if no match is made, the access number is not returned to the pool. If a call to the access number does not arrive in a configurable period of time, the access number reservation expires, and the access number is returned to the pool.

Figure 19A:
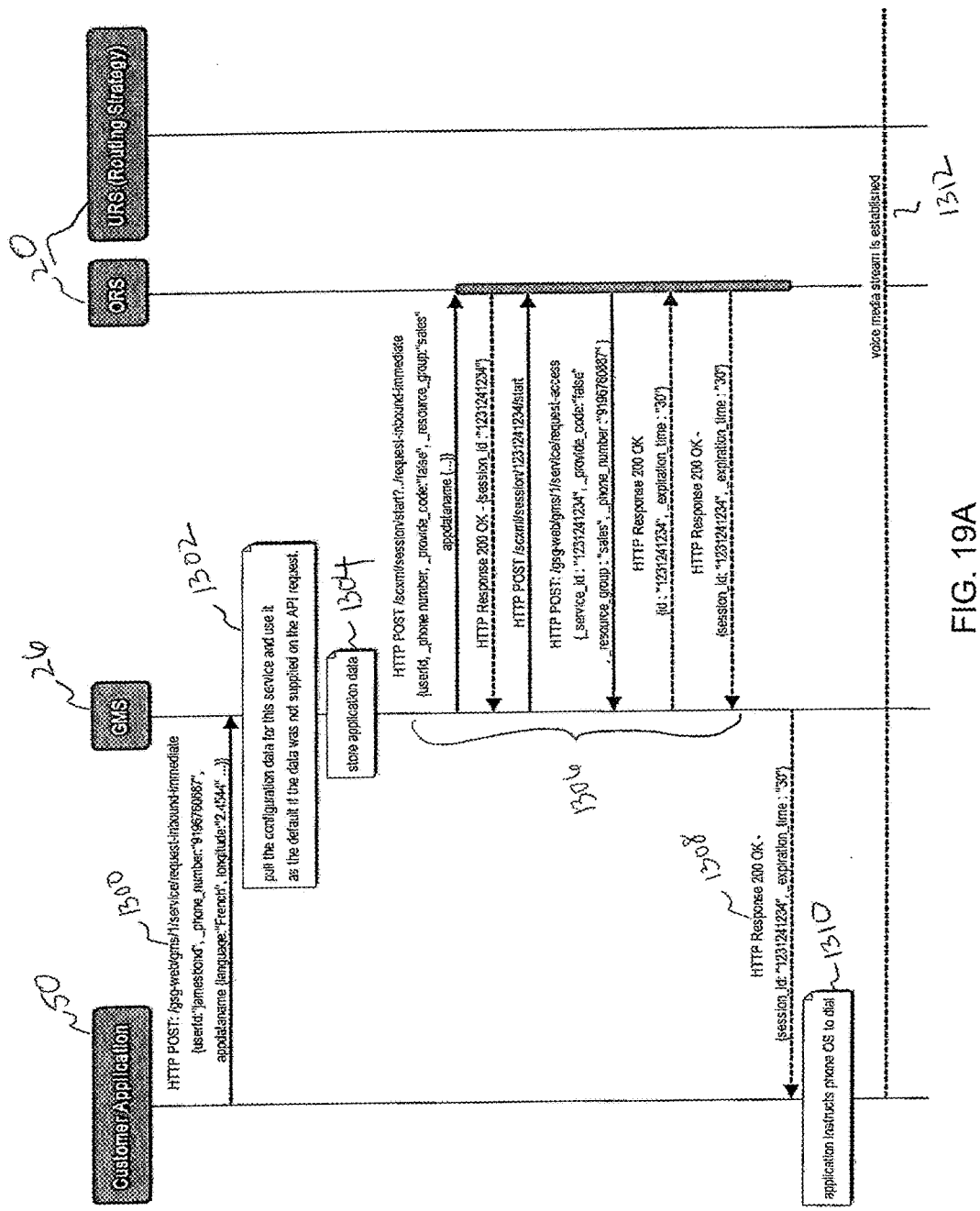
FIGS. 19A-19B are message signaling diagrams depicting flow of messages that are exchanged in response to a request for a voice call where there is an agent available, and thus, there is no delay in the connection according to one embodiment of the invention.
Figure 19B:
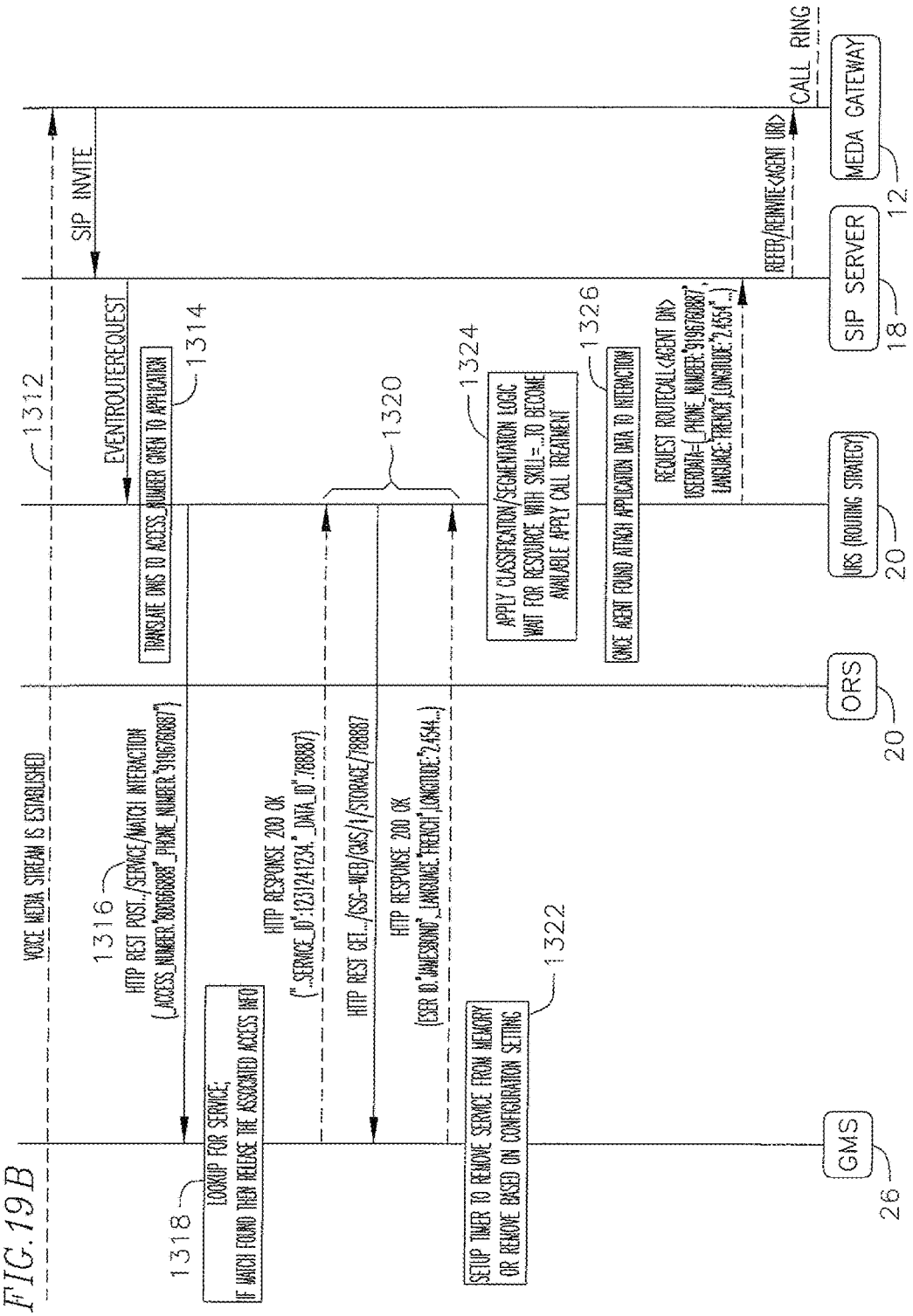

FIGS. 19A-19B are message signaling diagrams depicting the flow of messages that are exchanged in response to a request for a voice call where there is an agent available, and thus, there is no delay in the connection according to one embodiment of the invention. In step 1300, the customer application 50 transmits a request for interaction over a data channel. The request may be transmitted, for example, upon selection of the option to make a voice call 112 (FIG. 3B) from the customer application, and includes context data such as, for example, user data, language preferences, location information, call subject information, and the like. A security token or key that may have been provided to the mobile application upon authenticating to an external authentication server may also be transmitted with the request as context data.

In step 1302, the mobile server system 26 invokes the management interface module 62 (FIG. 1B) for retrieving configuration data for the service for use as default data if no context data is provided with the request. The configuration data may include, for example, a service name, expiration time, location of the routing server to be invoked, location for a voice XML script to be invoked, and/or other configuration parameters.

In step 1304, the secure call matching module 58 stores the application/context data passed by the customer application 50 in a temporary memory location. The data may be stored in association with a unique data session ID requested and assigned by the routing server 20 via steps 1306. The data session ID may also be associated with an expiration time (e.g. 30 seconds) which may be determined, for example, based on the expiration time retrieved from the configuration data retrieved for the application.

In step 1308, the session ID and expiration time are transmitted customer application. The customer application may use the session ID to transmit any other data during the particular data session. According to one embodiment, an access number to be dialed by the application is also transmitted to the customer application.

In step 1310, the customer application 50 instructs the operating system of the end user device 10 to dial the provided access number, and in step 1312, a voice media session is established between the end user device and the switch/media gateway 12. The voice media session may be a traditional telephony session over the PSTN 14b. The voice media session may also be conducted over the Internet 14c as a VoIP session, WebRTC session, or the like. According to one embodiment, the voice session is assigned a separate voice session ID.

In response to the voice media session being established, the media gateway 12 transmits appropriate messages to the call server 18, and the call server in turn generates a request to route the incoming event to the routing server 20.

In step 1314, the routing server translates the called DNIS number to the access number that was provided to the customer application.

In step 1316, the routing server 20 provides a request to match the voice session to context data (and associated data session) stored by the mobile server system 26. The type of data that is transmitted with the match request depends on the type of matching that is configured for the particular customer application, requested interaction, call subject, or the like. For certain types of applications, for example, the matching may be based on a combination of the called access number and ANI number, in which case both numbers are transmitted with the request, as is shown in the illustrated example.

In step 1318, the secure call matching module 58 of the mobile server system 26 is invoked for identifying any stored context data based on the data transmitted with the request for a match. If a match is made, the data session is merged with the voice session by, for example, utilizing a single session ID for both. The matched context data is transmitted to the routing server in step 1320, and in step 1322, the secure call matching module 58 removes the stored context data from memory. The removal may be immediate or based on the expiration time included in the configuration data, or a particular time set by the module.

According to one embodiment, the mobile server system 26 maintains a history of successful and filed call matches in a database for reporting purposes, and for aiding the troubleshooting of potential issues. According to one embodiment, each call-matching record may contain enough data for identification and troubleshooting purposes, such as, for example, timestamps (request time, call time, and the like), session identifier, mobile capabilities, custom data, and the like. A report may be generated based on the call-matching information. Statistics about successful and failed matched calls may also be displayed on a display device of a device 38 accessible to a system administrator.

In step 1324, the routing server 20 utilizes all or a portion of the received context data for routing the call to an appropriate routing resource (e.g. an agent). According to one embodiment, the routing strategy that is employed may bypass certain authentication steps in light of certain user data being provided by the retrieved context data. For example, the routing strategy may bypass an initial voice treatment where user account information is requested, or where the user is asked to select a reason for the call. In some embodiments, a separate authentication server may be automatically contacted for authenticating the caller based on the context data. For example, if the context data includes a temporary security token provided by the authentication server, the routing strategy may include providing the security token to the authentication server for verifying that the authorized user of the token is the user that has placed the voice call. The context data may also be used to find the appropriate agent for routing the call. For example, if the context data indicates that the user speaks French, a French speaking agent may be selected for handling the call.

When the appropriate agent is located, the routing server 20 transmits a request to the call server 18 to route the call to the identified agent location. According to one embodiment, all or part of the context data is attached to the request. In this manner, the context data may be provided to the agent device 38 for display thereon. The context data that is displayed may be similar to the context data that is displayed in the case information area 140 of the agent desktop of FIG. 4B.

Figure 20B:
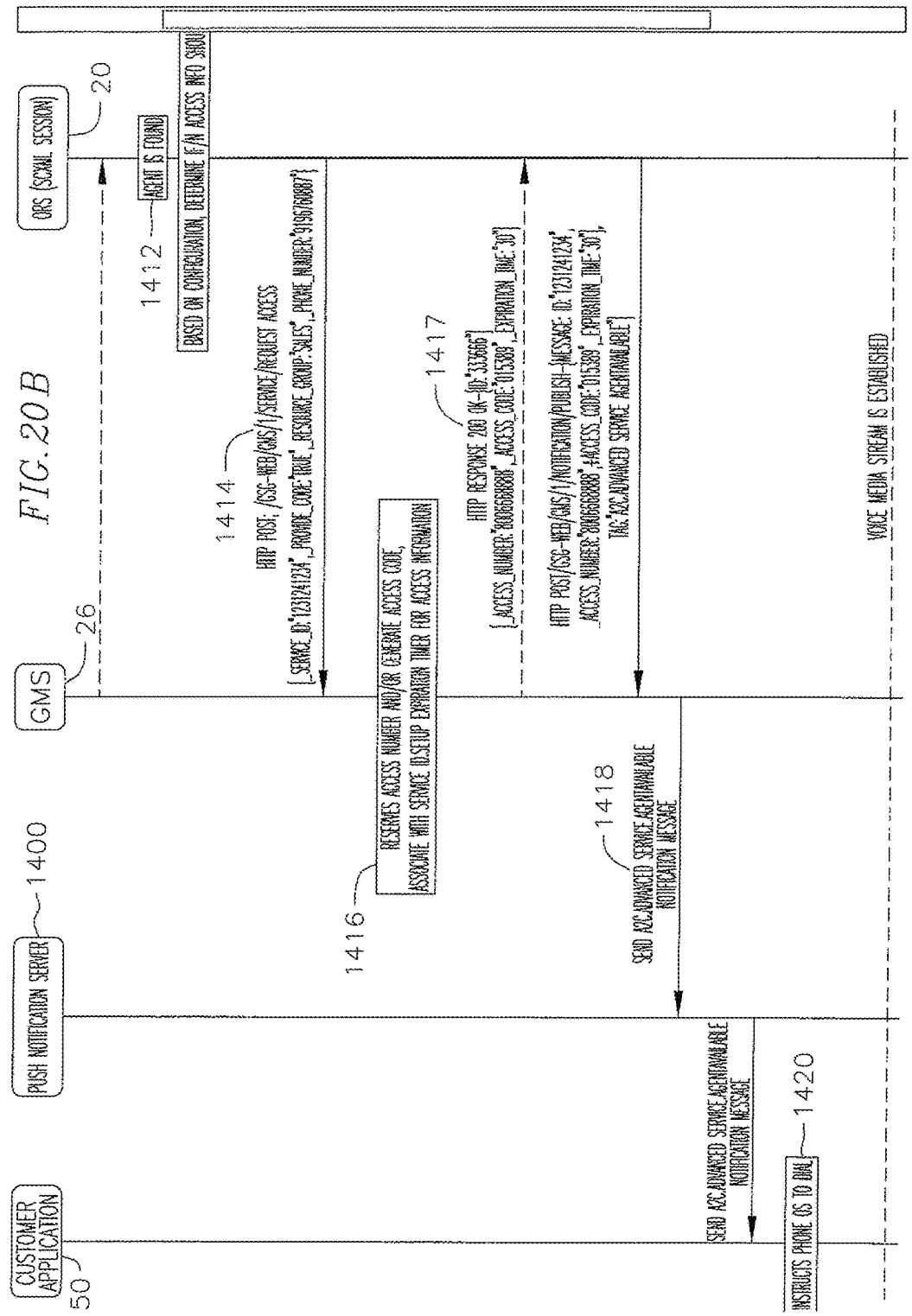
Figure 20C:
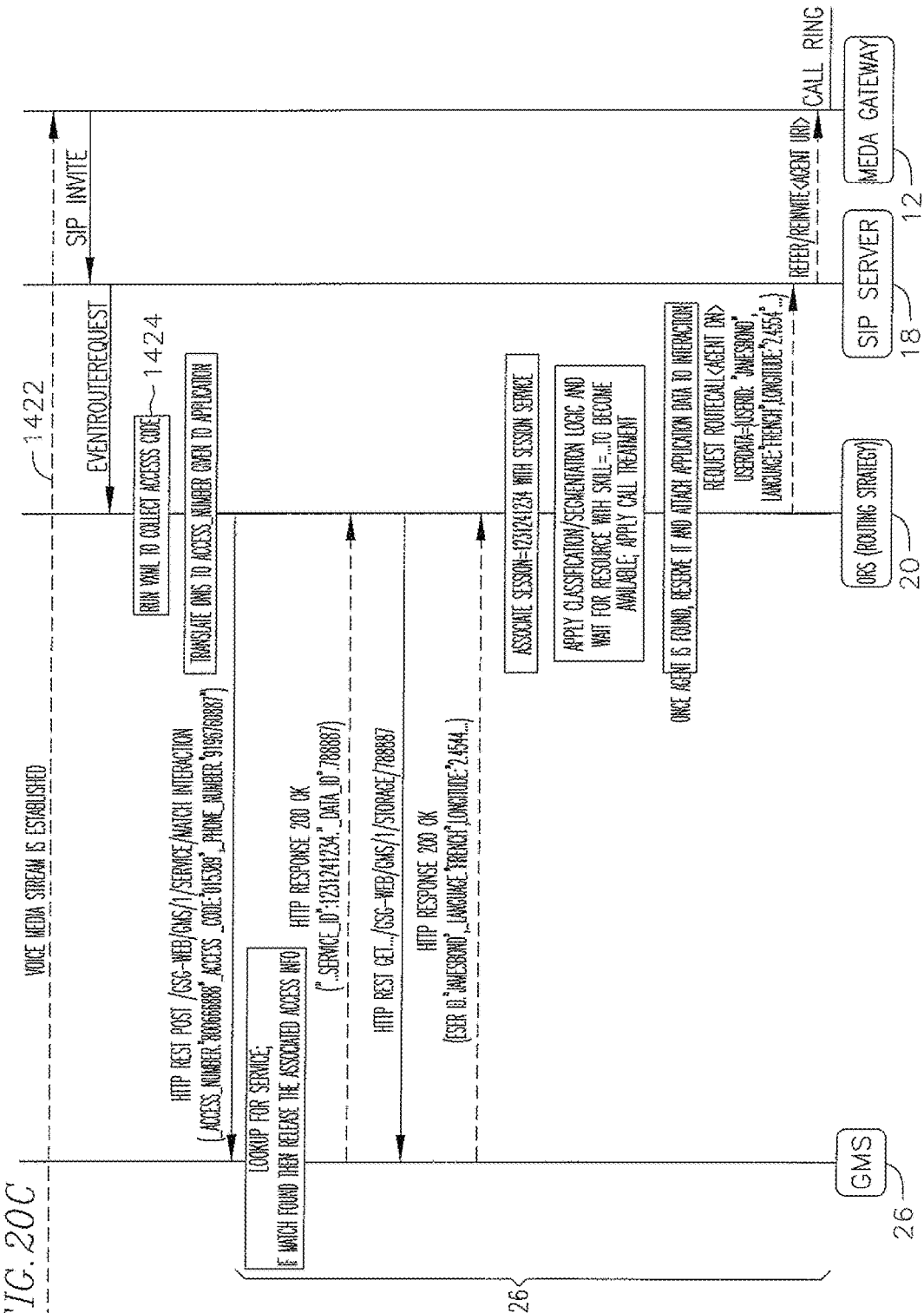

FIGS. 20A-20C are message signaling diagrams depicting the flow of messages that are exchanged in response to a request for a voice call where there is no agent immediately available to handle the call according to one embodiment of the invention. The initial steps 1402 are similar to steps 1300-1306 of FIG. 19A, except that in step 1404, the routing server executes business logic to try to find an agent based on routing parameters of the retrieved context data, and determines that there are no available agents to handle the request. In step 1406, the routing server informs the mobile server system 26 of this fact.

In step 1408, the notification module 56 of the mobile server system 26 transmits a status notification message to a third party push notification server 1400, and the server in turn forwards the message to the end user device. The push notification server 1400 that is invoked depends on the type of push notification service that is desired, such as, for example, Apple Push Notification Service, Android-Push service, or the like.

In step 1410, the notification is pushed to the end user device for output by the device. The notification may include any audio and/or visual notification conventional in the art.

In step 1412, the routing server 20 determines that an agent is now available, and proceeds to reserve the agent according to conventional mechanisms. In step 1414, the routing server 20 transmits a request to the mobile server system's 26 access number distribution module 54 to reserve an access number and/or generate an access code. In the illustrated embodiment, both the access number and access code are generated and transmitted to the routing server 20 in step 1418, along with a reservation/expiration time indicative of when the access number and/or code are to expire. According to one embodiment, the access code is a randomly generated DTMF code.

In step 1418, the notification module 56 of the mobile server system 26 is invoked for transmitting a notification to the mobile application 50 (via the push notification server 1400) that an agent is now available. The notification may also inquire whether the customer still wants to talk to the available agent. In response to a positive answer, the access number is transmitted to the user. According to one embodiment, the access number is transmitted as a push notification message. However, it may not be desirable to transmit the access code as a push notification for security reasons. In this case, the access code may be transmitted via a 3rd party over, for example, a secure data channel.

In step 1420, the customer application 50 instructs the operating system of the end user device 10 to automatically dial the access number. When the call is answered by the media gateway 12, a voice media session similar to voice media session 1312, is established in step 1422. In the event that an access code was provided, the customer application 50 may be configured to automatically play audio tones matching the access code when the call is answered and the voice media session is established in step 1312.

According to one embodiment, instead of automatically instructing the operating system of the end user device to automatically dial the access number and/or play the access code, a notification may be displayed so that the user can invoke another device to engage in the voice call. This may be desirable, for example, if the end user device used to engage in the data session does not have telephony capabilities. For example, a user may use a personal computer to browse an enterprise's website when the user selects an option on the webpage indicating that he or she desires to talk to a customer agent representative. In this case, the access number and/or access code may be provided to the user's web browser for display, along with instructions to dial a particular phone number and enter a particular access code. The user may invoke a separate land-line phone, mobile phone, or another telephony device to call the access number and provide the access code. The access code may be played, for example, in response to the user manually pressing the corresponding numbers on a telephone keypad.

Assuming that audio tones corresponding to the access code was transmitted via the voice media stream, the routing server 20 is configured to run, in step 1424, a voice XML script to recognize the audio tones and translate the audio tones into an access code.

The steps that follow which are represented generally via reference number 1426 are similar to steps 1314-1326 of FIG. 19B. According to these steps, the routing server translates the dialed DNIS number to the access number, and proceeds to engage in a match of the voice call to any context data stored in association with the access number, access code, and/or ANI number for routing the call to an available agent. According to one embodiment, all or a portion of the access number may be used in conjunction with the ANI number and/or access code in order to make the match.

Figure 21A:
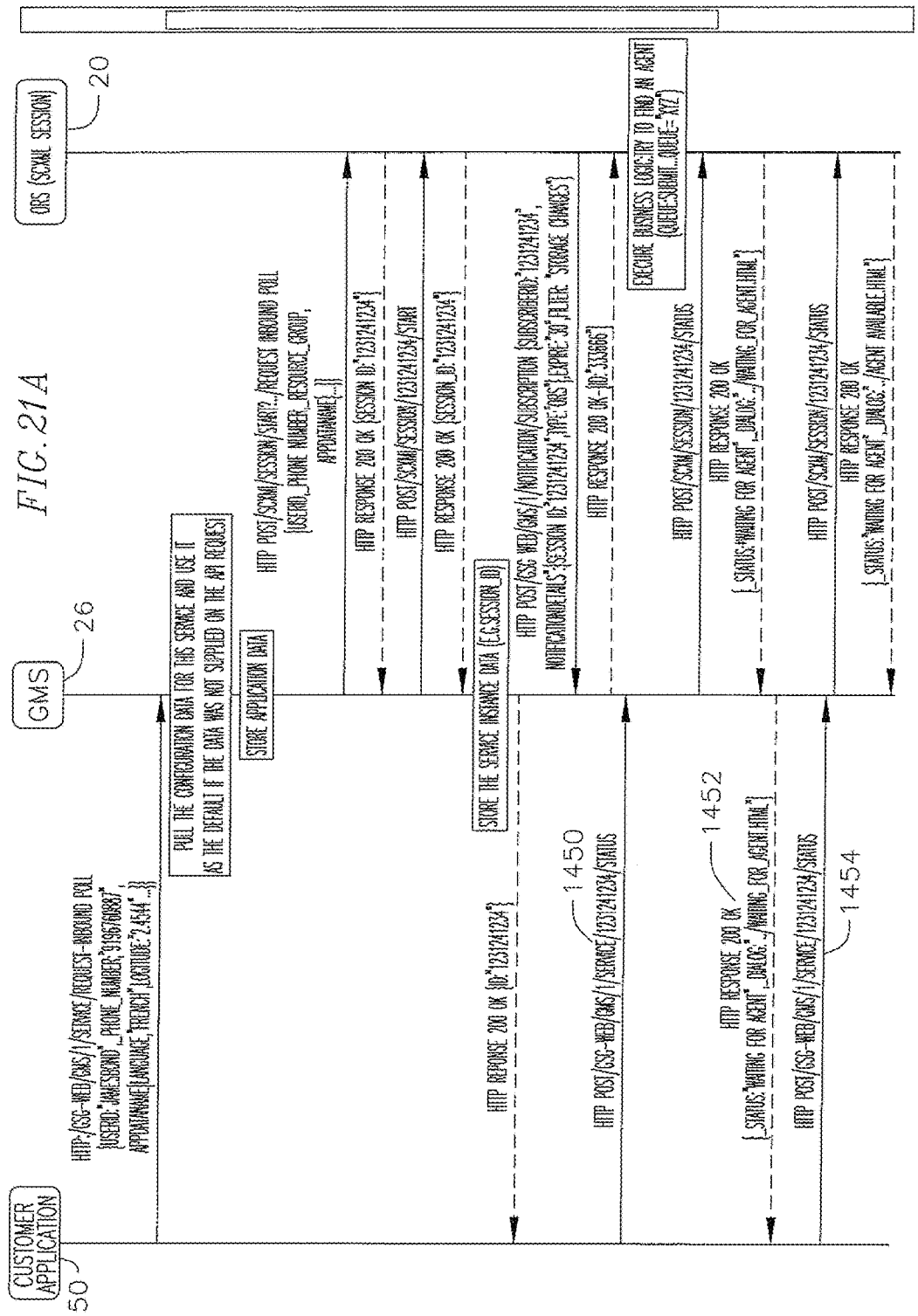
FIGS. 21A-21C are message signaling diagrams depicting flow of messages that are exchanged in response to a request for a call, where agent availability is polled periodically according to one embodiment of the invention.
Figure 21B:
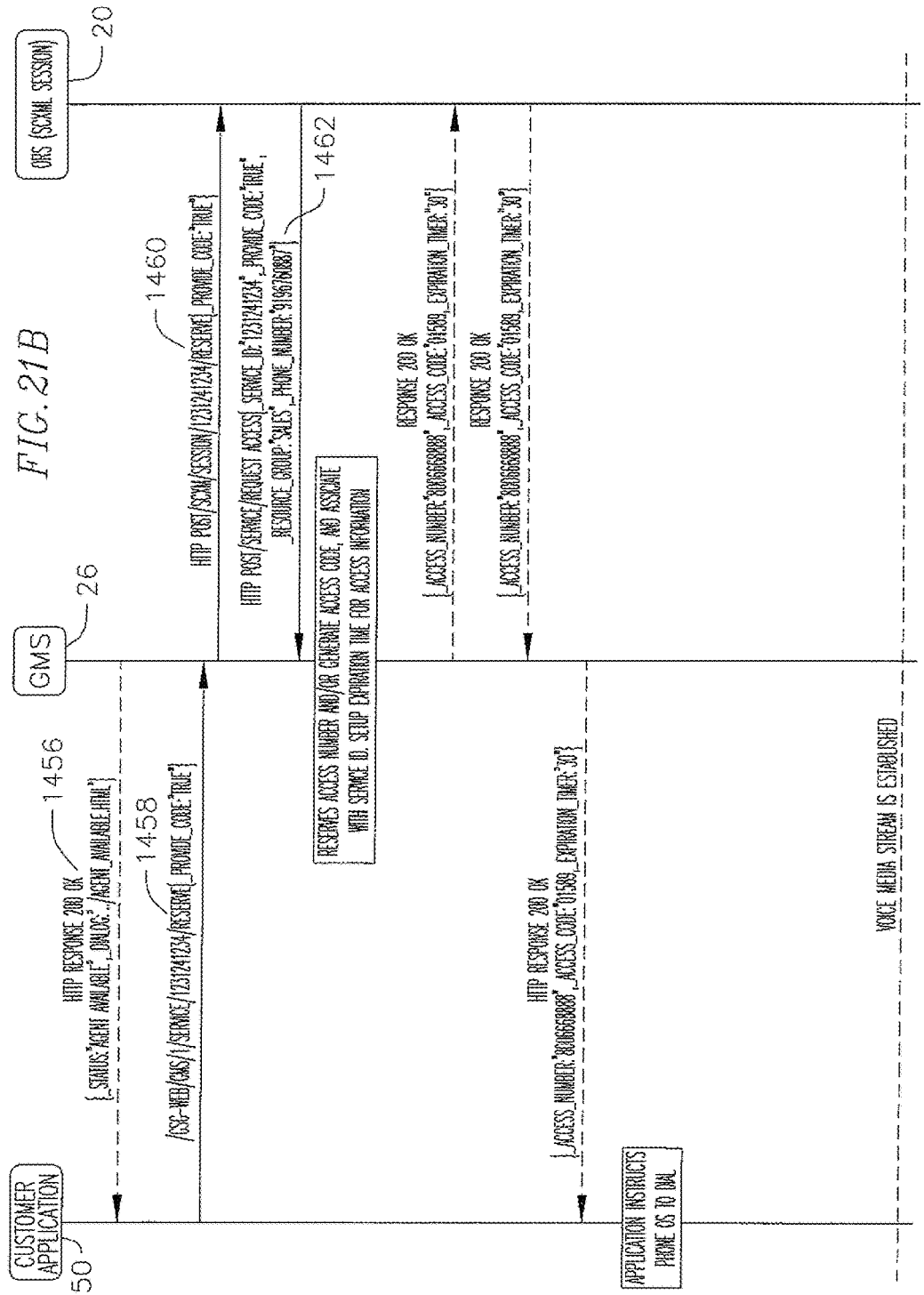
Figure 21C:
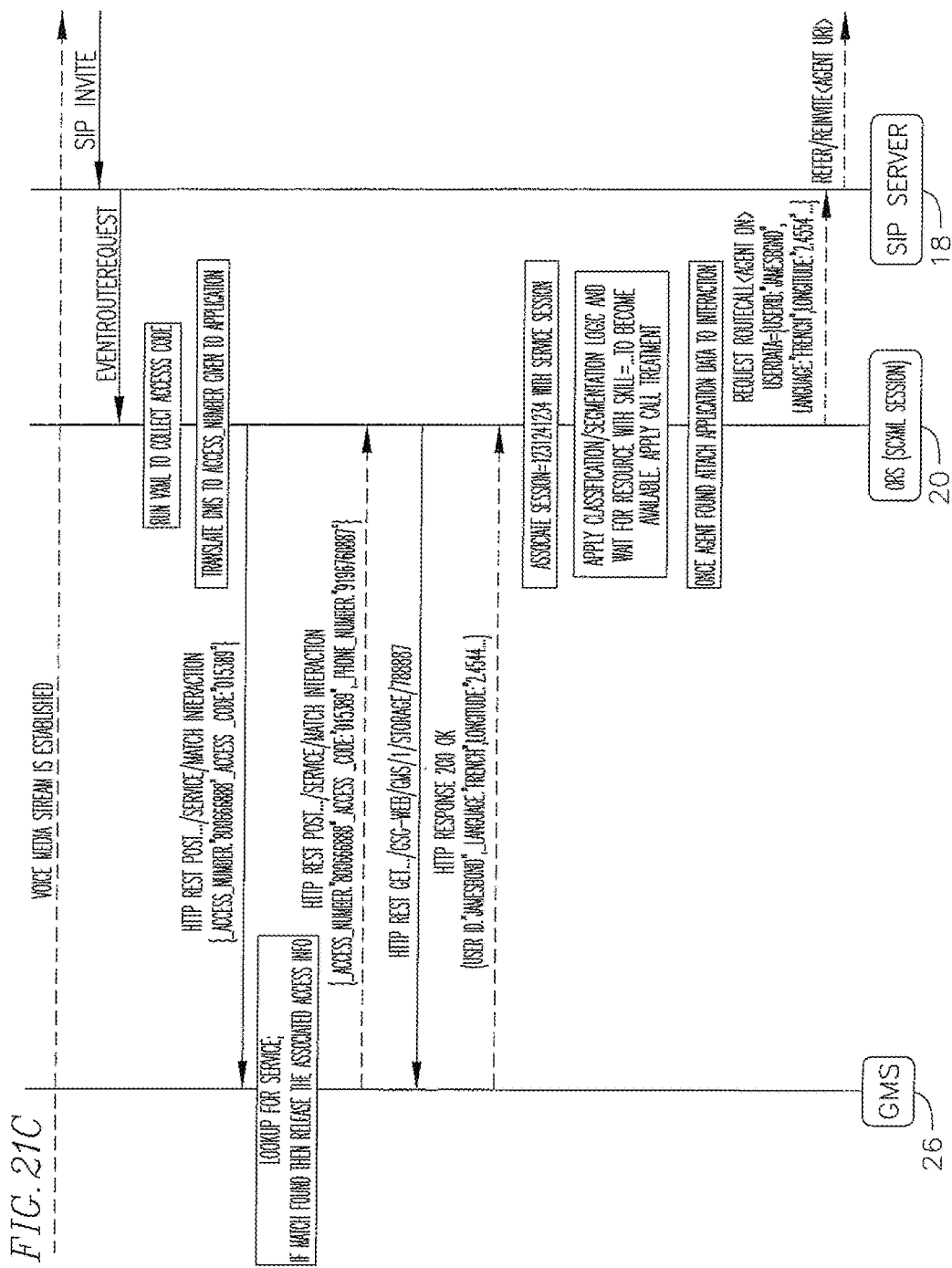

FIGS. 21A-21C are message signaling diagrams depicting the flow of messages that are exchanged in response to a request for a call, where agent availability is polled periodically according to one embodiment of the invention. In this regard, the various signaling messages that are transmitted according to this embodiment are similar to the messages that are transmitted in FIGS. 21A-21C, except that instead of informing the customer application 50 that an agent is available via a push notification, the mobile application is configured to poll for this information on a periodic (regular or irregular) basis.

In this regard, in steps 1450 and 1452, the customer application 50 transmits requests for status updates along with the assigned session ID, and in steps 1452 and 1456, receives the requested status updates of display on the end user device (e.g. FIG. 7A). According to one embodiment, a notification indicating that an agent is now available may prompt the user to select whether it desires to engage in the voice call now, or wait until later. In response to the mobile application indicating that the voice call is desired, and such information being forwarded to the routing server via steps 1458 and 1460, the routing server 20 transmits, in step 1462, a request for an access number to the mobile server system 26. An access number is then reserved and a voice connection is established in a manner similar to steps 1416-1422 of FIG. 20B. The remaining steps of matching the voice call to context data and routing the call to an agent are also similar to steps 1424-1426 of FIG. 20C.

Figure 22A:
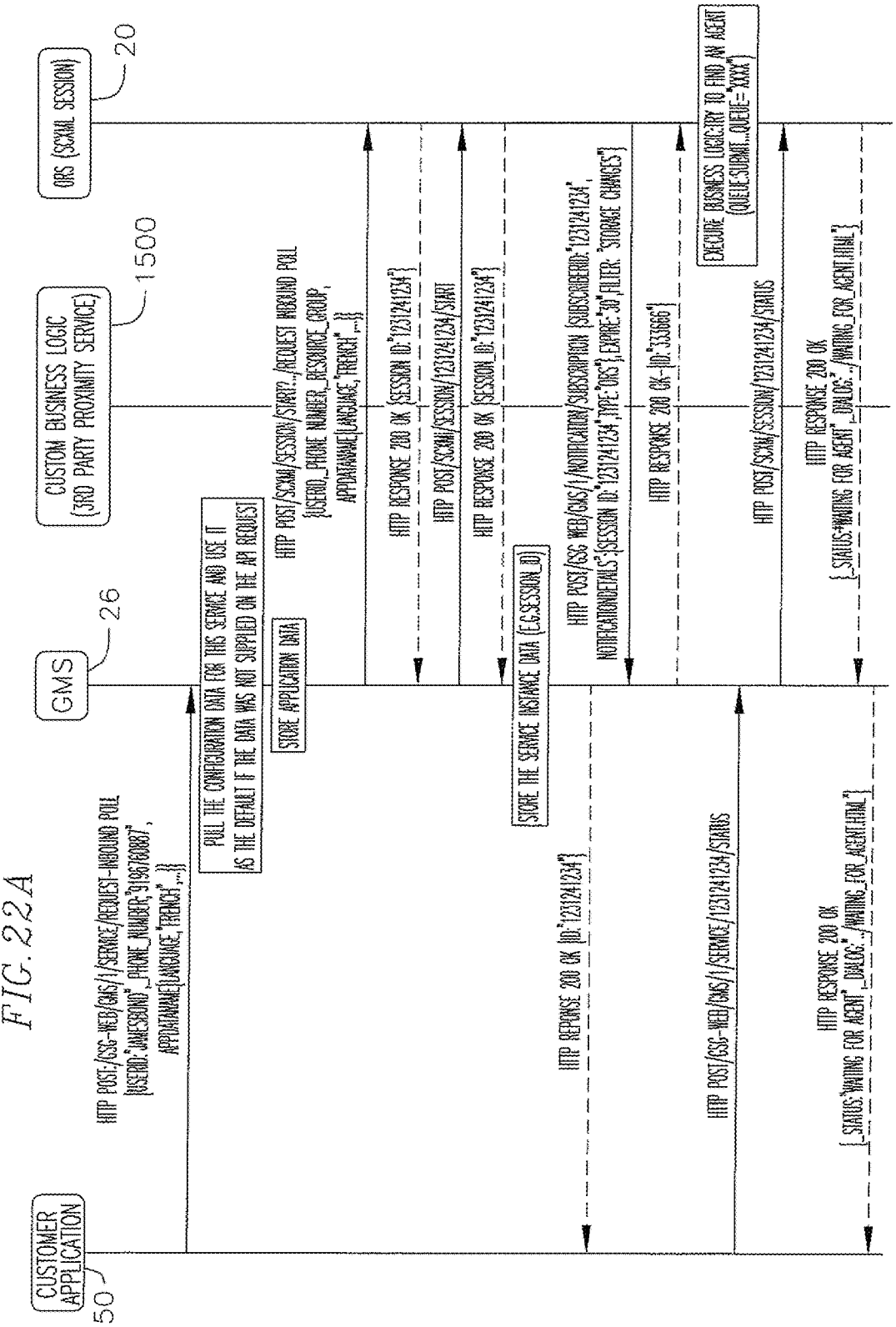

FIGS. 22A-22C are message signaling diagrams depicting the flow of messages that are exchanged in response to a request for a voice call where the end user device's location information is utilized to select an access number according to one embodiment of the invention. The initial steps for initiating the data session and waiting for an agent to become available are similar to the steps in FIGS. 21A-21B (up to step 1460 of FIG. 21B). In the embodiment of FIGS. 22A-22C, however, the request of an access number is based on the current location of the end user device. In this regard, in step 1502 of FIG. 22B, the message from the customer application to engage in a call, upon receiving notification of an available agent, includes information on a current location of the device. According to one embodiment, the location data includes the geographic coordinates of the end user device as longitude and latitude values.

In step 1504, the routing server 20 executes logic for determining a resource group closest to the location of the end user device. In this regard, in step 1506, the routing server 20 transmits to a proximity service 1500 such as, for example, Google Maps service, a request to identify a city closest to the identified geographic coordinates.

In step 1508, the proximity service identifies a name of the closest city, and provides the name to the routing server in step 1510.

In step 1512, the routing server transmits to the access number distribution module 54 of the mobile server system 26, a request to reserve an access number for a resource group associated with the identified city.

In step 1514, the access number distribution module 54 proceeds to select and reserve the requested access number from a pool of available access numbers. According to one embodiment, the access number that is selected is a local number associated with the identified city. The remaining steps that follow for matching an incoming voice call to the provided access number, to context data, and routing the call to an agent, are similar to steps 1424-1426 of FIG. 20C.

Figure 23:
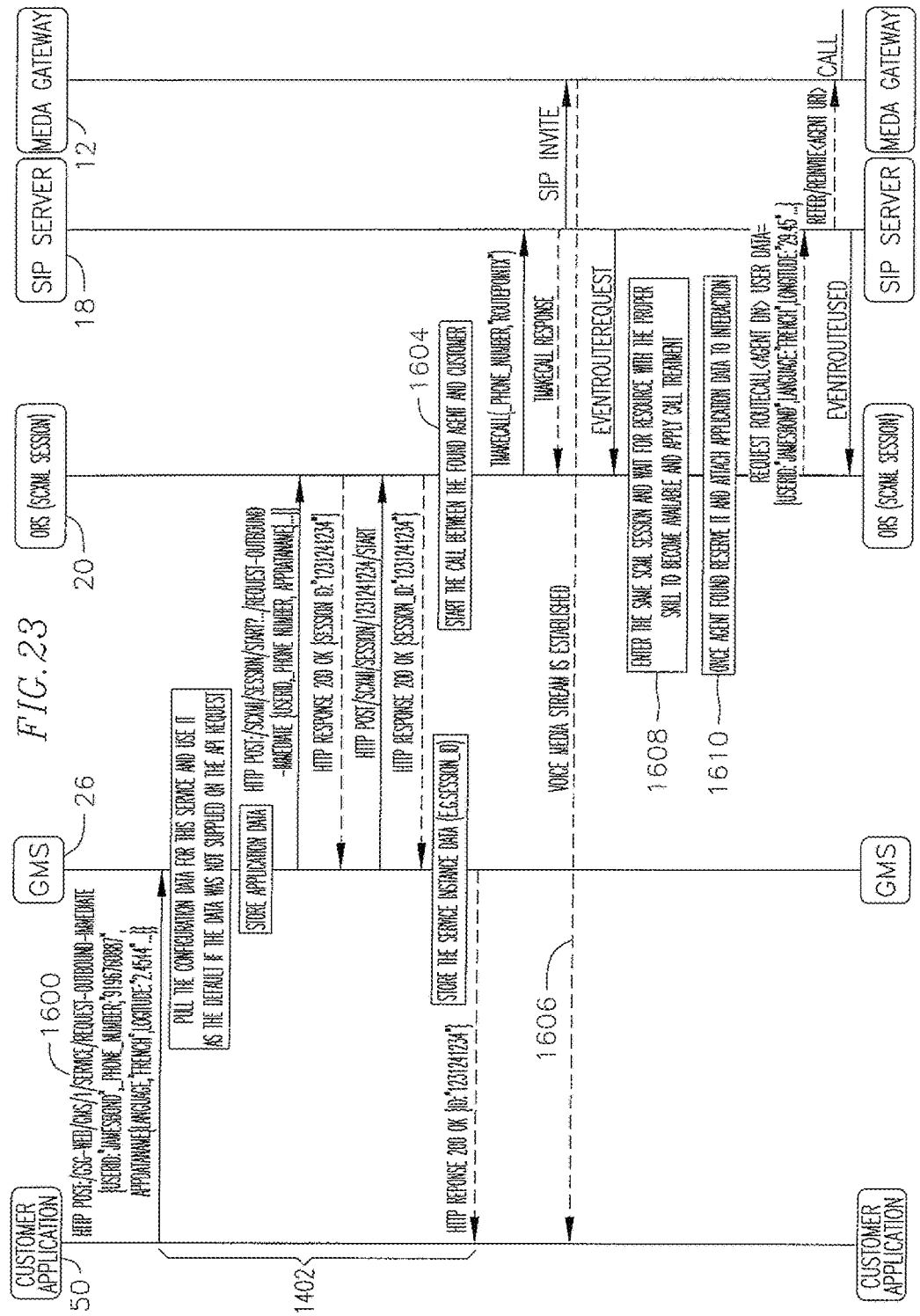
FIG. 23 is a message signaling diagram depicting flow of messages that are exchanged in response to a callback interaction request according to one embodiment of the invention.

FIG. 23 is a message signaling diagram depicting the flow of messages that are exchanged in response to a callback interaction request according to one embodiment of the invention. In step 1600, the customer application 50 transmits a request for interaction over a data channel, and includes a service request for a callback. The request may be transmitted, for example, upon selection of the option for receiving a callback 114 (FIG. 3B) from the customer application. The steps of storing the context data and starting a session identified via a session ID are similar to steps 1302-1308 of FIG. 19A. However, because the request is for an agent to call the customer instead of the customer calling the agent, the routing server, in step 1604 initiates the call to the end user device, and establishes a voice session with the end user device in step 1606 when customer answers the call.

In step 1608, the contact center resource with the proper skill is identified for handling the call. According to one embodiment, the same SCXML session that was started in response to the customer requesting the callback is used for the outbound call.

Once an agent is found, the agent is reserved in step 1610 and application data is attached to the request for interaction that is directed to the identified agent.

Figure 24:
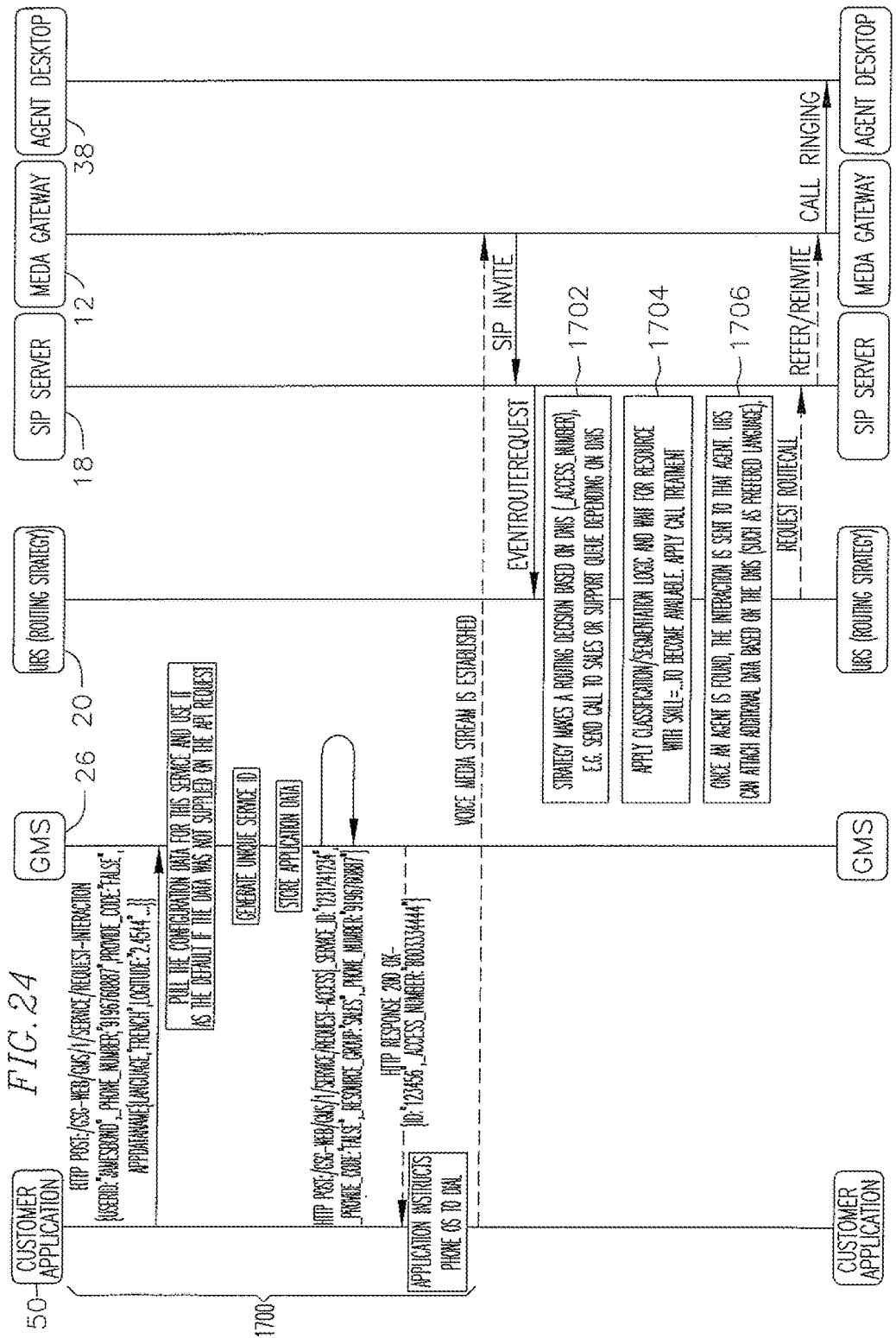
FIG. 24 is a message signaling diagram depicting the routing of voice calls based on an access number alone according to one embodiment of the invention.

FIG. 24 is a message signaling diagram depicting the routing of voice calls based on an access number alone according to one embodiment of the invention. The customer application transmits an interaction request and receives an access number to call based on the call subject, as is shown in steps referred to generally via reference number 1700. The call subject may be automatically determined based on the portion of the application that was invoked when the request was made. For example, if the customer was accessing information about products when the request was made, an access number to a sales group may be provided. However, if the customer was accessing troubleshooting information, an access number to a customer support group may be provided.

When a voice call is made to the access number and the routing server 20 is invoked to route the call, the routing strategy may simply seek to identify the access number that was called without matching the incoming call to stored context data about the individual caller. This may be desirable, for example, when authentication of the caller is not important, and the routing strategy merely seeks to find the right agent group to route the call (e.g. sales or support).

In step 1702, the routing server identifies the resource group to which to route the call, and in step 1704, waits for an agent in the identified group to be available for routing the call to the agent in step 1706.

Figure 25:
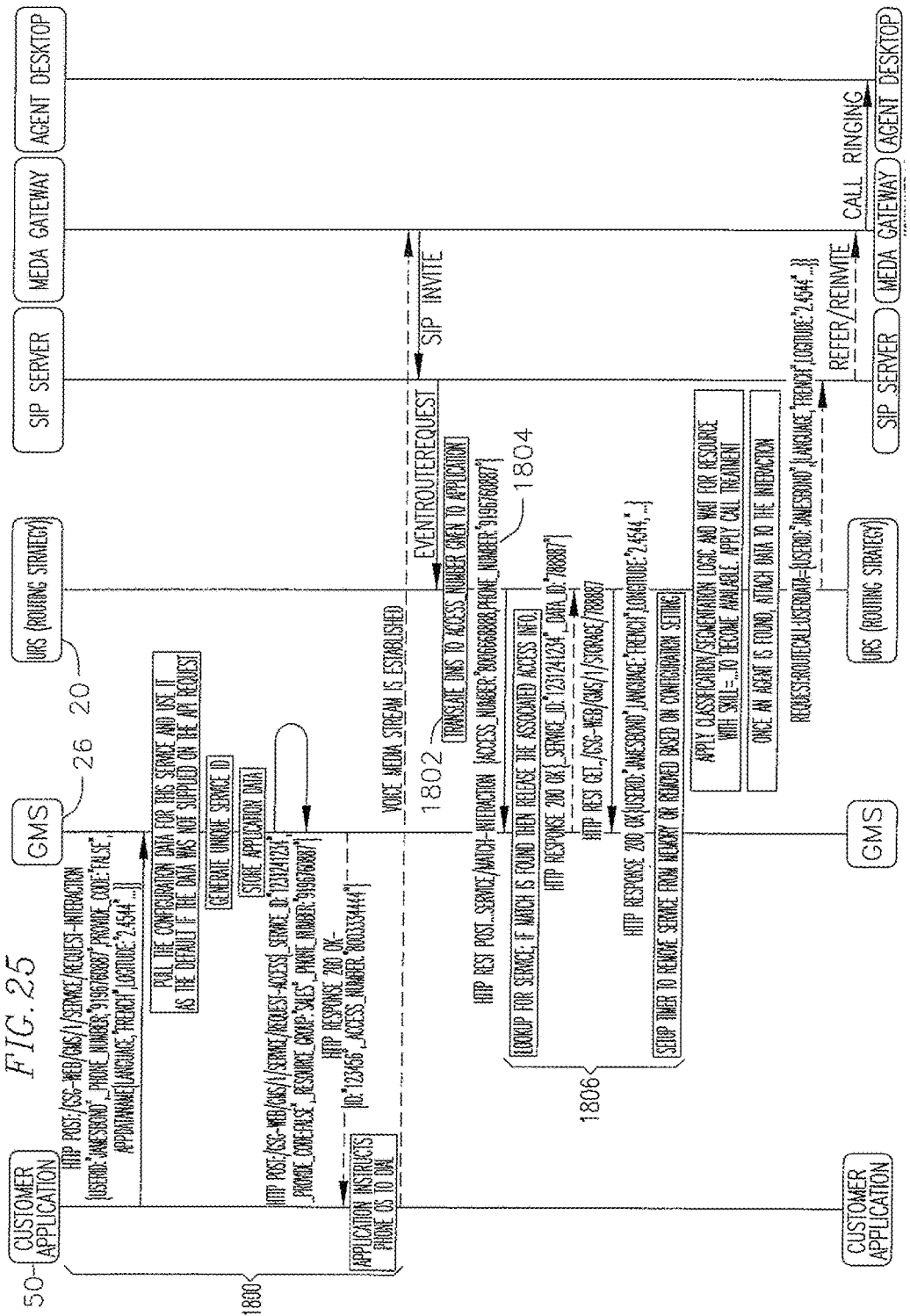
FIG. 25 is a message signaling diagram depicting the match of context data to a voice call using the caller's ANI number according to one embodiment of the invention.

FIG. 25 is a message signaling diagram depicting the match of context data to a voice call using the caller's ANI number according to one embodiment of the invention. The initial steps referred generally via reference number 1800, via which the customer application transmits an interaction request including the caller's ANI number and receives an access number to call, are similar to the steps shown in FIG. 24 via reference number 1700. The routing server 20 translates the dialed DNIS number to an access number in step 1802. Unlike the embodiment of FIG. 24, however, the routing server 20 transmits, in step 1804, a request to match the voice call to stored context data based on the access number and the caller's ANI number. The following steps of matching the voice session to the data session for bypassing, upon a match, steps for re-authenticating the user via an IVR, and routing the call to an appropriate agent, are similar to steps 1318-1326 in FIG. 19B.

Figure 26:
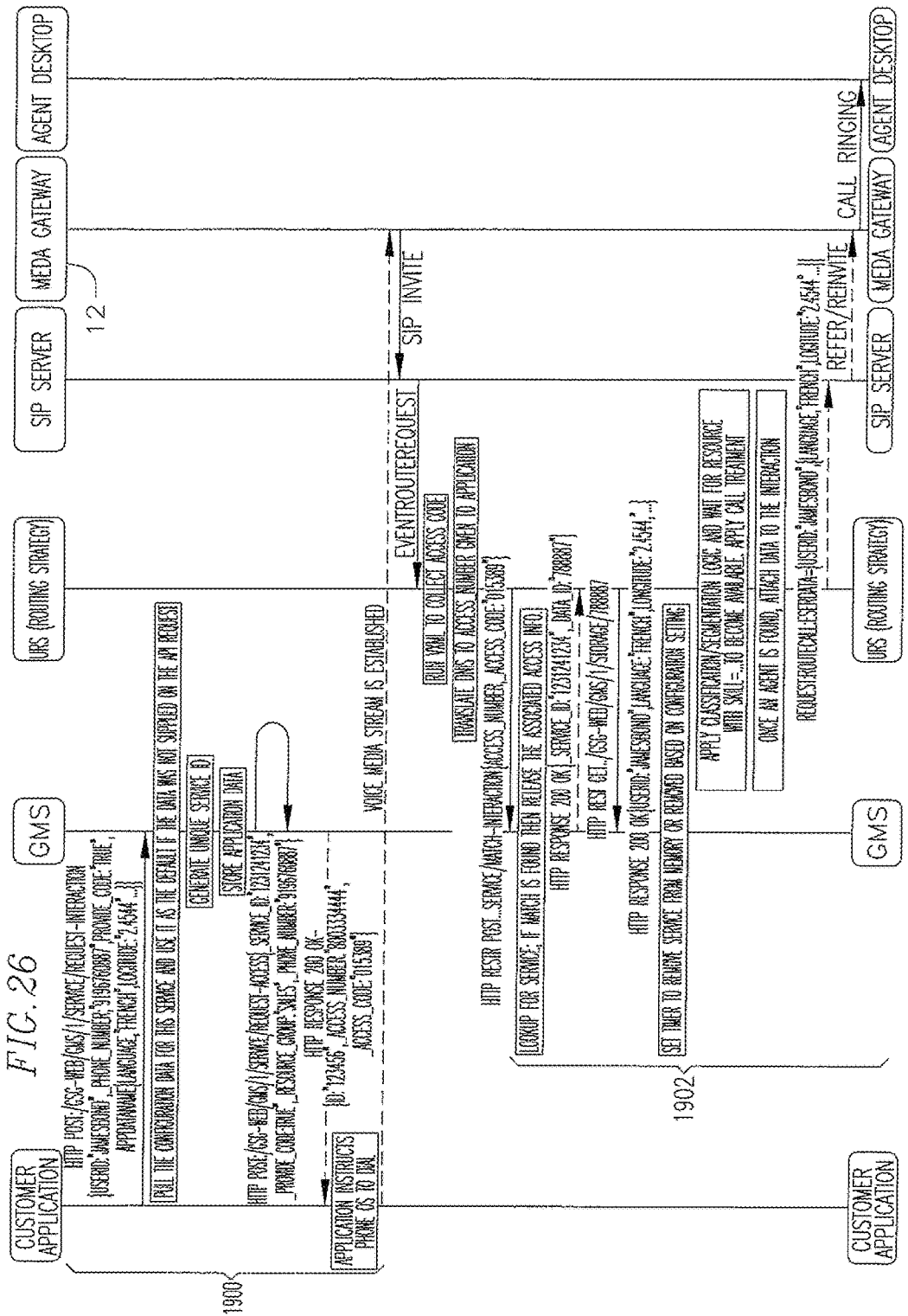
FIG. 26 is a message signaling diagram depicting the match of context data to a voice call using an access code according to one embodiment of the invention.

FIG. 26 is a message signaling diagram depicting the match of context data to a voice call using an access code according to one embodiment of the invention. In steps referred generally via reference number 1900, the customer application transmits an interaction request including the caller's ANI number and receives an access number to call along with a randomly generated access code.

According to one embodiment, a voice call is made to the access number, and the access code is transmitted via a voice media stream that is established when the call is answered by the media gateway 12. In the steps that follow, which are represented generally via reference number 1902, a voice XML script is run to translate the audio tones received in the voice media stream into an access code. The user is then authenticated based on a match of all or a portion of the access number along with the access code. The call is then routed to the appropriate agent.

Figure 27:
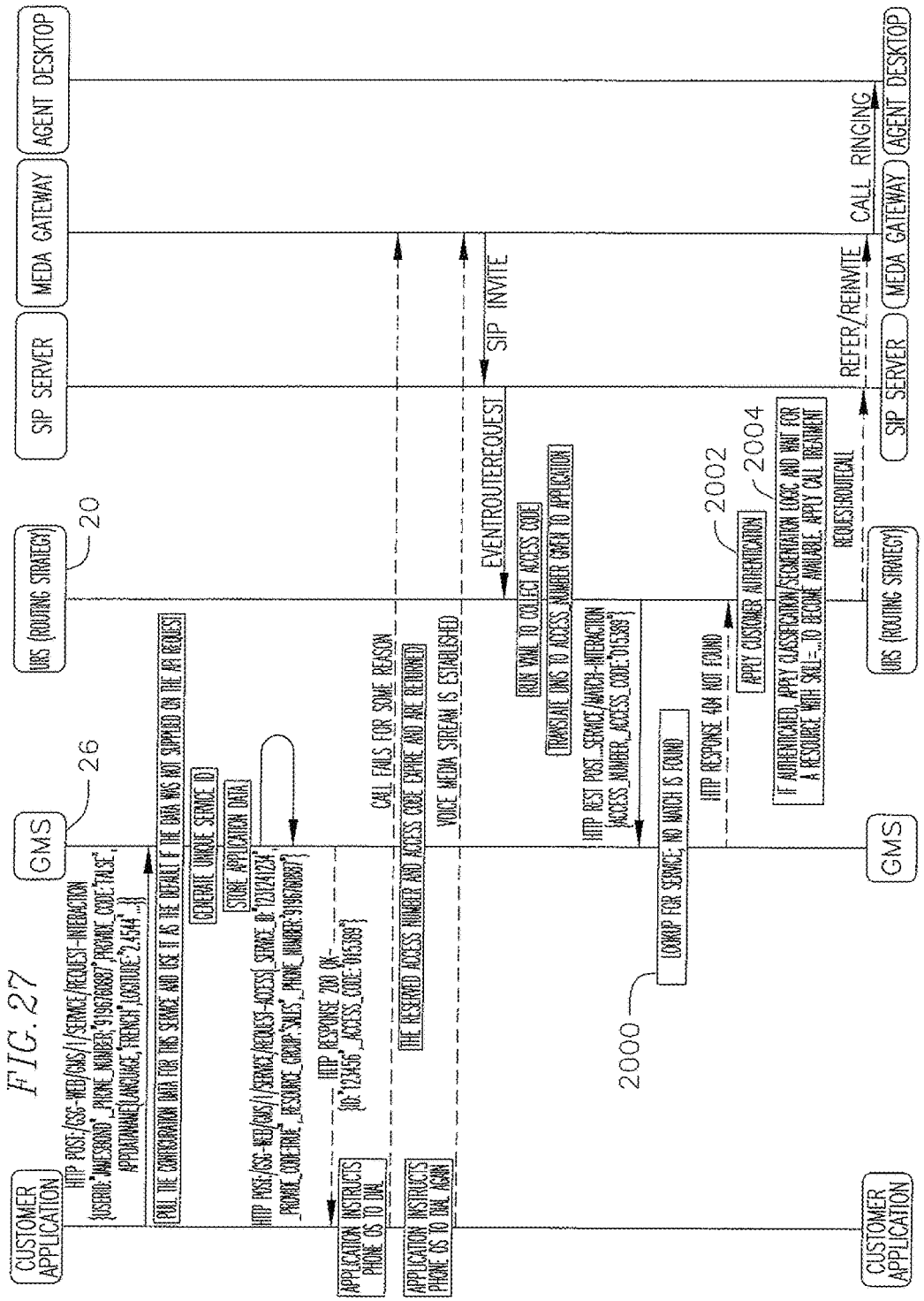
FIG. 27 is a message signaling diagram depicting a scenario where no call matching occurs according to one embodiment of the invention.

FIG. 27 is a message signaling diagram depicting a scenario where no call matching occurs according to one embodiment of the invention. The steps are similar to the steps in FIG. 26, except that in step 2000, the secure call matching module 58 of the mobile server system 26 is unable to match the access number and access code associated with the voice call, to stored context data. In step 2002, the routing server 20 thus proceeds to engage in customer authentication steps. For example, the IVR server 34 may be invoked for requesting that the user provide his or her account information, birthdate, reason for the call, and/or the like. If the caller is authenticated in step 2004, the call is routed to an appropriate agent.

V. Mobile Expert Desktop

According to one embodiment, the mobile server system 26 includes an agent connection component (not shown) in communication with agent applications downloaded and/or executed by various agent devices. Contact center agents, field workers, knowledge workers, and the like (collectively referred to as agents), may preview call context data and control interactions via their respective agent applications. According to embodiments of the present invention, the agent devices may be mobile devices, such as, for example, smart phones, electronic tablets, and the like. Although embodiments of the present invention are discussed in terms of mobile agent devices, a person of skill in the art should recognize that embodiments of the present invention are not limited to mobile devices, and may also extend to stationary agent devices such as for example, agent devices 38.

According to one embodiment, the agent application is invoked for indicating presence of the agent to handle interactions. Thus, instead of relying on traditional mechanisms for determining user availability to handle an interaction, such as, for example, determining whether the agent has logged in to the agent device, the agent application provides additional mechanisms to indicate agent presence which helps reduce uncertainty as to whether the agent is truly available or not.

According to one embodiment, the agent application provides call context previews and control of interactions routed to an agent accessing the application. According to one embodiment, the context data for a particular interaction to be routed to the agent is sent over a data channel in advance of the actual interaction. The context data is displayed by the agent application along with call management options, including options to accept or decline the interaction. The context data not only allows the agent to preview information about the caller, but verifies the agent's willingness to engage in the interaction. According to one embodiment, interactions are routed to an agent based on presence data about the agent, without sending call context previews, and/or without providing accept and decline options along with the previews.

According to one embodiment, if the agent receiving a call preview would prefer to answer the call via a different device or a different media channel within the same device, he or she may provide a command to display a list of media channels configured for the agent which may be selected to handle the interaction. Once the mobile application receives the agent's selection of the particular media channel, information on the selected media channel is transmitted to the routing server 20 for allowing a media connection to be made with the customer over the selected media channel. In this manner, context preview and call management may be performed using the agent device in which the agent application is installed and/or executed, but the media relating to the call may be routed to any telephony device dynamically selected by the agent. That is, the device that is to be used to engage in a media session with the customer need not be preselected by the agent.

Figure 28:
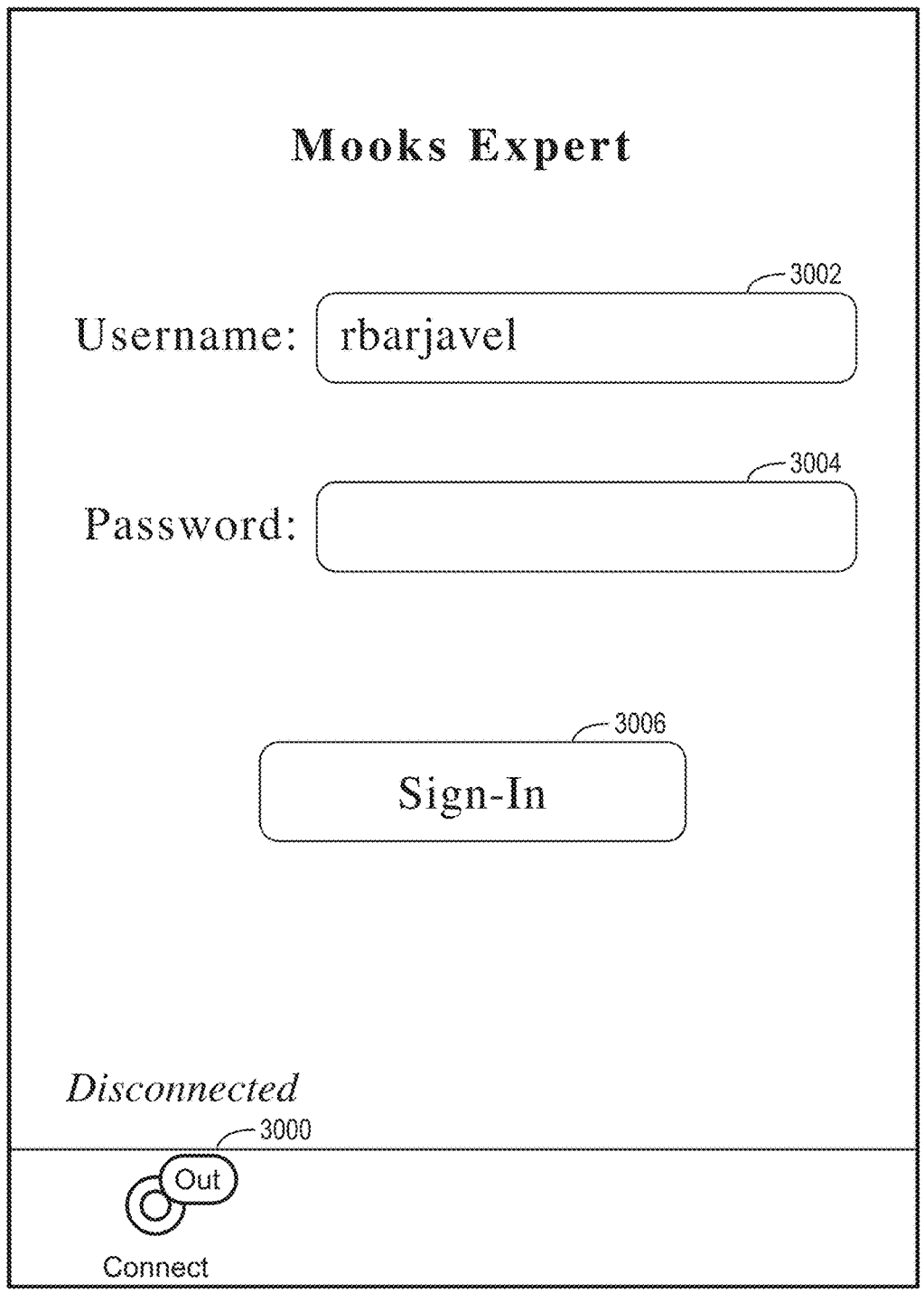
FIG. 28 is a screen shot of an exemplary log-in screen displayed by the agent application according to one embodiment of the invention.

FIG. 28 is a screen shot of an exemplary log-in screen displayed by the agent application according to one embodiment of the invention. According to one embodiment, the log-in screen is displayed on the agent's mobile device upon selection of a connection option 3000. The connection option indicates whether the agent is logged-in or not. An "out" message (or any other similar text or image) is displayed if the agent is logged out. According to one embodiment, the agent application allows the agent to log-in for work from any remote location upon actuating the connection option, and entering the agent's identifier 3002 and password 3004 and actuating a sign-in icon 3006. The agent's identifier 3002 and password 3004 may be pre-provisioned in the settings of the application on the mobile device, avoiding the need for the agent to enter them each time he or she accesses the application. The application may also be configured to automatically sign-in on startup.

The agent application provides the login information to, for example, the agent connection component of the mobile server system 20 for forwarding to a workforce management server that is configured to manage the scheduling of agents. The workforce management server may be configured to provide the log-in information to, for example, the statistics server 22, so that the agent may start receiving interactions on the agent device. According to one embodiment, an agent who has logged-in for work is identified as being available by the agent connection component, workforce management server, and/or statistics server 22. The agent availability is associated with the agent ID as well as with a location, telephone number, and/or extension of the particular device on which the mobile application is executed.

Figure 29:
FIG. 29 is a screen shot of an exemplary log-out screen displayed by an agent application according to one embodiment of the invention.

FIG. 29 is a screen shot of an exemplary log-out screen displayed by the agent application according to one embodiment of the invention. The screen may provide a log-out icon 3008, which, when actuated by the agent, causes the agent to be identified as being logged-out and unavailable, for example, by the agent connection component, workforce management server, and/or statistics server 22.

Figure 30:
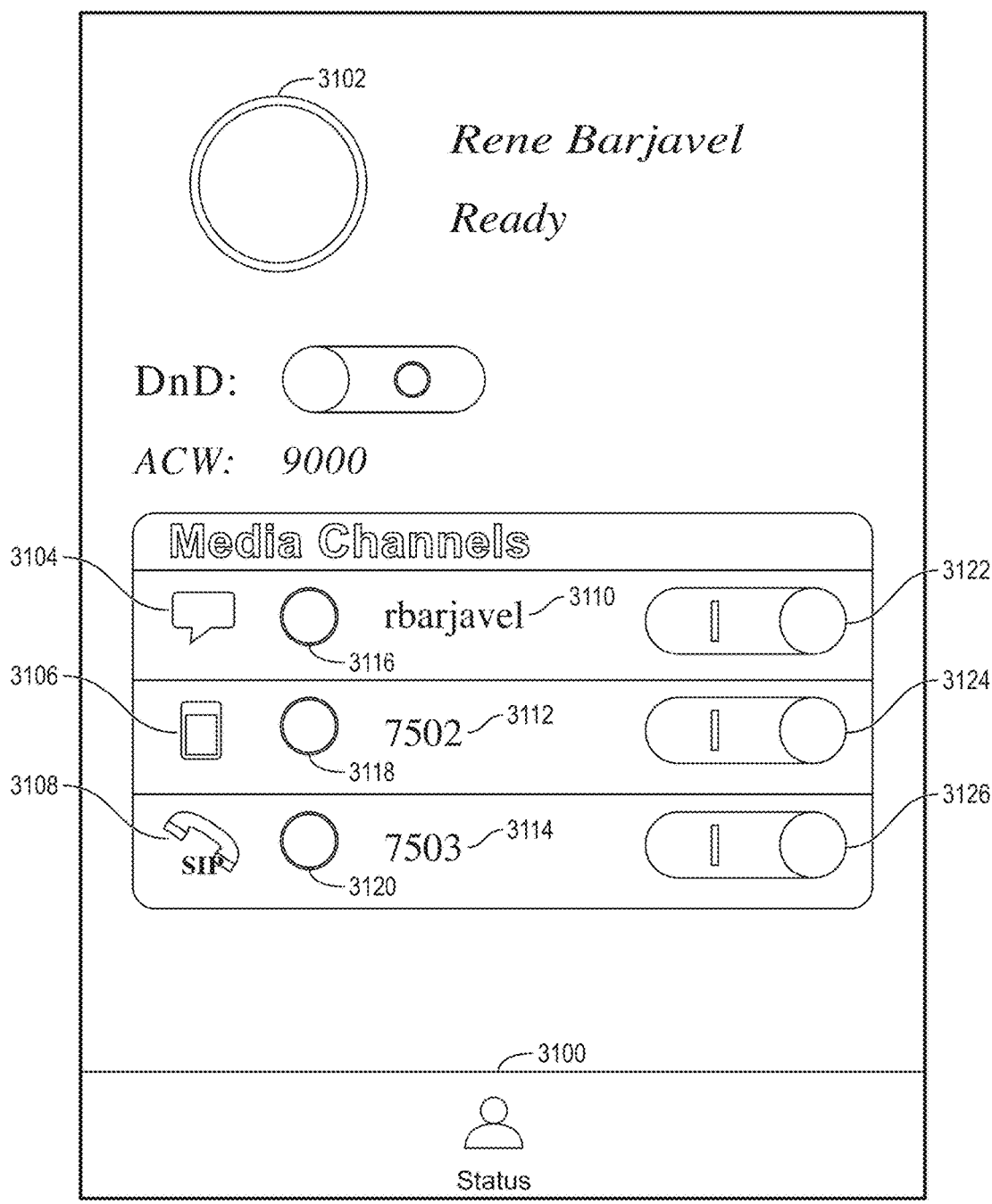
FIG. 30 is a screen shot of an exemplary screen displayed by an agent application upon selection of a status option according to one embodiment of the invention.

FIG. 30 is a screen shot of an exemplary screen displayed by the agent application upon selection of a status option 3100 according to one embodiment of the invention. The screen includes an overall presence icon 3102 for providing a quick visual indication of presence of the agent on one or more media channels 3104-3108. The media channels may include a text-based chat channel 3104, mobile telephony channel 3106, an Internet telephony channel 3108, or the like. For example, the Internet telephony channel 3108 may be accessible via an Internet telephony application embedded in the agent application or otherwise running on the agent device. The Internet telephony application may also be embedded in a separate device, such as, for example, a separate SIP telephone. The list of media channels may also include a telephone number for a desk phone used by the agent at the contact center, a WebRTC address, or the like.

According to one embodiment, each media channel is identified via an identifier, such as, for example, a chat login ID 3110 for the chat channel 3104 and telephone extensions 3112, 3114 for the telephony channels 3106, 3108. The chat login ID may be a nickname for the agent for text based conversations. According to one embodiment, the list of media channels configured for the agent along with the corresponding login IDs are stored, for example, in memory of a contact center server. The stored information is retrieved by the mobile application upon log-in of the agent via the mobile application.

According to one embodiment, the agent application provides, for each media channel 3104-3108, a presence controller 3122-3126 for manipulation by the agent for providing express presence status on the particular media channel. According to one embodiment, the mobile application may be configured to set, by default, the presence controller for the media channels accessible via the end user device, to be on an "available" setting. According to another embodiment, one of the various media channels associated with the agent is configured as a main or default media channel, and the default media channel is automatically set to be available in response to the user invoking the agent application to log in to the contact center.

The availability of the agent on each media channel may be visually depicted via channel presence icons 3116-3120. While each channel presence icon visually depicts the presence of the agent on the corresponding channel, the overall presence icon 3102 takes into account the agent's presence on each media channel and provides a way to quickly depict overall presence of the agent. According to one embodiment, the media channels may be hidden by the mobile application and displayed in response to a user action, such as, for example, a swipe, tap, and the like, on the agent device.

According to one embodiment, the agent connection component may be configured to, for example, monitor the individual media channels associated with the agent once the agent logs in, and forward information as to whether the agent is available on each media channel to, for example, the statistics server 22. According to one embodiment, the channel availability information may be transmitted by the agent application when the channel transitions from one state to another (e.g. from being available to unavailable). The monitoring of agent availability on a channel by channel basis by the agent connection component helps to improve certainty that a user is indeed available (or unavailable) on a particular media channel, without the need to rely on agent login or logout information alone. For example, an agent may login at the beginning of the work day and indicate that he is available generally to handle interactions. However, the agent may not be truly available as he may be doing other tasks that may not be automatically detected by the contact center servers without express information from the agent. At other times, the agent may be available on one media channel but not on another media channel. According to one embodiment of the present invention, the agent application provides the mechanism to provide express presence information on a channel by channel basis that reduces uncertainty about the true availability of the agent on each channel.

According to one embodiment, if the agent does not want to be available on a particular media channel, he or she may manipulate the presence controller for the corresponding media channel to set it to an "unavailable" setting.

Figure 31:
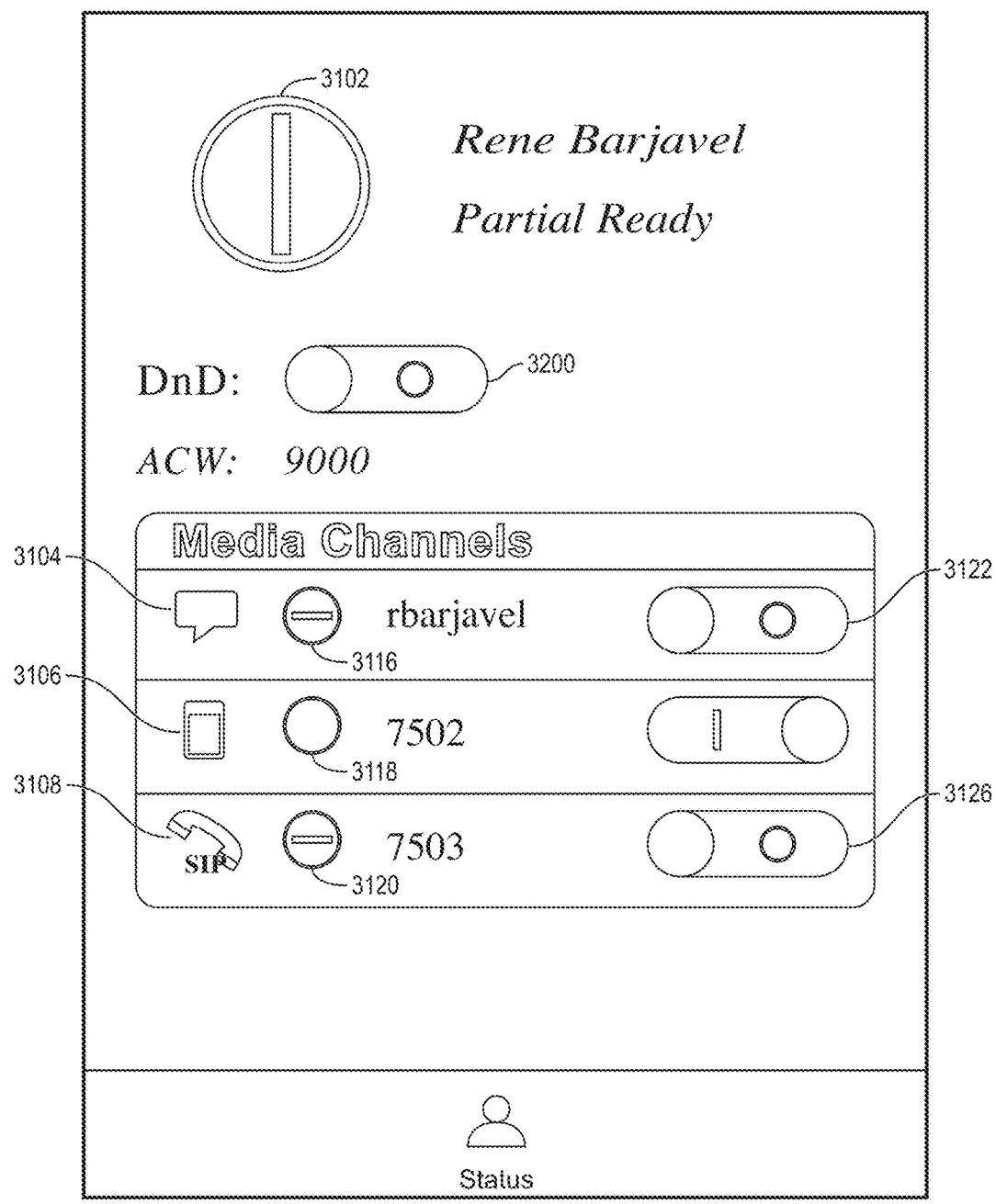
FIG. 31 is a screen shot of an exemplary screen displayed by an agent application depicting lack of user presence on certain media channels according to one embodiment of the invention.

FIG. 31 is a screen shot of an exemplary screen displayed by the agent application depicting lack of user presence on certain media channels according to one embodiment of the invention. In the illustrated example, the presence controller 3122 for the chat channel 3116 and the presence controller for the Internet telephony channel 3120 are each set to be in an "unavailable" setting. The "unavailable" setting of the Internet telephony channel 3120 may be in response to the agent manually setting the presence controller 3126 to the "unavailable" setting, or be set automatically based on the application determining that the data connection will not provide enough audio quality to serve customer interactions.

According to one embodiment, the unavailability information is transmitted to the agent connection component as soon as the change in state occurs for the media channel from available to unavailable. The agent presence data for the media channel as maintained by the agent connection component is updated accordingly in response to receipt of the updated presence data.

According to one embodiment, the overall presence icon 3102 transitions to a partial ready state in response to one of the media channels being set to be in an unavailable state (e.g. the chat media channel 3104) while another media channel (e.g. mobile voice channel 3106) is in an available state.

Figure 32:
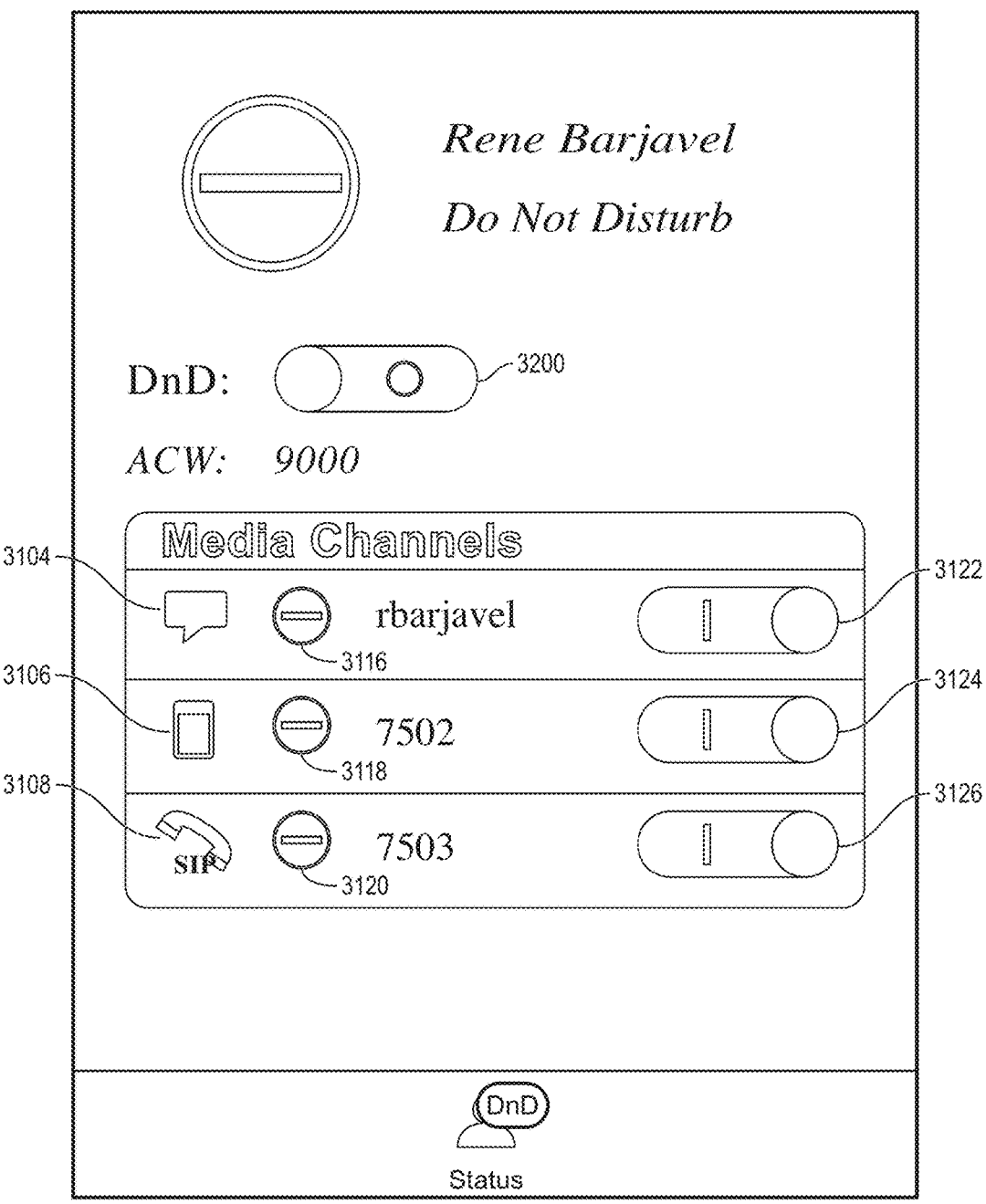
FIG. 32 is a screen shot of an exemplary screen displayed by an agent application depicting a do-not-disturb controller after it is set to an unavailable state according to one embodiment of the invention.

According to one embodiment, the agent may manipulate a do-not-disturb controller 3200 for automatically transitioning all media channels 3104-3108 to an unavailable state. FIG. 32 is a screen shot of an exemplary screen displayed by the agent application depicting the do-not-disturb controller 3200 after being set to an unavailable state according to one embodiment of the invention. The presence controllers 3122-3126 of the individual media channels are also automatically set to be in an unavailable state, causing the channel presence icons 3116-3120 to provide a visual indication of unavailability for each media channel.

Figure 33:
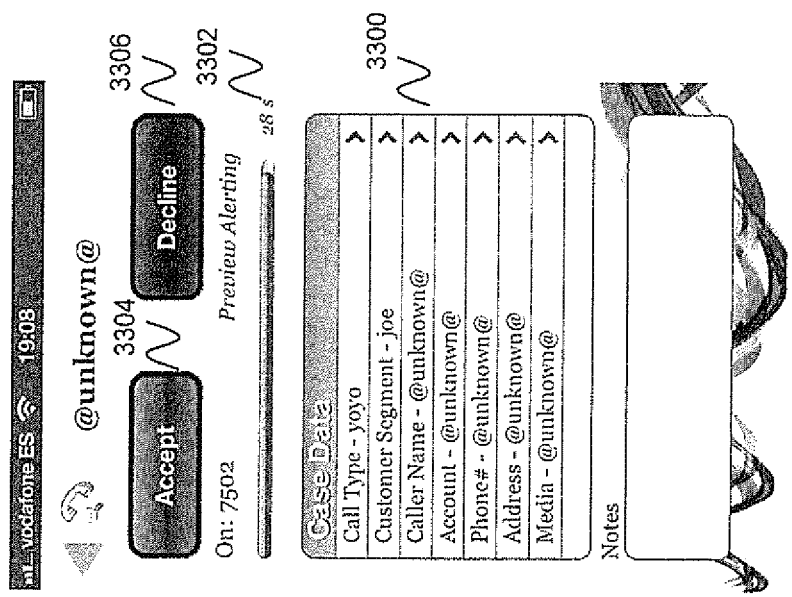
FIG. 33 is a screen shot of an exemplary screen displayed by an agent application for providing call context preview for a particular interaction according to one embodiment of the invention.

FIG. 33 is a screen shot of an exemplary screen displayed by the agent application for providing call context preview 3300 for a particular interaction according to one embodiment of the invention. The context data is transmitted to the agent application of a particular agent by, for example, the agent connection component, upon identification of the agent as being suitable for handling the particular interaction. The context data is transmitted in advance of an invitation to engage in a media session with the customer. According to one embodiment, the context data is attached to the invitation that is sent by the routing server 20 to the selected media channel.

According to one embodiment, the agent application provides icons 3304, 3306 for respectively accepting or declining the invitation to accept the particular interaction which context is being previewed. A running timer 3302 is displayed by the agent application for giving the agent a visual cue as to an amount of time left to accept or decline the interaction. When the timer 3302 reaches a preset timeout period, the interaction is routed to a different agent. If, however, the agent accepts the invitation, a media session is established between the media channel for which the invitation was received, and the customer device.

Figure 34:
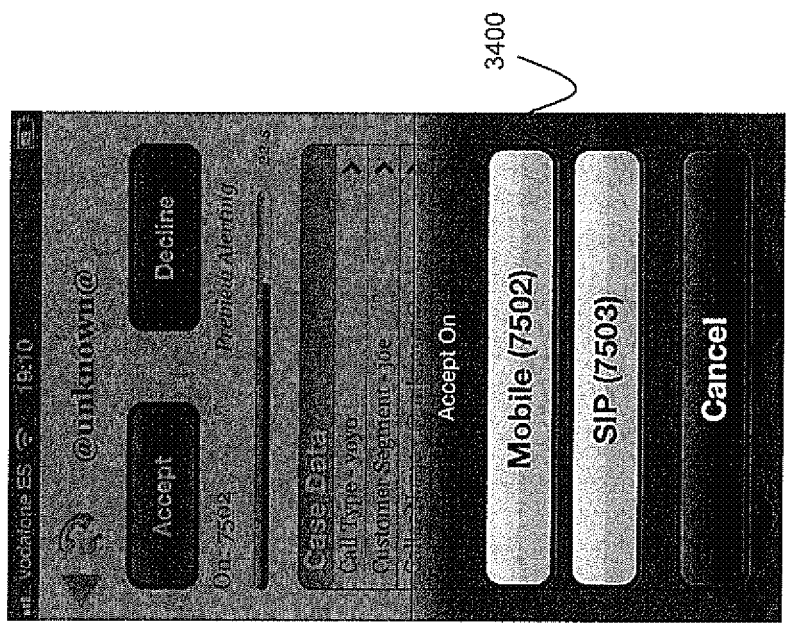
FIG. 34 is a screen shot of an exemplary screen displayed by an agent application for providing a menu of media channels in which an incoming interaction may be accepted according to one embodiment of the invention.

According to one embodiment a user may select a media channel other than the media channel for which the initial invitation was received, for engaging in an interaction with a customer. FIG. 34 is a screen shot of an exemplary screen displayed by the agent application for providing a menu 3400 of media channels in which an incoming interaction may be accepted according to one embodiment of the invention. The media channels may be provided by the mobile device itself, or by other devices such as, for example, a desk phone, home phone, and the like. Selection of a particular media channel causes the agent application to transmit a message to the agent connection component to transfer the interaction to the selected media channel. The transfer message is forwarded to the routing server 20 which then transmits the same or separate message to the call server 18 to send an invitation to the selected media channel instead of the initial media channel. A media session is established with the selected media channel according to conventional mechanisms.

Figure 35:
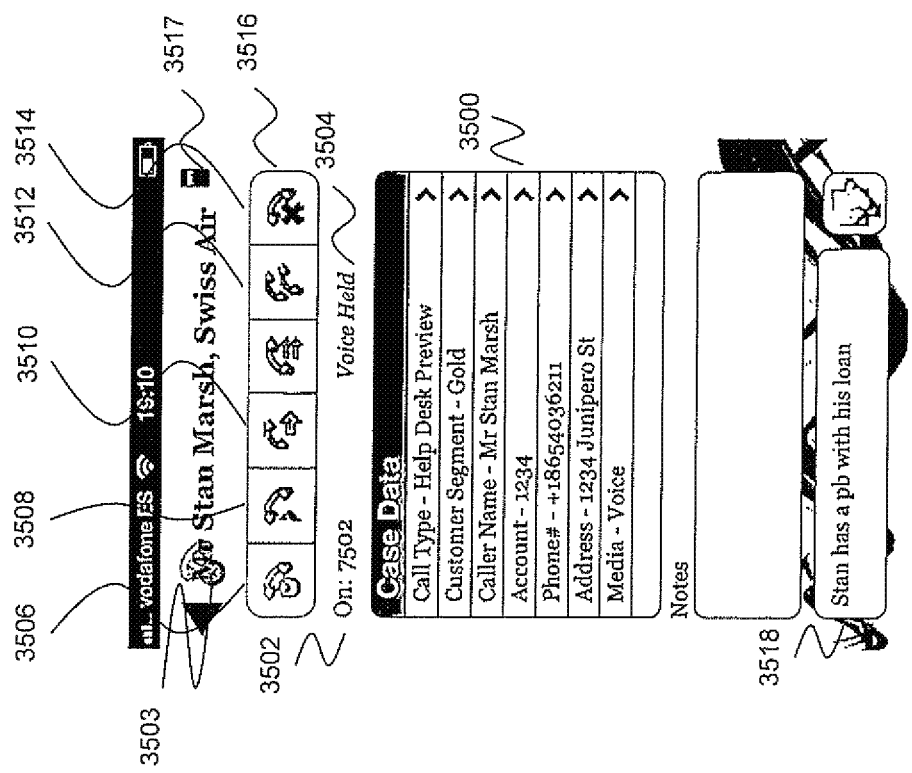
FIG. 35 is a screen shot of an exemplary screen displayed by an agent application when a voice call is accepted on a voice media channel according to one embodiment of the invention.

FIG. 35 is a screen shot of an exemplary screen displayed by the agent application when a voice call is accepted on a voice media channel according to one embodiment of the invention. Call context is displayed in a call context area 3500 along with identification (e.g. number) 3502 of the media channel that is being used to engage in the call. The screen may also display an icon 3617 of the type of media channel that is being used.

Various call control options may be displayed in a tool bar 3516. The call control options include, for example, placing the call on hold 3506, resuming the call 3508, transferring the call 3510 (e.g. to another agent), invoking a conference call 3512, and terminating the call 3514. Some of these call control options are provided by server components (3rd party call control) to complement capabilities which may lack on the mobile device (e.g. invoking a conference call 3512 or invoking call recording (not shown)). The call control option that is invoked is displayed via identifier 3504 as well as icon 3503.

A notes section 3518 allows the agent to receive notes entered by another agent, or to enter notes while being engaged in the call. The notes may be transmitted to the agent connection component upon termination of the call for storing in the mass storage device 30, or may be carried to a next resource/agent if interaction is transferred or conferenced to another agent.

Figure 36:
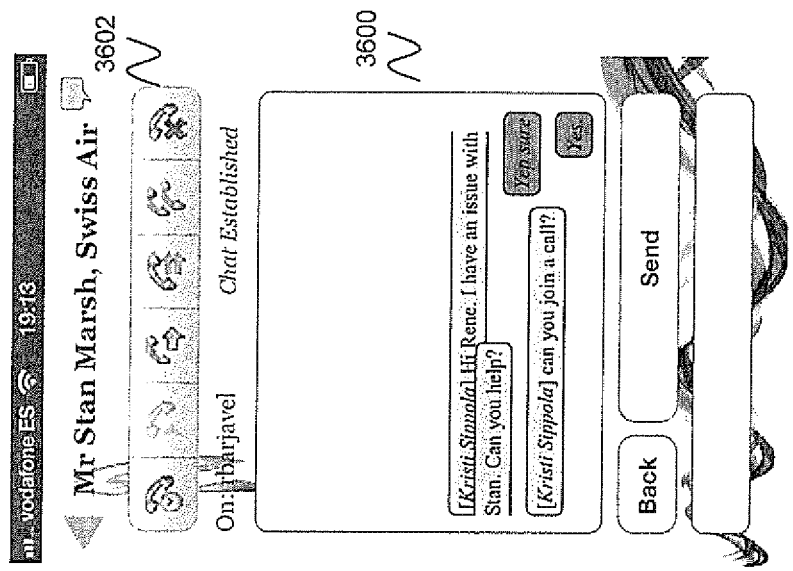
FIG. 36 is a screen shot of an exemplary screen displayed by an agent application when a chat interaction is accepted on a chat channel according to one embodiment of the invention.

FIG. 36 is a screen shot of an exemplary screen displayed by the agent application when a chat interaction is accepted on a chat channel according to one embodiment of the invention. According to one embodiment, the call context area 3500 is replaced with a chat transcript area 3600 for viewing the transcript of the current chat conversation. According to one embodiment, context data may be displayed over, for example, the chat transcript area 3500, in response to a user command (e.g. swipe, tap, or click on the agent device). The available controls displayed via toolbar 3602 may relate to chat controls instead of call controls as will be apparent to a person of skill in the art.

Figure 37:
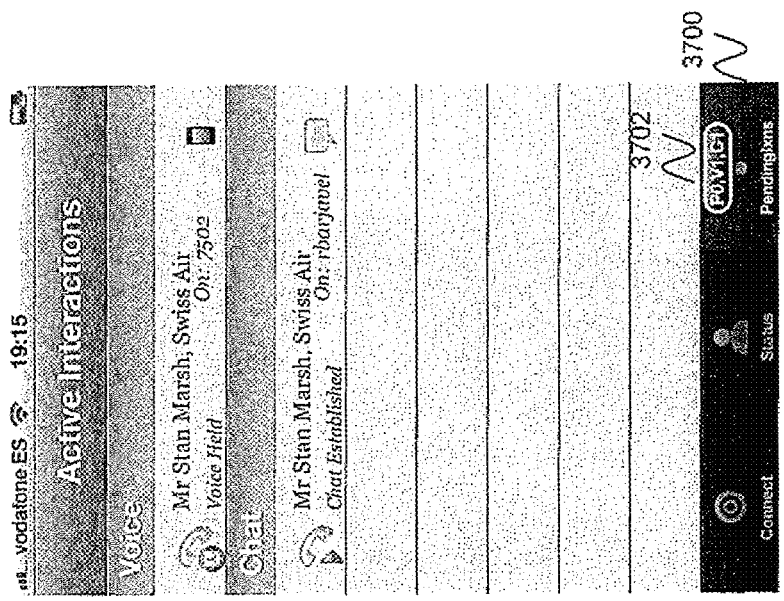
FIG. 37 is a screen shot of an exemplary screen displayed by an agent application upon selection of a pending interaction option according to one embodiment of the invention.

FIG. 37 is a screen shot of an exemplary screen displayed by the agent application upon selection of a pending interaction option 3700 according to one embodiment of the invention. The screen includes a description of active interactions that the agent is currently engaged in. According to one embodiment, a text and/or numeric badge 3702 appearing above the pending interaction option 3700 provides a summary of the pending interactions to which the agent may quickly refer while a screen other than the pending interaction screen is invoked. According to one embodiment, the pending interactions may not only include real-time interactions, but non-real time tasks and work items, such as, for example, responding to emails, faxes, letters, and the like. The non-real time tasks displayed by the agent application may be a view of the workbins to which the agent has accessed (e.g. his "drafts," his dedicated/own workbin, or workbins of a group of agents to which he belongs).

VI. Conversation Manager

According to one embodiment, the routing server 20, call server 18, or another application server may be configured for conversation management across various communication channels. In this regard, a transaction started in one communication channel may be resumed via a different communication channel without losing context of the initial transaction. For example, a customer may access a web server such as, for example, web server 32, to access his account with a particular airline (e.g. Blue Sky) for booking a flight to a particular destination.

Figure 38:
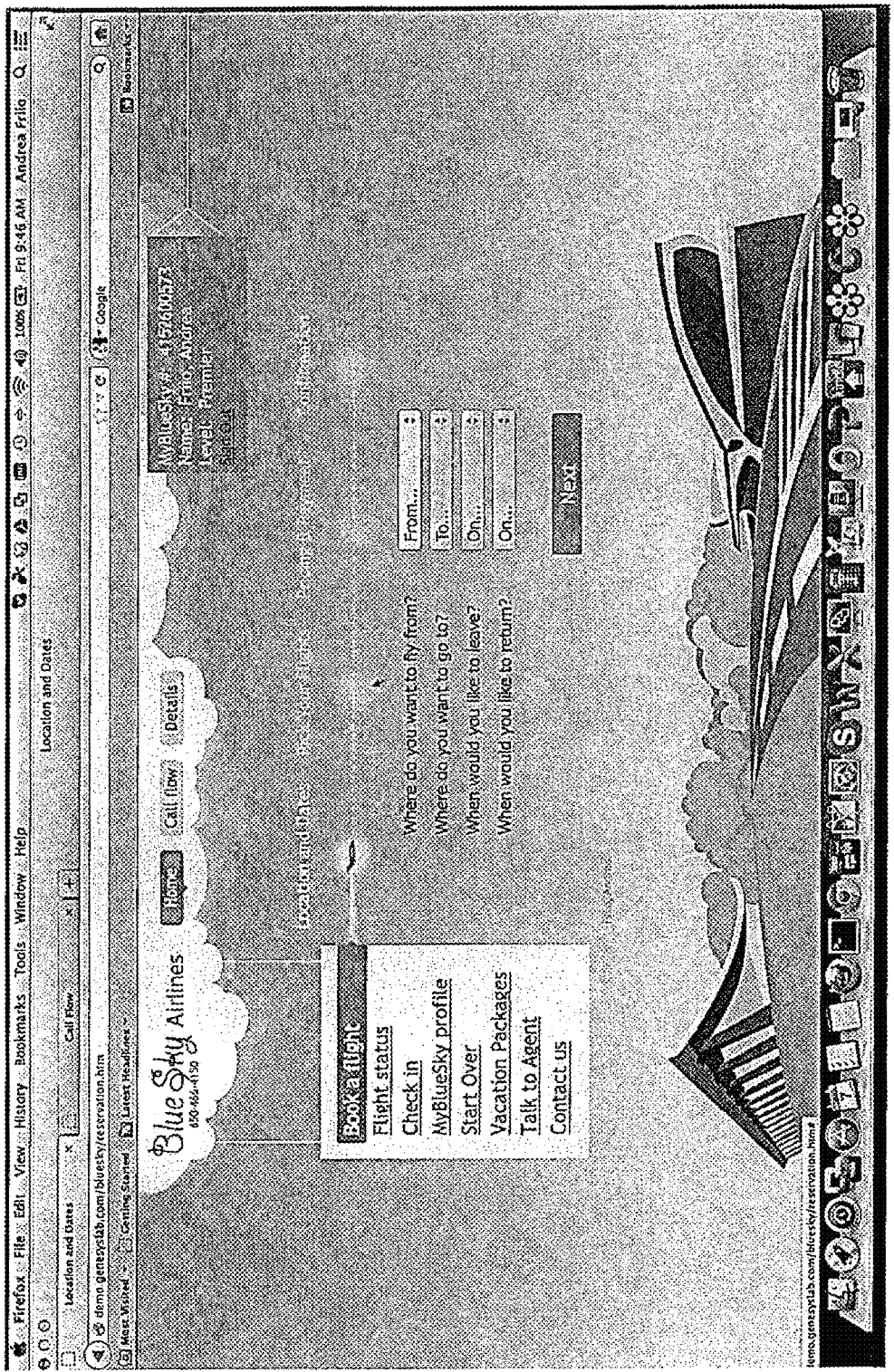
FIG. 38 is an exemplary screen shot of a web page accessed for booking according to one embodiment of the invention.

FIG. 38 is an exemplary screen shot of a web page accessed for booking a flight with Blue Sky. The user may enter specific information about the flight, such as, for example, a originating location, a destination, time, and dates for the flight. The user may log off without completing the booking. According to one embodiment, the information collected from the user in the booking session thus far is saved in a transaction record in the mass storage device 30. A status is associated with the interaction record for indicating that the transaction has not been finalized. According to one embodiment, the transaction may be left as open for a preset period of time, after which the status may change to closed.

According to one embodiment, the user may complete the booking at a later time via a separate communication channel. For example, the user may call the contact center using a land-line telephone, mobile phone, or any other communication mechanism conventional in the art. According to one embodiment, the call server 18 and/or routing server 20 is configured to retrieve a record of any pending/open transactions for the calling user for inquiring of the caller whether he would like to resume the transaction. Retrieval of a record may be based, for example, on a match of the ANI data to the telephone number stored in the user's customer profile. If the user is not automatically identified (e.g. the user is using a new phone which number is not stored in the customer profile record), the call may be routed to the IVR server 34 for prompting for other authentication information such as, for example, an account number.

According to one embodiment, if there is an open transaction item for the user, the user is prompted, via the IVR server 34, to specify whether the open transaction is to be finalized. If the answer is YES, the IVR server 34 may be configured to resume transaction from the point in which the prior transaction was left off. For example, in the example of booking a flight, if the user left the prior transaction prior to submitting his payment information, the IVR server 34 would be instructed to resume from that point. The IVR server may also be configured to repeat the information about the transaction stored in the transaction record, such as, for example, the originating location, the destination location, flight dates and time, and the like.

According to one embodiment, the overall transaction may be decomposed into smaller transactions, and such a nested transaction might consist of multiple steps. In some cases it would be OK to resume exactly where left off last time, but sometimes it might be required to roll back to the beginning of the embedded transaction. This could be e.g. because of security reasons, or because certain related data might have changed and the transaction request needs to be recreated based on the new data. One example is money transfer with fixed daily limit. When starting transfer via transaction A, stopping in the middle and resuming later, it has to be checked whether there was in the meantime another transaction B which already exhausted the limit.

Referring again to FIG. 38, the web page may provide to the user an option to contact an agent directly from the website. The availability of this option may depend, for example, on the customer's profile data. For example, a customer with a premier label may see the "talk to agent" option enabled on the website while a customer with a bronze level might not.

According to one embodiment, selection of the "talk to agent" option provides additional options as to the communication channel to be invoked for the contact. For example, the user may have the option to chat with the agent, or request that the agent call the user at a particular phone number. The types of communication channels available to the user may depend on the customer profile information.

VII. Providing Interaction History Via Customer Application

According to one embodiment, data about the customer and interactions engaged with the customer may be stored in the mass storage device and provided to the customer application upon request. The customer may or may not have invoked the application to engage in those interactions. For example, the customer may have sent an email or text, or made a call outside of the application. According to one embodiment, all interactions relating to the customer are stored in the mass storage device and provided to the mobile application associated with the customer. In this manner, the customer has, in a central location, information for all interactions with the contact center even when those interactions occurred outside of the application. For example, a customer may invoke the application to fill out and submit an insurance claim. As part of the claims process, the customer may have to send an email including a picture of the accident scene. The customer may invoke the email outside of the application to submit the picture. The customer may then return to the application to finalize the claim. According to one embodiment, when the application is invoked to retrieve interaction data relating to the claim, the email from the customer is listed as part of the interaction relating to the particular claim.

According to one embodiment, the interactions may be organized according to any desired criteria, such as, for example, a transaction topic, category, date, transaction ID, and/or the like. In the insurance claims example, the interactions may be stored and displayed based on a claim number. The information available for the interactions may also include status information, information on agents handling the interaction, length of the interaction, topic of conversation, and the like. For example, the status of an email submitted to the contact center may be marked as having been read, responded to, or the like. Other general status information may also be provided to the customer via the customer application. For example, the status of processing an insurance claim submitted to the contact center may be displayed as pending, processing, or the like. Other status information may be displayed for prompting customer action. For example, the status may alert the customer that an email or letter was sent. The customer may be requested to review the documents and respond accordingly (e.g. sign the documents). According to one embodiment, the application may be invoked to take the prompted actions. For example, a copy of the documents transmitted via email or mail may be available via the application, in which case the customer may open and e-sign the documents directly from the application.

According to one embodiment, one or more applications in the mobile server system is configured to provide logic for providing interaction history to the customer application 50. In this regard, a customer invokes the customer application for engaging in a particular transaction. For example, the transaction may be to fill out a claims form for an accident involving the customer. The application may provide a fillable form which is transmitted to the contact center upon selection of a "submit" option. According to one embodiment, the form may be filled and submitted in various stages. As information is received at each stage by the one or more applications, it is stored in a record in the mass storage device in association with the customer, customer application, transaction ID, and/or the like.

During or after filling different portions of the form, the customer may initiate interaction with the contact center outside of the customer application. For example, the customer may place a call, send an email, or transmit a text to a general agent or a specific agent assigned to the transaction. According to one embodiment, the call, email, or text is identified by a customer name, telephone number, contact information, transaction ID (e.g. a claim number assigned by the contact center to the particular transaction), or the like. The interactions received by the contact center outside of the customer application are correlated to the customer, customer application, transaction, or the like, and stored in the mass storage device. The customer may invoke a history option (e.g. history option 104 in FIG. 2) to view a history of all interactions associated with the customer. In this regard, when the one or more applications receive a request to view the history, the interactions correlated to the customer, customer application, or transaction, are transmitted to the mobile application for display.

According to one embodiment, the one or more applications may be implemented via computer program instructions stored in memory and executed by a processor in the mobile server system 26. Of course, the applications may also be implemented via hardware, firmware (e.g. ASIC), or any combination of hardware, firmware, and software as will be apparent to a person of skill in the art.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

The invention claimed is:

1. A method for providing contact center services via a mobile application on a mobile device, the method comprising:
monitoring, by a processor, status associated with a service request transmitted to a contact center;
detecting change in the status;
determining, by the processor, whether a condition for transmitting a notification has been satisfied;
automatically transmitting, by the processor, a notification to the mobile application in response to determining that the condition has been satisfied;
receiving, by the processor, in response to the notification, a request for information on the service request;
transmitting, by the processor, the information in response to the request, the information for being displayed via the mobile application;
receiving, by the processor, an interaction request from the mobile application, wherein the interaction request includes an identifier for identifying the service request;
identifying, by the processor, based on the received identifier, a party assigned to handle the service request; and
inviting the identified party, by the processor, for engaging in interaction with the mobile device.

2. The method of claim 1, wherein the status identifies that the service request has been resolved.

3. The method of claim 1, wherein the status identifies triggering of an alarm with respect to the service request, or identifies escalation of a problem associated with the service request.

4. The method of claim 1 further comprising:
automatically transmitting the notification to a contact center agent.

5. The method of claim 1, wherein the interaction request is generated by the mobile application in response to actuation of an interaction option by a user of the mobile application.

6. The method of claim 1, wherein the interaction request is a mobile phone call to the contact center, wherein a telephone number for the contact center is provided to the mobile application as a push notification.

7. The method of claim 6, wherein the telephone number is selected based on identification of a location of the mobile device.

8. The method of claim 1 further comprising:
monitoring compliance with a service level agreement; and
visually depicting a level of compliance via a visual indicator.

9. The method of claim 1, wherein the identification of the party is without further input from a user of the mobile device.

10. A system for providing contact center services via a mobile application on a mobile device, the system comprising:
a processor;
a memory storing instructions which, when executed by the processor, causes the processor to:
monitor status associated with a service request transmitted to a contact center;
detect change in the status;
determine whether a condition for transmitting a notification has been satisfied;
automatically transmit a notification to the mobile application in response to determining that the condition has been satisfied
receive, in response to the notification, a request for information on the service request;
transmit the information in response to the request, the information for being displayed via the mobile application;
receive an interaction request from the mobile application, wherein the interaction request includes an identifier for identifying the service request;
identify, based on the received identifier, a party assigned to handle the service request; and
invite the identified party for engaging in interaction with the mobile device.

11. The system of claim 10, wherein the status identifies that the service request has been resolved.

12. The system of claim 10, wherein the interaction request is generated by the mobile application in response to actuation of an interaction option by a user of the mobile application.

13. The system of claim 10, wherein the interaction request is a mobile phone call to the contact center, wherein a telephone number for the contact center is provided to the mobile application as a push notification.

14. The system of claim 13, wherein the telephone number is selected based on identification of a location of the mobile device.

15. The method of claim 1, wherein the condition is identification of a subscription to receive notifications.

16. The method of claim 1, wherein the inviting of the identified party includes:
transmitting, by the processor, a message to an end device accessible to the party, the message including the identifier for identifying the service request; and
transmitting, by the processor, a signal for establishing a communication session between the mobile device and the end device.

17. The method of claim 1 further comprising:
storing, by the processor, the identifier in memory;
matching the interaction request to the stored identifier; and
retrieve the identifier in response to making the match.

18. The system of claim 10, wherein the condition is identification of a subscription to receive notifications.

19. The system of claim 10, wherein the instructions that cause the processor to invite the identified party include instructions that cause the processor to:
transmit a message to an end device accessible to the party, the message including the identifier for identifying the service request; and
transmit a message for establishing a communication session between the mobile device and the end device.

20. The system of claim 10, wherein the instructions further cause the processor to:
store the identifier in the memory;
match the interaction request to the stored identifier; and
retrieve the identifier in response to making the match.

* * * * *